(12) United States Patent
Samardzija et al.

(10) Patent No.: US 7,937,164 B2
(45) Date of Patent: May 3, 2011

(54) MULTIVARIATE DETECTION OF ABNORMAL CONDITIONS IN A PROCESS PLANT

(75) Inventors: Nikola Samardzija, Minnetonka, MN (US); Ahmad A. Hamad, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 458 days.

(21) Appl. No.: 11/864,529

(22) Filed: Sep. 28, 2007

(65) Prior Publication Data

US 2008/0082302 A1   Apr. 3, 2008

Related U.S. Application Data

(60) Provisional application No. 60/827,631, filed on Sep. 29, 2006.

(51) Int. Cl.
| | |
|---|---|
| G05B 13/02 | (2006.01) |
| G06F 19/00 | (2006.01) |
| G06F 11/00 | (2006.01) |
| G01N 37/00 | (2006.01) |
| G01D 3/00 | (2006.01) |

(52) U.S. Cl. ............... 700/28; 702/81; 702/84; 702/108; 702/188; 700/108; 700/109; 700/174; 700/175; 703/2

(58) Field of Classification Search .................. None
See application file for complete search history.

(56) References Cited

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |

(Continued)

FOREIGN PATENT DOCUMENTS

DE      101 14 206 A1      11/2001

(Continued)

OTHER PUBLICATIONS

Chiang, et al., "Fault Diagnosis in Chemical Processes Using Fisher Discriminant Analysis, Discriminant Partial Least Squares, and Principal Component Analysis," Chemometrics and Intelligent Laboratory Systems, 50: 243-252 (2000).

(Continued)

*Primary Examiner* — Ramesh B Patel
*Assistant Examiner* — Sunray R Chang
(74) *Attorney, Agent, or Firm* — Marshall, Gerstein & Borun LLP

(57) ABSTRACT

Methods and systems to detect abnormal operations in a process of a process plant include collecting on-line process data. The collected on-line process data is generated from a plurality of dependent and independent process variables of the process, such as a coker heater. A plurality of multivariate statistical models of the operation of the process are generated using corresponding sets of the process data. Each model is a measure of the operation of the process when the process is on-line at different times, and at least one model is a measure of the operation of the process when the process is on-line and operating normally. The models are executed to generate outputs corresponding to loading value metrics of a corresponding dependent process variable, and the loading value metrics are utilized to detect abnormal operations of the process.

12 Claims, 43 Drawing Sheets

U.S. PATENT DOCUMENTS

| | | |
|---|---|---|
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palosamy et al. |
| 5,325,522 A | 6/1994 | Vaughn |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,410,492 A | 4/1995 | Gross et al. |
| 5,442,544 A | 8/1995 | Jelinek |
| 5,442,562 A * | 8/1995 | Hopkins et al. ............... 700/108 |
| 5,461,570 A | 10/1995 | Wang et al. |
| 5,479,340 A * | 12/1995 | Fox et al. ........................ 700/33 |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,504,863 A | 4/1996 | Yoshida |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,654,841 A | 8/1997 | Hobson et al. |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,757,748 A | 5/1998 | Kiyoura et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,812,394 A | 9/1998 | Lewis et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,903,455 A | 5/1999 | Sharpe, Jr. et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,914,875 A | 6/1999 | Monta et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,949,678 A | 9/1999 | Wold et al. |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,026,352 A | 2/2000 | Burns et al. |
| 6,033,257 A | 3/2000 | Lake et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasaukas |
| 6,119,047 A | 9/2000 | Eryurek et al. |
| 6,122,555 A | 9/2000 | Lu |
| 6,128,279 A | 10/2000 | O'Neil et al. |
| 6,134,032 A | 10/2000 | Kram et al. |
| 6,141,630 A | 10/2000 | McNamara et al. |
| 6,144,952 A | 11/2000 | Keeler et al. |
| 6,169,980 B1 | 1/2001 | Keeler et al. |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,701 B1 | 11/2001 | Pyötsiä et al. |
| 6,332,110 B1 | 12/2001 | Wolfe |
| 6,397,114 B1 | 5/2002 | Eryurek et al. |
| 6,415,244 B1 | 7/2002 | Dickens et al. |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 | 3/2003 | Eryurek et al. |
| 6,564,119 B1 | 5/2003 | Vaculik et al. |
| 6,615,090 B1 | 9/2003 | Blevins et al. |
| 6,618,632 B1 | 9/2003 | Federl et al. |

| | | | |
|---|---|---|---|
| 6,633,782 B1 | 10/2003 | Schleiss et al. | |
| 6,728,658 B1 | 4/2004 | Bechhoefer | |
| 6,821,521 B1 | 11/2004 | Robinson et al. | |
| 6,885,907 B1 | 4/2005 | Zhang et al. | |
| 6,917,839 B2 | 7/2005 | Bickford | |
| 6,947,868 B2 | 9/2005 | Ernst et al. | |
| 7,062,417 B2 | 6/2006 | Kruger et al. | |
| 7,079,984 B2 | 7/2006 | Eryurek et al. | |
| 7,085,610 B2 | 8/2006 | Eryurek et al. | |
| 7,194,369 B2* | 3/2007 | Lundstedt et al. | 702/104 |
| 7,346,402 B1 | 3/2008 | Stahl | |
| 7,523,384 B2 | 4/2009 | Wold | |
| 7,636,915 B1 | 12/2009 | DiVittorio | |
| 7,647,126 B2 | 1/2010 | Blevins et al. | |
| 7,657,399 B2 | 2/2010 | Miller et al. | |
| 2002/0022894 A1 | 2/2002 | Eryurek et al. | |
| 2002/0038156 A1 | 3/2002 | Eryurek et al. | |
| 2002/0072882 A1 | 6/2002 | Kruger et al. | |
| 2002/0077711 A1 | 6/2002 | Nixon et al. | |
| 2002/0147511 A1 | 10/2002 | Eryurek et al. | |
| 2002/0161940 A1 | 10/2002 | Eryurek et al. | |
| 2002/0163427 A1 | 11/2002 | Eryurek et al. | |
| 2003/0014500 A1 | 1/2003 | Schleiss et al. | |
| 2003/0028269 A1 | 2/2003 | Spriggs et al. | |
| 2003/0065462 A1 | 4/2003 | Potyrailo | |
| 2003/0078684 A1 | 4/2003 | Martin et al. | |
| 2003/0109951 A1 | 6/2003 | Hsiung et al. | |
| 2003/0120450 A1 | 6/2003 | Ernst et al. | |
| 2003/0139825 A1 | 7/2003 | Lund | |
| 2003/0139905 A1 | 7/2003 | Helsper | |
| 2004/0052526 A1 | 3/2004 | Jones et al. | |
| 2005/0060103 A1 | 3/2005 | Chamness | |
| 2005/0125090 A1 | 6/2005 | Sakano et al. | |
| 2005/0197805 A1 | 9/2005 | Eryurek et al. | |
| 2005/0197806 A1 | 9/2005 | Eryurek et al. | |
| 2006/0012064 A1 | 1/2006 | Hutson et al. | |
| 2006/0020423 A1 | 1/2006 | Sharpe | |
| 2006/0058898 A1 | 3/2006 | Emigholz et al. | |
| 2006/0074598 A1 | 4/2006 | Emigholz et al. | |
| 2007/0088528 A1 | 4/2007 | Miller | |
| 2007/0088534 A1 | 4/2007 | MacArthur et al. | |
| 2007/0112275 A1 | 5/2007 | Cooke et al. | |
| 2007/0250292 A1 | 10/2007 | Alagappan et al. | |

FOREIGN PATENT DOCUMENTS

| | | |
|---|---|---|
| EP | 0 612 039 A3 | 8/1994 |
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| WO | WO 95/18420 A2 | 7/1995 |
| WO | WO 00/05013 | 2/2000 |
| WO | WO 00/62256 | 10/2000 |
| WO | WO 01/69186 A1 | 9/2001 |
| WO | WO 03/019304 A1 | 3/2003 |
| WO | WO 03/075206 A2 | 9/2003 |
| WO | WO 2006/031749 A2 | 3/2006 |

OTHER PUBLICATIONS

International Search Report and Written Opinion for International Application No. PCT/US2007/079858 dated Jun. 3, 2008.

International Preliminary Report on Patentability for Application No. PCT/US2007/079858, dated Mar. 31, 2009.

International Preliminary Report on Patentability International Application No. PCT/US2007/079859 dated Jul. 28, 2009.

"The HART Protocol—A Solution Enabling Technology," http://www.hartcomm.org, 5 pages, (Feb. 2004).

"Time to Tap Into HART," http://www.hartcomm.org, 3 pages, (Nov. 2003).

Adler, http://www.hartcomm.org, "Continuous HART Communication Increases Safety Integrity Level (SIL)," 3 pages, (Dec. 2000).

Chiang, et al. "Fault Detection and Diagnosis in Industrial Systems," 35-84 Springer-Verlag London Limited, (2001).

Defernez et al., "The Use and Misuse of Chemometrics for Treating Classification Problems," *Trends in Analytical Chemistry*, 16(4): 216-221 (1997).

Erguo et al., "An Input-Training Neural Network-Based Nonlinear Principal Component Analysis Approach for Fault Diagnosis," *Proceedings of the 4th World Congress on Intelligent Control and Automation*, pp. 2755-2759 (2002).

Eryurek et al., "Abnormal Situation Prevention Through Smart Field Devices," NPRA 2005 Annual Meeting, Mar. 13-15, San Francisco, CA (2005).

Frank, "Fault Diagnosis in Dynamic Systems Using Analytical and Knowledge-Based Redundancy—A Survey and Some New Results," *Automatica*, 26: 459-474 (1990).

Franklin et al., "Parallel Analysis: A Method for Determining Significant Principal Components." *Journal of Vegetation Science*, 6:99-106 (1995).

Geladi, et al., "Partial Least-Squares Regression: A Tutorial," *Analytica Chimica Acta*, 185: 1-17 (1986).

Helson, "The Impact of HART on Process Automation, The Compelling Case for the World's Most Used Digital Communication Protocol," www.hartcomm.org, (Jun. 2004).

Helson, http://www.hartcomm.org, "HART Communication: Driving New Product Developments," 11 pages, (Mar. 2004).

Helson, http://www.hartcomm.org, "The Impact of HART on Process Automation," 3 pages, (Jun. 2004).

Helson, http://www.hartcomm.org, "Understanding the Power of HART Communication," 3 pages, (Mar. 2003).

Hoskuldsson, "PLS Regression Methods," *Journal of Chemometrics*, 2: 211-228 (1998).

Internet web page printout of internet access: http://www.hartcomm.org/technical/applications/sasol.html "Sasol Wins 2005 HART Plant of the Year Award," (Nov. 1, 2005).

Isermann, "Fault Diagnosis of Machines via Parameter Estimation and Knowledge Processing—Tutorial paper," *Automatica*, 29: 815-835 (1993).

Kaistha et al.. "Incipient Fault Detection and Isolation of Field Devices in Nuclear Power Systems Using Principal Component Analysis," *Nuclear Technology*, 136: 221-230 (2001).

Ku et al., "Disturbance Detection and Isolation by Dynamic Principal Component Analysis," *Chemometrics and Intelligent Laboratory Systems*, 30: 179-196 (1995).

Naes et al., "Understanding the Collinearity Problem in Regression and Discriminant Analysis," *J. Chemometrics*, 15:413-426 (2001).

Pratt, http://www.hartcomm.org, "HART Networks," 32 pages, (Apr. 2002).

Pratt, http://www.hartcomm.org, "Sorting Out the Protocols: Network Soup," 17 pages, (Jan. 2002).

Qin et al., "Nonlinear PLS Modeling Using Neural Networks," *Computers Chem. Engng.*, 16(4): 379-391 (1992).

Russell et al., "Data-Driven Techniques for Fault Detection and Diagnosis in Chemical Processes," 33-80 Springer-Verlag London Limited (2000).

Szanyi et al., "Diagnostics Capabilities of Foundation Fieldbus Pressure Transmitters," *Hydrocarbon Processing*, pp. 53-59 (Apr. 2003).

Wise et al., "The Process Chemometrics Approach to Process Monitoring and Fault Detection," *J. Proc. Cont.*, 6,(6):329-348 (1996).

Yoon et al., "Fault Diagnosis with Multivariate Statistical Models Part I: Using Steady State Fault Signatures," *Journal of Process Control*, 11: 387-400 (2001).

Yoon et al., "Multivariate Process Monitoring and Early Fault Detection (MSPC) Using PCA and PLS," Plant Automation and Decision Support Conference, San Antonio, Texas, pp. 21-24 (Sep. 2003).

Zhao et al., "A Nonlinear Modeling and Online Monitoring Method for the Batch Process Using Multiple Local PCA," *Proceedings of the Second International Conference on Machine Learning and Cybernetics*, pp. 1190-1194 (2003).

International Search Report and Written Opinion for International Application No. PCT/US2007/079988, dated Jun. 16, 2008.

International Search Report received in International (PCT) Application PCT/US2005/006155, mailed Nov. 7, 2005.

Written Opinion of the International Search Authority for Application PCT/US2005/006155, mailed Nov. 7, 2005.

International Search Report for PCT/US2005/006319, mailed Sep. 16, 2005.
Written Opinion for PCT/US/2005/006319, mailed Sep. 16, 2005.
International Search Report for PCT/US2005/006155, mailed Sep. 5, 2005.
Written Opinion for PCT/US2005/06155, mailed Sep. 5, 2005.
International Search Report for PCT/US2005/006325, mailed Sep. 5, 2005.
Written Opinion for PCT/US2005/006325, mailed Sep. 5, 2005.
Partial International Search Report for PCT US2005/006319, mailed Jul. 22, 2005.
Partial International Search Report for PCT US2005/006155, mailed Jul. 11, 2005.
Partial International Search Report for PCT/US2005/006325 mailed Jul. 8, 2005.
Wernwe Kalkhoff, "Agent-Oriented Robot Task Transformation", Proceedings of the International Symposium on Intelligent Control, IEEE, pp. 242-247 (Aug. 27, 1995).
"Electrical Equipment Coverage," GE Industrial Systems, available at http://www.geindustrial.com/cwc/services?id=72 on Jul. 18, 2002.
"Customer Impact," GE Industrial Systems, available at http://www.geindustrial.com/cwc/services?id=73 on Jul. 18, 2002.
"Components of GE Predictor™ Services," GE Industrial Systems, available at http://www.geindustrial.com/cwc/services?id=74 on Jul. 18, 2002.
"Customer Benefits," GE Industrial Systems, available at http://www.geindustrial.com/cwc/services?id=75 on Jul. 18, 2002.
Ashish Mehta, et al., "Feedforward Neural Networks for Process Identification and Prediction," presented at ISA 2001, Houston, Texas, Sep. 2001.
Vasiliki Tzovla, et al., "Abnormal Condition Management Using Expert Systems," presented at ISA 2001, Houston, Texas, Sep. 2001.
"Control Charts as a Tool in SQC (Statistical Quality Control)" Control Charts as a Tool in SQC, available at http://web.archive.org/web/20060915172251/deming.eng.clemson.edu/pub/tutorials/qctools/ccmain1.htm on May 30, 2006.
"GE Predictor™ Services—Services Information," GE Industrial Systems, available at http://www.geindustrial.com/cwc/services?id=71 on Jul. 18, 2002.
"Root Cause Diagnostics: Software for Diagnosing Problems in Typical Industrial Loops," Kavaklioglu et al., presented at Maintenance and Reliability Conference (MARCON 2002), Knoxville, TN, May 2002.
Chiang et al., "Fault Detection and Diagnosis in Industrial Systems," pp. 70-83, Springer-Verlag London Berlin Heidelberg (2001).
Ellis et al., "Tutorial: Delayed Coking Fundamentals," AIChE 2000 Spring National Meeting—*International Conference on Refining Processes Topical Conference Preprints* pp. 1-21 (1998).
International Search Report for International Application No. PCT/US2006/039898, dated Mar. 17, 2006.
Written Opinion for International Application No. PCT/US2006/039898, dated Mar. 17, 2006.
International Search Report issued in PCT/US2005/020388 mailed on Oct. 19, 2005.
Written Opinion issued in PCT/US2005/020388 mailed on Oct. 19, 2005.
International Preliminary Report on Patentability issued in PCT/US2005/020388 dated Dec. 14, 2006.
Internet web page printout of internet access: http://www.cis.hut.fi/aapo/papers/NCS99web/node5.html "Principal component analysis" (Jan. 25, 2006).
Artioli et al., "Time-domain signal analysis for monitoring of electromechanical systems," *2004 IEEE International Conference on Industrial Technology (ICIT)*, pp. 154-158 (2004).
Zhang et al., "Dynamic Process Monitoring using Multiscale PCA," *Electrical and Computer Engineering, 1999 IEEE Canadian Conference on Edmonton, Alberta, Canada May 9-12, 1999*, pp. 1579-1584 (1999).
International Search Report and Written Opinion for International Application No. PCT/US2007/079986, dated Mar. 20, 2008.
Martin et al., "Process Performance Monitoring Using Multivariate Statistical Process Control," IEE Proc.-Control Theory Appl., vol. 143, No. 2, pp. 132-144, (Mar. 1996).

Internet web page printout of internet access: http://www.cis.hut.fi/aapo/papers/NCS99web/node5.html Hyvarinen, Aapo, "Principal Component Analysis" (Apr. 23, 1999).
International Search Report for International Application No. PCT/US2007/079856 dated Nov. 25, 2008.
Written Opinion for International Application No. PCT/US2007/079856 dated Nov. 25, 2008.
International Preliminary Report on Patentability for International Application No. PCT/US2007/079856 dated Mar. 31, 2009.
International Search Report for International Application No. PCT/US2007/079859 dated Jul. 7, 2009.
Written Opinion for International Application No. PCT/US2007/079859 dated Jul. 7, 2009.
Yoo et al., "On-line Monitoring of Batch Processes Using Multiway Independent Component Analysis," Chemometrics and Intelligent Laboratory Systems, Elsevier Science Publishers B.V. Amesterdam, NL, vol. 71, No. 2, May 28, 2004.
Albert et al., "Multivariate Statistical Monitoring of Batch Processes: An Industrial Case Study of Fermentation Supervision," Trends in Biotechnology, Elsevier Publications, Cambridge, GB, vol. 19, No. 2, Feb. 1, 2001.
International Search Report and Written Opinion for International Application No. PCT/US2007/079919 dated Jul. 17, 2008.
International Preliminary report and Written Opinion for International Application No. PCT/US2007/079919 dated Mar. 31, 2009.
International Search Report and Written Opinion for International Application No. PCT/US2007/079988, dated Jun. 16, 2008.
International Search Report and Written Opinion for PCT/US2007/079819 dated Mar. 20, 2008.
International Preliminary Report on Patentability for Application No. PCT/US2007/079819, dated Mar. 31, 2009.
International Preliminary Report on Patentability for Application No. PCT/US2007/079988, dated Mar. 31, 2009.
Communication pursuant to Article 94(3) EPC for Application No. 078434571.8 dated Nov. 29, 2010.
Fourie S. H. et al.: "Advanced process monitoring using an on-line non-linear multiscale principal component analysis methodology", Computers & Chemical Engineering, Pergamon Presss, Oxford, GB, vol. 24, No. 2-7, Jul. 15, 2000, pp. 755-760, XP0269817857, ISSN: 0098-1354.
"Be As Smart As Your Instruments," 1 page, (Apr. 1, 2001).
Abnormal Situation Management Consortium, www.asmconsortium.com, (available prior to Sep. 29, 2006).
Goulding et al., "Fault Detection in Continuous Processes Using Multivariate Statistical Methods," Control Technology Centre, School of Engineering, University of Manchester, Manchester, UK, (2000).
Helson, http://www.hartcomm.org, "Preventing Process Disruptions—The Solution Could Be In Your Smart Instruments," 4 pages, (Aug. 1, 2002).
Internet web page print out of internet access: http://www.hartcomm.org/technical/applications/app_main.html Pertaining to HART-based Applications, (available prior to Sep. 29, 2006).
Internet web page print out of internet access: http://www.hartcomm.org/technical/benefits.html Pertaining to Benefits of HART Communication , (available prior to Sep. 29, 2006).
Internet web page print out of internet access: http://www.hartcomm.org/technical/history.html Pertaining to the History of HART Protocol, (available prior to Sep. 29, 2006).
Internet web page print out of internet access: http://www.hartcomm.org/about/abouthcf.html Pertaining to an overview of the Hart Communication Foundation, (available prior to Sep. 29, 2006).
Internet web page print out of internet access: http://www.fieldbus.org/indes.php?option=com_content&task=view&id=136 &Itemid=307 Pertaining to the History of the Fieldbus Foundation, (available prior to Sep. 29, 2006).
Internet web page print out of internet access: http://www.fieldbus.org/indes.php?option=com_content&task=view&id=45 &Itemid=195 Pertaining to System Technology, (available prior to Sep. 29, 2006).

Internet web page print out of internet access: http://www.fieldbus.org/index.php?option=com_content&task=view&id=23&Itemid=308 Pertaining to an Overview of the Fieldbus Foundation, (available prior to Sep. 29, 2006).

Internet web page print out of internet access: http://www.hartcomm.org/technical/overview.html Pertaining to an Overview of HART Protocol, (available prior to Sep. 29, 2006).

Internet web page printout of internet access: http://www.hartcomm.org/technical/applications/commissioning.html "Commissioning HART Networks," (available prior to Sep. 29, 2006).

Internet web page printout of internet access: http://www.hartcomm.org/technical/applications/costsave.html "Cost-Saving Applications," (available prior to Sep. 29, 2006).

Internet web page printout of internet access: http://www.hartcomm.org/technical/applications/diagnostics.html "HART Communications and Advanced Diagnostics Work Together to Maximize the Productivity of Instrument Technicians," (available prior to Sep. 29, 2006).

Internet web page printout of internet access: http://www.hartcomm.org/technical/applications/dupont.html "DuPont Uses HART Data to Satisfy Safety Interlock System Valve Test Requirements," (available prior to Sep. 29, 2006).

Internet web page printout of internet access: http://www.hartcomm.org/technical/applications/enhanced_ddl.html "Enhanced DDL Capabilities Standardize Presentation of Intelligent Device Information—Information for Users and Automation Suppliers," (available prior to Sep. 29, 2006).

Internet web page printout of internet access: http://www.hartcomm.org/technical/applications/featappjune2.html "Continuous HART Communication Increases Safety Integrity Level (SIL)," (available prior to Sep. 29, 2006).

Internet web page printout of internet access: http://www.hartcomm.org/technical/applications/featappmay.html "Unmanned Offshore Gas Production with HART Networks," (available prior to Sep. 29, 2006).

Internet web page printout of internet access: http://www.hartcomm.org/technical/applications/featappsep.html "Be As Smart As Your Instruments," (available prior to Sep. 29, 2006).

Internet web page printout of internet access: http://www.hartcomm.org/technical/applications/hart_connection/hart_connection_main.html , http://www.hartcomm.org/technical/applications/hart_connection/hart_connection_1.html , http://www.hartcomm.org/technical/applications/hart_connection/hart_connection_2.html , http://www.hartcomm.org/technical/applications/hart_connection/hart_connection 3.html , http://www.hartcomm.org/technical/applications/hart_connection/hart_connection_4.html , http://www.hartcomm.org/technical/applications/hart_connection/hart_connection_5.html "The HART Connection," (available prior to Sep. 29, 2006).

Internet web page printout of internet access: http://www.hartcomm.org/technical/applications/invmgt.html "Inventiry Management Application," (available prior to Sep. 29, 2006).

Internet web page printout of internet access: http://www.hartcomm.org/technical/applications/multidrp.htm "HART Multidrop Networks," (available prior to Sep. 29, 2006).

Internet web page printout of internet access: http://www.hartcomm.org/technical/applications/multiplexer.html "Multiplexers," (available prior to Sep. 29, 2006).

Internet web page printout of internet access: http://www.hartcomm.org/technical/applications/network/compnet.html "Evaluating Fieldbus Networks—Choose the Right Tool for the Job," (available prior to Sep. 29, 2006).

Internet web page printout of internet access: http://www.hartcomm.org/technical/applications/nonhart.html "Reading HART Data Into Non-HART Systems," (available prior to Sep. 29, 2006).

Internet web page printout of internet access: http://www.hartcomm.org/technical/applications/openarch.html "Open Architecture Applications," (available prior to Sep. 29, 2006).

Internet web page printout of internet access: http://www.hartcomm.org/technical/applications/remote.html "Remote Operation Application," (available prior to Sep. 29, 2006).

Internet web page printout of internet access: http://www.hartcomm.org/technical/white_papers/white_papers.html Pertaining to White Papers for HART Communication, (available prior to Sep. 29, 2006).

Internet web page printout of internet access: http://hartcomm.org/technical/applications/calibrate.html "Calibrating HART Field Devices," (available prior to Sep. 29, 2006).

Internet web page printout of internet access: http://www.hartcomm.org/technical/applications/tenmisconceptions.html "Top 10 Misperceptions About HART Technology (or What You Thought You Knew But Didn't)," (available prior to Sep. 29, 2006).

Internet web page printout of Internet access: http://www.hartcomm.org/technical/applications/hart_beats.html "HART Beats Stronger," (available prior to Sep. 29, 2006).

Rosemount Product Documentation, Model 3051S Foundation Fieldbus Supplement, 00809-0200-4801, Rev, AA, www.rosemount.com, (available prior to Sep. 29, 2006).

"Root Cause Diagnostics☐ SNAP-ON☐ Application," Emerson Processing Management, available at http://www.documentation.emersonprocess.com/gaps/public/documents/data_sheets/allds04ole_ROOTCx.pdf (available prior to Sep. 29, 2006).

Communication pursuant to Article 94(3) EPC for Application No. 07843458.6 dated Jan. 20, 2011.

* cited by examiner

FIG. 26

MULTIVARIATE DETECTION OF ABNORMAL CONDITIONS IN A PROCESS PLANT

CROSS-REFERENCES TO RELATED APPLICATIONS

This application claims priority from U.S. Provisional Application Ser. No. 60/827,631, which was filed on Sep. 29, 2006, entitled "ON-LINE PRINCIPAL COMPONENT ANALYSIS IN A DISTRIBUTED CONTROL SYSTEM." The above-referenced provisional patent application is hereby incorporated by reference herein, in its entirety.

TECHNICAL FIELD

This disclosure relates generally to process plant diagnostics and, more particularly, to monitoring and diagnostic systems involving multivariate statistical techniques.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART® and Fieldbus field devices. The control modules in the process controllers send the control signals over the communication lines or signal paths to the field devices, to thereby control the operation of the process.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, and diagnosing problems or hardware failures within the process plant.

As is known, problems frequently arise within a process plant environment, especially a process plant having a large number of field devices and supporting equipment. These problems may take the form of broken or malfunctioning devices, logic elements, such as software routines, residing in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software, such as the DeltaV™ and Ovation® control systems, sold by Emerson Process Management. These control systems have numerous control module and control loop diagnostic tools. Likewise, maintenance workstations, which may be connected to the process control devices, such as field devices, via the same communication connections as the controller applications, or via different communication connections, such as object linking and embedding (OLE) for process control (OPC) connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, software available commercially as the AMS™ Suite: Intelligent Device Manager from Emerson Process Management enables communication with and stores data pertaining to field devices to ascertain and track the operating state of the field devices. See also U.S. Pat. No. 5,960,214 entitled "Integrated Communication Network for use in a Field Device Management System." In some instances, the AMS™ software may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants have included software applications such as, for example, the Machinery Health® application provided by CSI Systems, to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, or to calibrate field devices or other equipment.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, now U.S. Pat. No. 7,085,610, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect process variable data and determine certain statistical measures associated with the collected data, such as the mean, median, standard deviation, etc. These statistical measures may then be sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Principal Component Analysis (PCA) is a multivariate data analysis technique that has been used in the process control industry for analysis of multidimensional data sets. PCA techniques generally involve reducing data from a high-dimensional space to a lower-dimensional space, which still explains most of the significant variations in the original data. For example, PCA may be used to reduce the dimensionality of a multivariable data space (e.g., multidimensional data) to a data space of a few dimensions (e.g., 2 or 3 dimensions), such that the multidimensional data is projected (scored) onto a lower dimensional principal component space. Further details regarding the typical implementation of PCA techniques for fault detection in industrial processes may be found in L. H. Chiang, et al., "Fault Detection and Diagnosis in Industrial Systems," Springer-Verlag London Limited, pp. 35-54 (2001), and E. L. Russell, et al., "Data-Driven Techniques for Fault Detection and Diagnosis in Chemical Processes," Springer-Verlag London Limited, (2000).

A number of software packages provide PCA functionality, but most of these packages utilize offline process data from a database. In other words, PCA has been an off-line multivariate statistical analysis tool. This is useful for an after-the-fact analysis of an abnormal situation in the process data, such as historical data or stored multidimensional data files, but it cannot be used to detect the abnormal situation in real time (e.g., on-line, at-line or in-line data analysis). Some existing PCA software packages may be capable of doing real-time analysis of the data, but only if the software would have access to the process data from the control system, often through an interface such as an OPC server. As a result, plant personnel would unfortunately have the burden of maintaining a software package separate from the control system, including supporting its access to, and interface with, the control system. Further, detection of abnormal process situations should be available at all times and for various abnormal situations (e.g., a continuous process vs. a one-time solution), in order for the abnormal situation prevention tools to exhibit alertness and accuracy at various times for various abnormal situations.

Traditional PCA techniques also may fail to easily convey information indicative of process dynamics. The results of PCA analysis, i.e., the scores, are often displayed through scatter plots that are static representations of the underlying process data. Regardless of the manner in which score data is recorded or interpreted in the scatter plots, there will generally be a small uncertainty associated with data being characterized incorrectly. As described below, without more information, a process operator often cannot be certain that a given score is normal or abnormal. For example, the first two principal components of a PCA analysis capture the largest variations in the multidimensional data, such that the first two scores from a PCA analysis may be plotted because they represent the most significant information about the behavior of the multidimensional data, including the largest variations in the process.

For these reasons, traditional PCA techniques have exhibited unreliable performance in the detection of abnormal situations. A PCA score can suggest an abnormal situation when one does not exist (i.e., a false alarm), and conversely can indicate normal operation when the process is behaving abnormally (i.e., missed diagnostics). Further, in order to implement PCA, a PCA model is developed using training data (e.g., data from a "normal" process operation), and the resulting model is applied for detecting abnormal process situations. The training data is used to derive the model in terms of the principal components. As such, the PCA scores are not directly related to the actual process variables, and the physical process limits of the process variables being monitored using PCA are lost in the analysis, thereby requiring a statistical interpretation (e.g., to quantify the "goodness of data").

SUMMARY OF THE DISCLOSURE

In accordance with certain aspects of the disclosure, a number of techniques are disclosed to facilitate the detection of an abnormal operation of a process, such as a coker heater, and any elements thereof. Collected on-line process data is generated from a plurality of dependent and independent process variables of the process. A plurality of multivariate statistical models of the operation of the process are generated using corresponding sets of the process data. The multivariate statistical models may be generated from principal component analysis (PCA). Each model may be used as a measure of the operation of the process when the process is on-line at different times, and at least one model may be used as a measure of the operation of the process when the process is on-line and operating normally. The models are executed to generate outputs corresponding to loading value metrics of a corresponding dependent process variable, and the loading value metrics are utilized to detect abnormal operations of the process. By monitoring the loading value metrics of the same dependent process variable, process behavior may be monitored for changes in behavior, including slow-changing process behavior due to structural changes in the loading space resulting from changes in the dependent process variables.

BRIEF DESCRIPTION OF THE DRAWINGS

FIGS. 26 and 27 are exemplary user interface displays generated by the MMDM tool in connection with the PCA-based monitoring, diagnostics and fault detection for the fired heater of FIG. 24;

DETAILED DESCRIPTION

Figure 1:
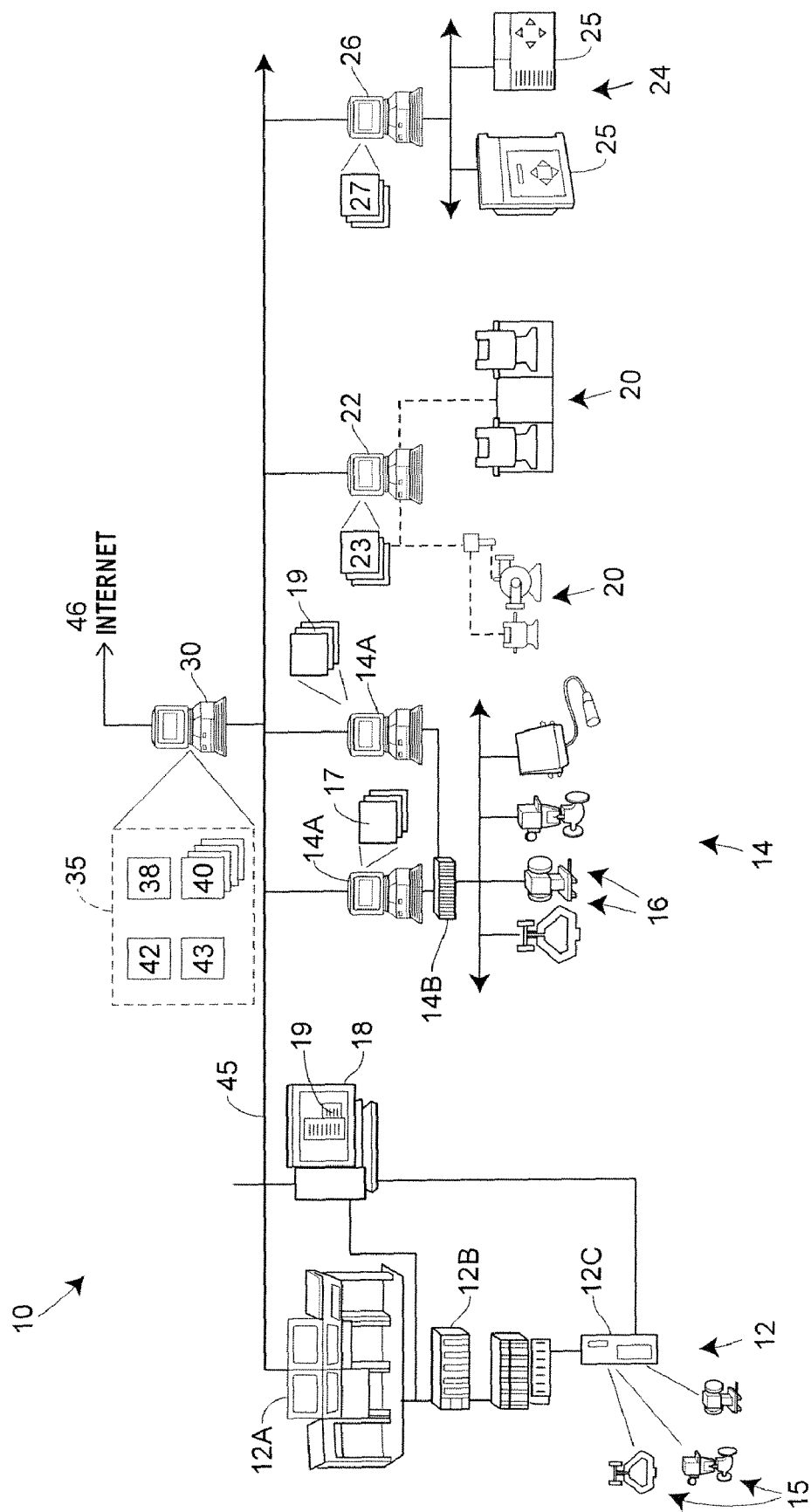
FIG. 1 is an exemplary block diagram of a process plant having a distributed process control system and network including one or more operator and maintenance workstations, controllers, field devices and supporting equipment.

Referring now to FIG. 1, an exemplary process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PRO-VOX or RS3 system or any other control system which includes an operator interface 12A coupled to a controller 12B and to input/output (I/O) cards 12C which, in turn, are coupled to various field devices such as analog and Highway Addressable Remote Transmitter (HART)® field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART® or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ application and/or the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating (and other) equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by CSI (an Emerson Process Management Company), as well the applications, modules, and tools described below, to diagnose, monitor and optimize the operating state of the rotating equipment 20 and other equipment in the plant. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, a number of embodiments of which will be described in more detail below. Additionally, the computer system 30 may implement an alert/alarm application 43.

Generally speaking, the abnormal situation prevention system 35 may communicate with (or include) abnormal operation detection systems, modules or tools (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC (or OLE for process control), intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well. In any case, the abnormal situation prevention system 35 may communicate with, and receive process variable data from, any of the computers, devices or other aspects of the plant 10, including, but not limited to a process control system (e.g., DeltaV™, Ovation® or other distributed control systems), devices and computers that conform to various standards or protocols (e.g., FOUNDATION™ Fieldbus, HART®, OPC, Modbus, wireless, etc.), and various transmitters, sensors and actuators which may be implemented with the devices or distributed throughout the process plant 10. As discussed further below, the data received and used by the abnormal situation prevention system 35 may be historical data, such as data from a data historian, but may also be on-line data (e.g., data collected when the process is on-line), which includes, but is not limited to, data collected on-line, at-line or in-line, as well as data collected in real-time as the process is operating.

By way of background, OPC is a standard that establishes a mechanism for accessing process data from the plant or process control system. Typically, an OPC server is implemented in a process control system to expose or provide process information from, for example, field devices. An OPC client creates a connection to an OPC server and writes or reads process information to or from a field device. OPC servers use OLE technology (i.e., Component Object Model or COM) to communicate with such clients so that the software applications implemented by the clients can access data from the field devices or other process plant equipment.

Figure 2:
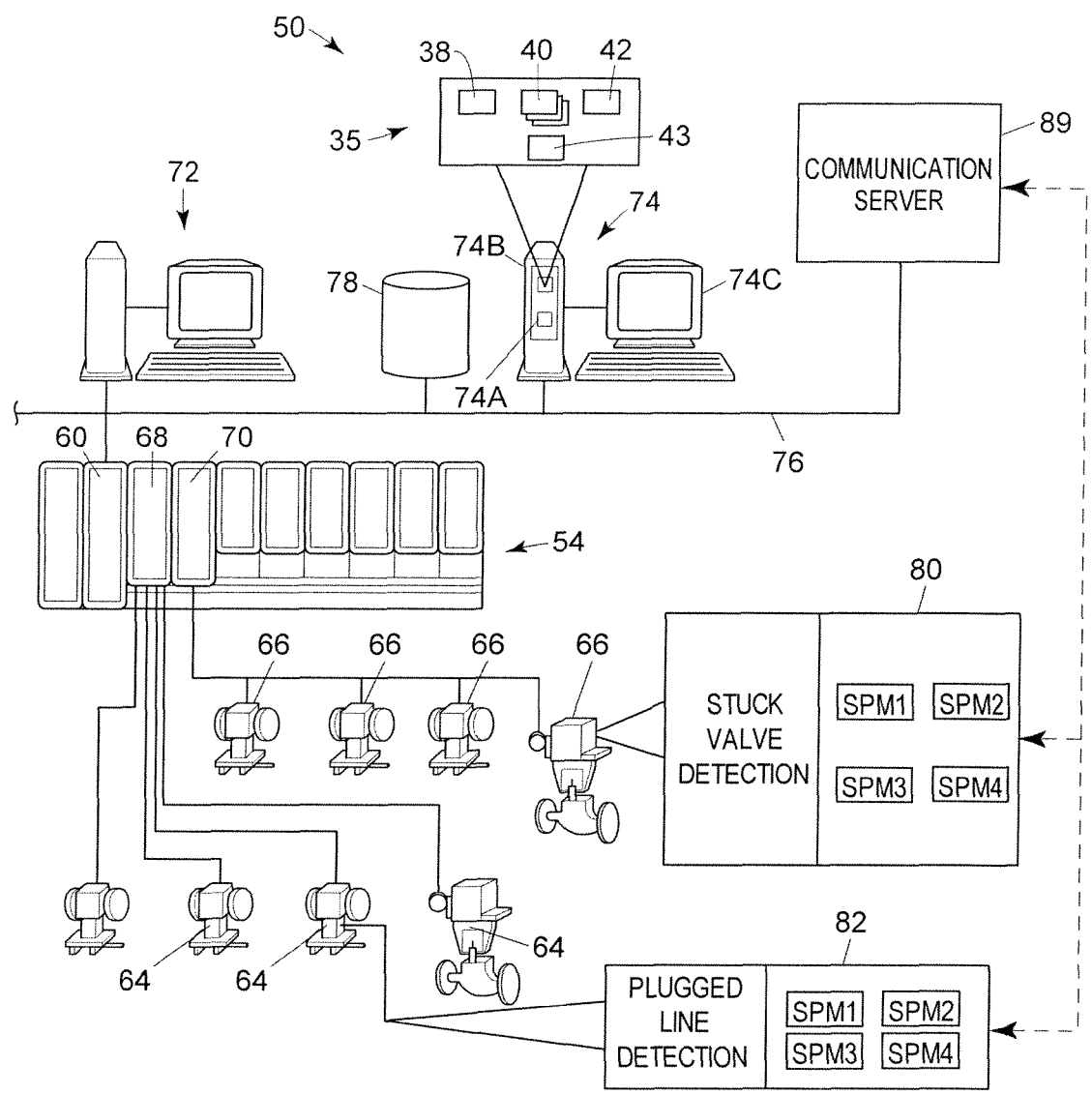
FIG. 2 is an exemplary block diagram of a portion of the process plant of FIG. 1, illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART® and Fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART® field devices and the field devices 66 are illustrated as Fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection (i.e., abnormal situation prevention) blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such as process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve process variable data to determine if the valve is in a stuck condition. In addition, the block 80 may include a set of one or more statistical process monitoring (SPM) blocks or units such as blocks SPM1-SPM4 which may collect process variable or other data within the valve and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated, is critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known FOUNDATION™ Fieldbus SPM blocks, or SPM blocks that have different or additional capabilities as compared with known FOUNDATION™ Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the FOUNDATION™ Fieldbus protocol, or some other protocol, such as Profibus, HART®, CAN, etc. protocol. If desired, the underlying operation of blocks 80, 82 may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM blocks located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may includes one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Further details regarding the implementation and configuration of abnormal situation prevention systems and components thereof can be found in U.S. Pat. Publ. No. 2005/0197803, now U.S. Pat. No. 7,079,984 ("Abnormal situation prevention in a process plant"), U.S. Pat. Publ. No. 2005/0197806 ("Configuration system and method for abnormal situation prevention in a process plant"), and U.S. Pat. Publ. No. 2005/0197805 ("Data presentation system for abnormal situation prevention in the process plant"), each of which is hereby incorporated by reference for all purposes.

In the abnormal situation prevention systems and techniques described above and in the referenced documents, the SPM (or abnormal situation prevention) blocks 80, 82 may be associated with, or considered components of, one or more abnormal situation prevention modules. While abnormal situation prevention blocks may reside in a field device, where the faster-sampled data is available, abnormal situation prevention modules may reside in a host system or controller. The abnormal situation prevention modules may take data from one or more abnormal situation prevention blocks, and use the data to make a decision about the larger system. More generally, an abnormal situation prevention module may be developed and configured to receive data from one or more function blocks (e.g., abnormal situation prevention blocks) to support diagnostics for each type of field device, instrumentation or other equipment (e.g., valve, pump, etc.). Nonetheless, the function blocks associated with an abnormal situation prevention module may reside and be implemented by devices other than the specific equipment for which it was developed. In such cases, the abnormal situation prevention module has a distributed nature. Other abnormal situation prevention modules may be implemented entirely within one device, such as the process controller 60, despite being directed to diagnostics for a specific field device. In any event, a diagnostics routine or technique may be developed for each equipment type for detecting, predicting and preventing abnormal situations or operation of the equipment (or process). For ease in description only, the term "abnormal situation prevention module" will be used herein to refer to such routines or techniques. An abnormal situation prevention module is therefore responsive to a set of measurements needed to perform the diagnostics, and further includes (i) a set of abnormal conditions to be detected by the module, and (ii) a set of rules, which link a change in the measurements to a corresponding abnormal condition. Furthermore, references to abnormal situation prevention modules in the description of the disclosed techniques to follow are set forth with the understanding that the techniques may be utilized in conjunction with abnormal situation prevention blocks as well.

In some cases, the configuration application 38 or other component of the abnormal situation prevention system 35 may support the development or generation of a template for each abnormal situation prevention module. For example, the configuration and development platform provided by the DeltaV™ control system may be used to create specific instances, or instantiations, of abnormal situation prevention modules from corresponding composite template blocks.

Although shown and described in connection with FIG. 2 as abnormal situation prevention functionality, the modules and blocks described above may be more generally directed to implementing multivariate statistical techniques configured for process monitoring and diagnostics and fault detection as described below. In some cases, the techniques described below may include or be integrated with abnormal situation prevention modules or blocks. In any case, references below to systems and techniques (and any modules, function blocks, applications, software or other components or aspects thereof) may be utilized, included, be integrated with, or otherwise be associated with the workstation tools 17, 19, operator interfaces 12A, 14A, applications 23, abnormal situation prevention system 25 and interfaces 72, 74 described above.

The monitoring and diagnostics techniques described herein may be used to detect abnormal operations, also referred to as abnormal situations or abnormal conditions, that have occurred or are occurring. In addition, the monitoring and diagnostics techniques may be used to predict the occurrence of abnormal operations before these abnormal operations actually arise, with the purpose of taking steps to prevent the predicted abnormal operation before any significant loss within the process or the process plant takes place, for example, by operating in conjunction with the abnormal situation prevention system 35.

Figure 3:
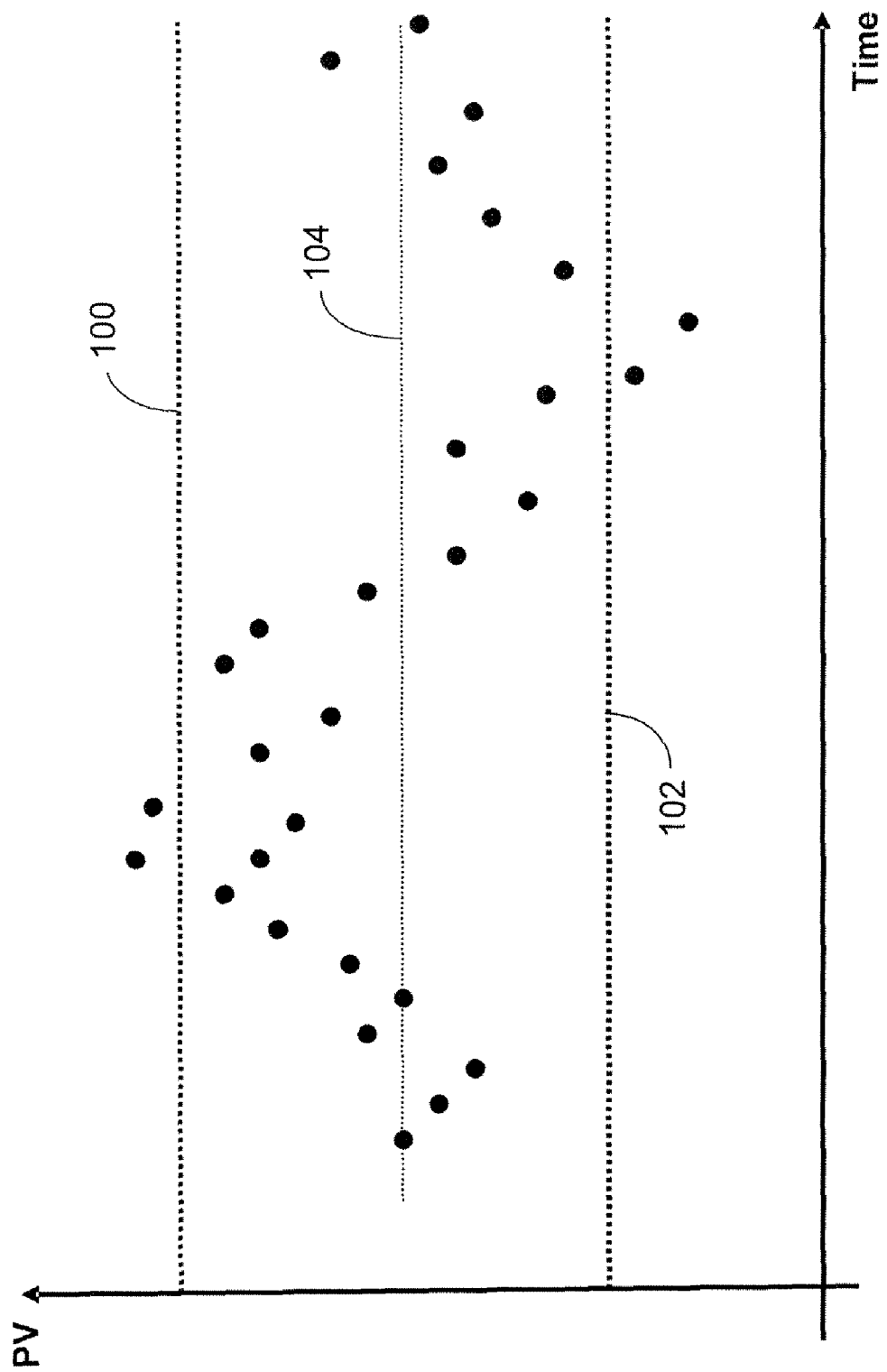
FIG. 3 is a graphical plot of a process variable over time with operational requirements or control limits for monitoring operation of the process plant.

Turning to FIG. 3, a number of multivariate monitoring and diagnostic techniques described herein may build on and incorporate visualization and other aspects of multivariate and univariate diagnostics tools. For example, the process variable (PV) is shown with its corresponding process requirements in FIG. 3 in a chart often referred to as a Shewhart chart. Each process variable may be described in terms of the Shewhart chart, which plots the variable relative to an upper control limit (UCL) 100, a lower control limit (LCL) 102, and a Target value 104. The UCL 100 and LCL 102 are real physical limits and not statistical limits. During operation, each process variable is preferably constrained between its UCL and LCL, with the ideal value for the process variable being the Target value. Within these limits, the process variable is said to be in-control, otherwise it is said to be out of control. As indicated, the UCL and LCL represent physical limits, which may be provided by the process operating requirements. Although this manner of visualization is based on a multidimensional view of process variable data, this description of the process variables may be useful in combination with further visualization techniques based on process variable normalization, as described below.

However, a brief summary the algorithm underlying PCA is provided for reference to the various aspects that will be described further below. Although PCA is disclosed herein as a multivariate statistical analysis that may be used with various aspects of this disclosure, it should be understood that other multivariate statistical analyses may be used in place of PCA, including, but not limited to, Principal Component Regression (PCR), Partial Least Squares (PLS), Fisher Discriminant Analysis (FDA) and Canonical Variate Analysis (CVA).

For a given process, process unit, process device, etc., there are numerous measured process variables. Each of these can be used as an input variable to the PCA algorithm. Data from each of the process variables is collected either for a certain length of time, or a certain number of points, and are referred to herein as observations of the process variable. Generally, all of the process variables used in PCA are sampled simultaneously.

If m is the number of input variables, and n is the number of observations of each input variable, then the matrix X is an n×m matrix which contains all of the observations for all input variables. In a typical process, some variables have magnitudes significantly larger than others. In order to ensure that all process variables have an equal effect on the PCA model, the X data may be autoscaled (for each input variable, subtract the mean and divide by the standard deviation). After the input variables are autoscaled, the sample covariance matrix is calculated by: $S=X^T \cdot X/(n-1)$, where T is a transpose operation of the matrix X.

An Eigenvalue-Eigenvector decomposition is performed on the sample covariance matrix: $S=V \cdot D \cdot V^T$, where D is a diagonal matrix containing the m Eigenvalues, sorted from largest to smallest. The columns of V are the corresponding Eigenvectors, and T is a transpose operation of the matrix V. The largest Eigenvalue, and its corresponding Eigenvector, correspond to the direction in the original input spaces containing the largest amount of variation in the original process data. This is considered the first principal component. The second largest Eigenvalue, and its corresponding Eigenvector, correspond to the direction, orthogonal to the first principal component, containing the next largest amount of variation. This continues until a new orthogonal vector space, explaining all of the original process data, is created.

After the Eigenvalues and Eigenvectors are computed, PCA determines which ones of the Eigenvalues and Eigenvectors are the significant principal components, usually corresponding to the important variation in a process, and which are insignificant, usually corresponding to noise. There are many different methods that have been proposed for selecting the number of significant principal components, including Kaiser's Rule (i.e., selecting principal components with Eigenvalues greater than one), percent variance test (i.e., selecting the number of principal components that explain a certain percent (e.g., 80% or 90%) of the total variation in the data), parallel analysis, and cross-validation.

Whichever method is utilized, the final result determines the number of significant principal components, a, that will be retained for the PCA model. Then, the loading matrix $P \in \Re^{m \times a}$ is created by taking the first a columns from V. The projection of the original observations onto the subspace defined by the loading matrix is called the score matrix, and denoted by $T=X \cdot P$. The columns of T are called the scores of the PCA model, referred to as $t_1, t_2, \ldots t_3$. The loading matrix P, along with the means and standard deviations used in the autoscaling, are considered together to be the PCA model. This PCA model may then be applied to any future data set.

After the PCA model is created, statistically-based limits, based on the original process data, may be created for defining the normal operation of the process defined by the original data. One method that is used is Hotelling's $T^2$ test, though it should be understood that other methods for deriving statistically-based limits may be utilized. When the scores exceed the limit, it can be an indication that something is abnormal in the process. Also, 2-σ and 3-σ limits, which accordingly limit the amount of variation, may alternatively be applied.

One can make several plots, based upon score data from the PCA model. The simplest plot is a plot of one of the scores versus time. In this plot, upper and lower limits are created based on statistics, and an alarm could be triggered if either threshold is exceeded. A second common plot is a scatter plot of two of the scores. Most often the first two scores, $t_1$ and $t_2$, are plotted, because these describe the largest amount of variation in the process. A number of exemplary two-score scatter plots are shown in the user interfaces described below. In these and other cases, the statistical-based limit may include or involve a circle or ellipse around the normal process data. Again, an alarm could be triggered if scores exceed these limits.

Figure 4:
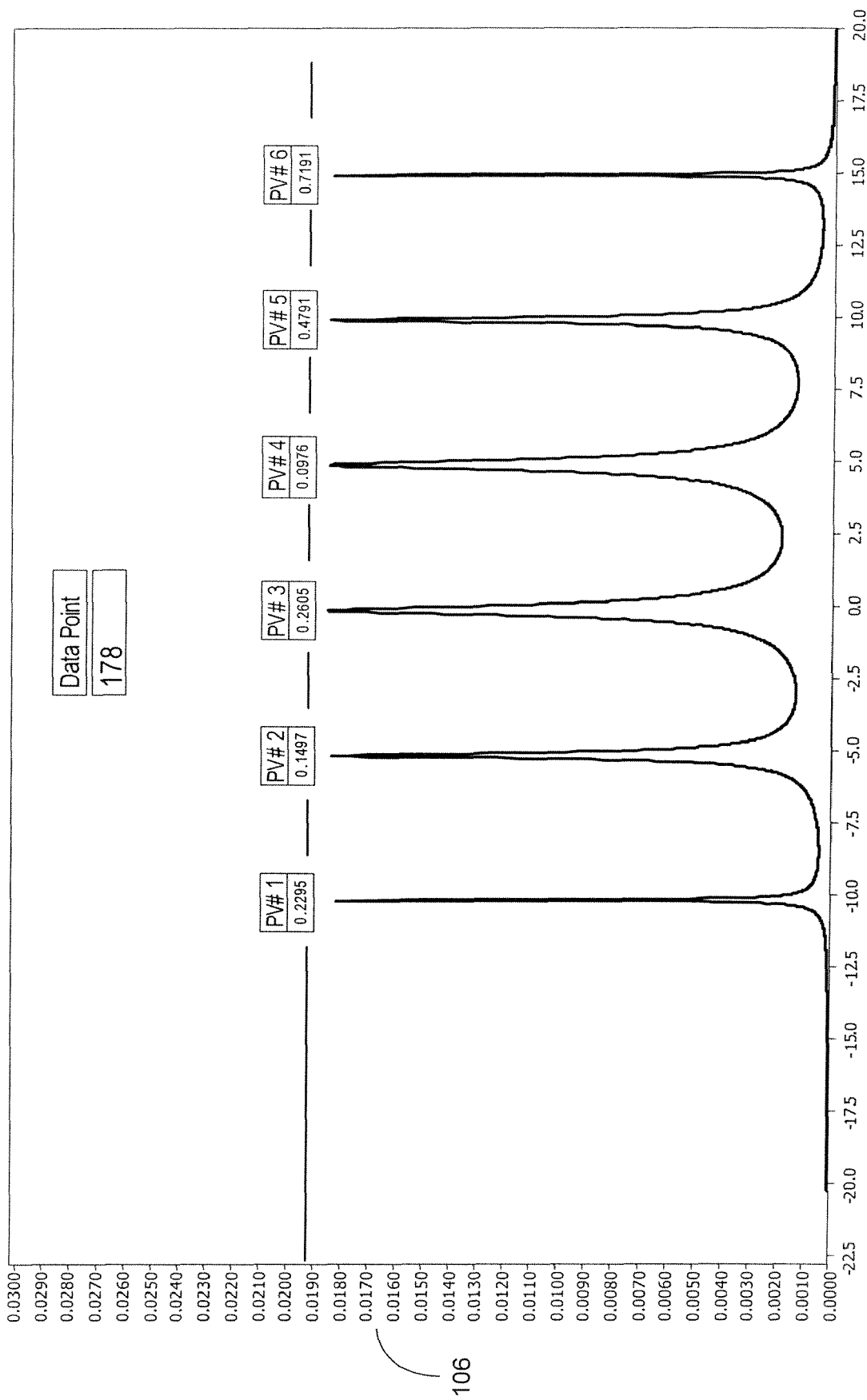
FIG. 4 is a graphical, multivariate visualization or plot of a number of process variables relative to operational requirements or control limits, the visualization or plot being suitable for incorporation into a user interface generated in accordance with certain embodiments and aspects of the disclosure for on-line process monitoring.
Figure 5:
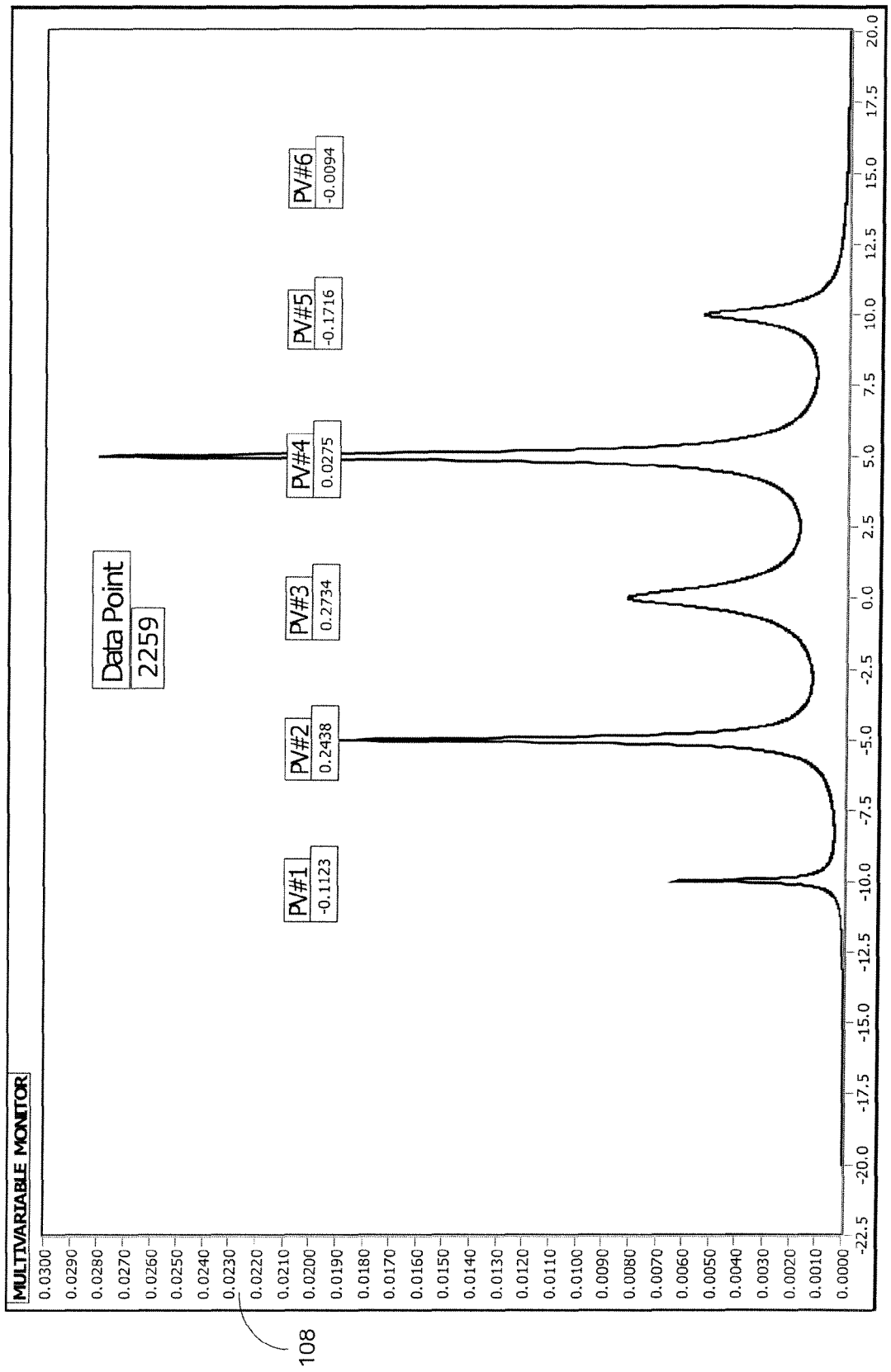
FIG. 5 is another view of the visualization plot of FIG. 4 after one of the process variables has exceed the operational requirement or control limit, which may be indicative of an abnormal situation or fault condition.

Turning to FIGS. 4 and 5, and in accordance with an aspect of the disclosure generally directed to supporting on-line monitoring and analysis of multivariate real-time process data, a process visualization technique utilizes the control limits within a multidimensional (or multivariate) set of process variable data, such as the control limits associated with the Shewhart chart above. Despite the multivariate data set, the limits may be represented in univariate form using a transformation, such as the one described below. Generally speaking, the transformation may be based on a univariate technique for monitoring multivariate data. Using the technique, process data and control limits of any number of process variables can be normalized and brought to the same standard by using a single projection parameter.

By contrast, there exist different statistical tools for off-line applications, and some of them can be used for on-line monitoring. For instance, as discussed above, Principal Component Analysis (PCA) is a technique often used to reduce dimensionality of multivariable data space to a few dimensions (often two to three). However, to implement PCA, the PCA model is developed using training data, or data from a "normal" process operation, and then the model is applied for further monitoring of the process. As discussed above, the model derived is in terms of the principal components, which are essentially dominant eigenvectors of the covariance matrix determined by the training data. As such PCA results, also referred to as scores, are not directly related to the true process variables, and hence the physical process limits of variables monitored are lost in analysis. For this reason, when using PCA tool, some statistical interpretation is often used to quantify "goodness of data", (i.e., 95% or 99% confidence intervals are computed using Hotelling's $T^2$ statistics).

Using a univariate analysis, a deterministic method is proposed for monitoring multivariate process data with a single monitoring variable. The method can be applied easily in both off- and on-line data monitoring and analysis applications. The method and model development are described as follows.

At the outset, $X_1, X_2, \ldots, X_n$ are disclosed as representing the process variables. Each variable $X_i$, $i=1, \ldots, n$, is a vector containing time dependent data $x_{i,j}$, where j designates a j-th sample or component of $X_i$. For example, $X_i=[x_{i,1}, x_{i,2}, \ldots, x_{i,m}]^T$ where T implies a transpose operation on $X_i$, and m is the vector dimension that is determined by the data sampling rate and the total time of data collection. With such nomenclature each process variable is described according to the transformation, $p_i=[(y-\alpha_i)^2+k_i x_{i,j}^2]$, where $i=1, \ldots, n$, and $j=1, \ldots, m$, and where y is a variable designated to bundle together multivariable process variables, $\alpha_i$ is a unique position assigned for variable $X_i$, $k_i$ is a scaling parameter and $x_{i,j}$ is the j-th component of $X_i$. Since the transformation $p_i$ can uniquely be defined for each variable $X_i$, $i=1, \ldots, n$, then the multivariable transformation can be defined as $P(y)=p_1(y)*p_2(y) \ldots *p_n(y)$.

Next P is used to derive the projection model $M_v(y)=K_p/P(y)$, where $K_p$ is a scaling factor and $M_v(y)$ designates a multivariate projection. Using these assignments, multivariate data is projected by the single variable y.

FIGS. 4 and 5 illustrate the resulting visualization of multiple process variables (PV1, PV2, etc.) on a single plot in relation to the respective physical operating limits for each variable. FIG. 4 depicts a plot 106 for a data point in which each of the process variables remain within the operating limits. FIG. 5 depicts a plot 108 for another data point, one in which one of the process variables may have exceed its control limit.

To further illustrate this method (including how the visualization indicates that a control limit has been exceeded), an example is provided using six process variables, $X_1$, $X_2$, $X_3$, $X_4$, $X_5$ and $X_6$. Under normal operating conditions, each of these variables has an operating limit defined by $|X_{iL}|$ (with the assumption that data points are centered). With this information each transformation $p_i$ is tuned to the same level with coefficients $k_i$ so the visualizations in FIGS. 4 and 5 are obtained. This effectively defines a group of multivariate monitor settings. As can be seen, each of the six process variables has a unique position, given by $\alpha_i$'s=−10, −5, 0, 5, 10, 15, with respect to the variable y (the horizontal axis). Furthermore, all process variables are tuned by the parameters $k_i$s to achieve the equal maximum response, or limit, for the maximum operating ranges given by $X_{iL}$s.

Now if during the monitoring stage any of the six peaks pierce through the process variable indicators, then that particular variable will have encountered an out of range event. This is shown in FIG. 5. As can be seen, process variable #2 is marginal with respect to the allowable limit, while process variable #4 clearly exceeds the limit. Nonetheless, the situation depicted in FIG. 5 clearly illustrates the normal operating condition for the six process variables.

During the monitoring stage, the events of FIGS. 4 and 5 are not isolated, or stand alone, events. They are in reality visual snippets, or frames, of continuously changing variables. That is, as new process data enters the model (at a given sampling rate) the response changes instantly. The monitoring image is therefore refreshed in accordance with the sampling rate, which may be anywhere from 0.1 to 1 second, or longer.

In this monitoring approach, when the limits for all process variables are known, the disclosed method does not require training data. For example, to create the multivariate monitor, one applies the design procedure described above and the univariate model is completed, which is not possible with other approaches. In other cases, if the process variable limits are not all known, then training data for the process variables without predefined limits may be used to determine process variable limits under normal process operating conditions, and the model can then be computed. In the case of either known or unknown limits, each of the process variables may be normalized using the univariate analysis method to define a common process variable limit (see e.g., FIG. 4), and each of the process variables may be monitored relative to the common process variable limit. Further examples of normalization, using both known and unknown process variable limits, as discussed further below and may be implemented with the univariate analysis method.

The disclosed univariate analysis method is not restricted to any particular set or type of process variables. It can be applied to any mix of process variables, (e.g., process inputs, outputs and external variables). In addition the univariate method offers a unique way for creating and analyzing process data patterns. These patterns can further be used for process diagnostics, including abnormal situation prevention applications. For instance, if most of the time two or more peaks have a tendency to move synchronously up or down, then the corresponding process variables are correlated. Otherwise the variables are uncorrelated. Similarly, the univariate technique can be used to evaluate whether a process variable is malfunctioning. In short, the disclosed univariate data modeling and visualization method offers a technique to implement multivariate monitoring, for either on-line and off-line contexts using a single variable. The method does not require training data if the limits of all process variables are known, and as such it provides monitoring results that can easily be interpreted by the process operators.

Further information is now provided regarding three alternative methods that may be used for normalizing process variables for display in the form illustrated in FIGS. 4 and 5. To describe them, the typical process variable description illustrated in FIG. 3 (the Shewhart chart) may be considered. In this figure, the process variable is constrained between the UCL 100 and the LCL 102, and the ideal value for the process variable is the Target value. Within these limits, the process variable is said to be in-control, otherwise it is said to be out of control. As discussed above, UCL and LCL represent physical limits which may be provided by the process operating requirements. Based on this, the following data normalization methods may be utilized.

The first method may be used when process variable control limits are known for each process variable. In particular, the process variable, PV, may be normalized as a function of the control limits and the Target value:

$$PV^* = 100\% \times n \times \sqrt{\frac{(PV-T)^2}{CL^2}}, \text{ with } 0 < n < 1$$

where Target=T, CL=|UCL−T|=|LCL−T|.

A second method may be used when process variable control limits are not known for all of the process variables. In particular, the process variable, PV, may be normalized as a function of the training data set collected for the process variable when the process is operating normally, which includes the observations of the process variable within the training data set:

$$PV^* = 100\% \times n \times \sqrt{\frac{(PV-M_{PV})^2}{CL^2}}, \text{ with } 0 < n < 1$$

where the normal process operation is represented by the training data set T {PV}, $M_{PV}$ is the mean of T {PV}, and CL=|PV−$M_{PV}$|$_{max}$ in T {PV}.

A third method uses a statistical autoscaling approach, which may also be used when process variable control limits are not known for all process variables. In particular, the process variable, PV, may be normalized as a function of the training data set collected for the process variable when the process is operating normally, which includes the observations of the process variable within the training data set:

$$PV^* = 100\% \times n \times \sqrt{\frac{(PV-M_{PV})^2}{k^2 \sigma^2}}, \text{ with } 0 < n < 1$$

where the normal process operation is represented by the training data set T {PV}, $\sigma^2$ is the variance of T {PV}, $M_{PV}$ is the mean of T {PV}, and kσ, k=1, 2, . . . , n determines a statistical control limit (e.g., 3σ).

Variations of these methods and other user defined control limits (and methods of determining them) may be utilized in connection with the disclosed techniques as desired.

The above-described data monitoring and analysis technique is ideal for a rapid on-line visualization and understanding of process data behavior. It can be used in process diagnostics and abnormal situation prevention applications. For instance data from multiple intelligent devices spread over a Fieldbus can rapidly be analyzed and monitored. The same is true for data from sensor arrays and bio-microarrays. The monitoring results can also be used for process optimization and quality control. Furthermore, the method can be used with statistical data modeling methods to enhance data analysis. For instance, it can be used in parallel with the PCA method in order to speed-up and enhance interpretation of scored data.

In accordance with certain aspects of the disclosure, the above-described visualization techniques may be integrated in an operator interface that displays the process data in other ways, such as after processing via other multivariate statistical techniques, as described below. For example, the visualization of process variables with respect to their physical limits can be used in conjunction with a PCA score plot to enable more accurate decisions about the current state of the process.

The above-described univariate technique may be incorporated into a deterministic multivariate data analysis tool (examples of which are described below) that offers a method for monitoring multivariable real-time process data. In this way, the single variable monitoring model may be used for visualization of the behavior of multivariate data.

More generally, an advantage of this approach is that all process variables are bundled together within a single monitoring variable. The disclosed univariate method is well suited for both on-line and off-line applications. As mentioned above, the disclosed method requires no training data when the operational limits of all process variables are known. The operational limits associated with process variables are used to develop the single variable monitoring model. In some cases, training data may be used for process variables for which the operational limits are not known. The model may be implemented on a number of software platforms, including, for instance, DeltaV™.

Figure 6:
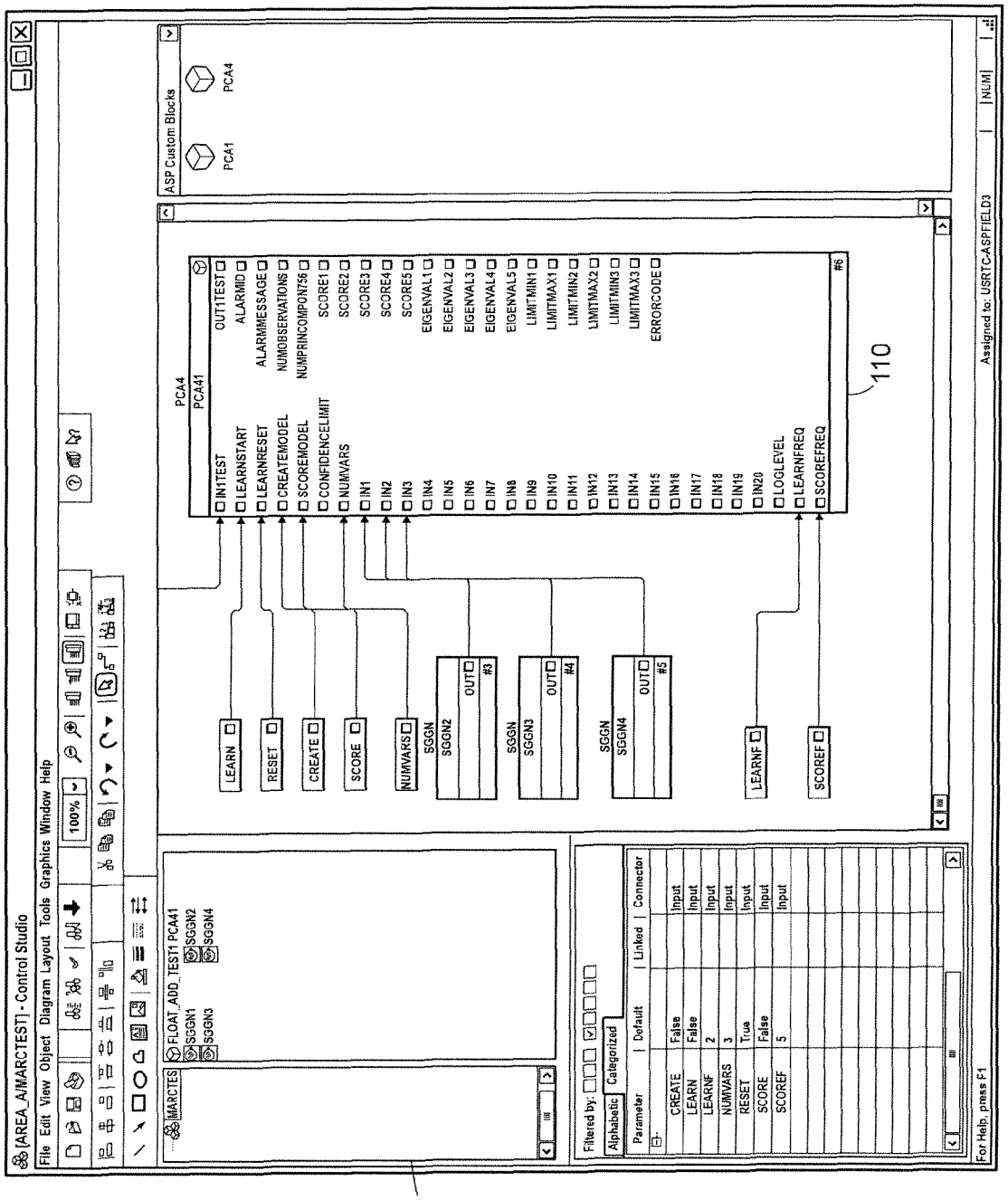
FIG. 6 is a representation of an exemplary function block configured for implementing principal component analysis (PCA) techniques and instantiated within a process control system for training and operation in accordance with one aspect of the disclosure.
Figure 7:
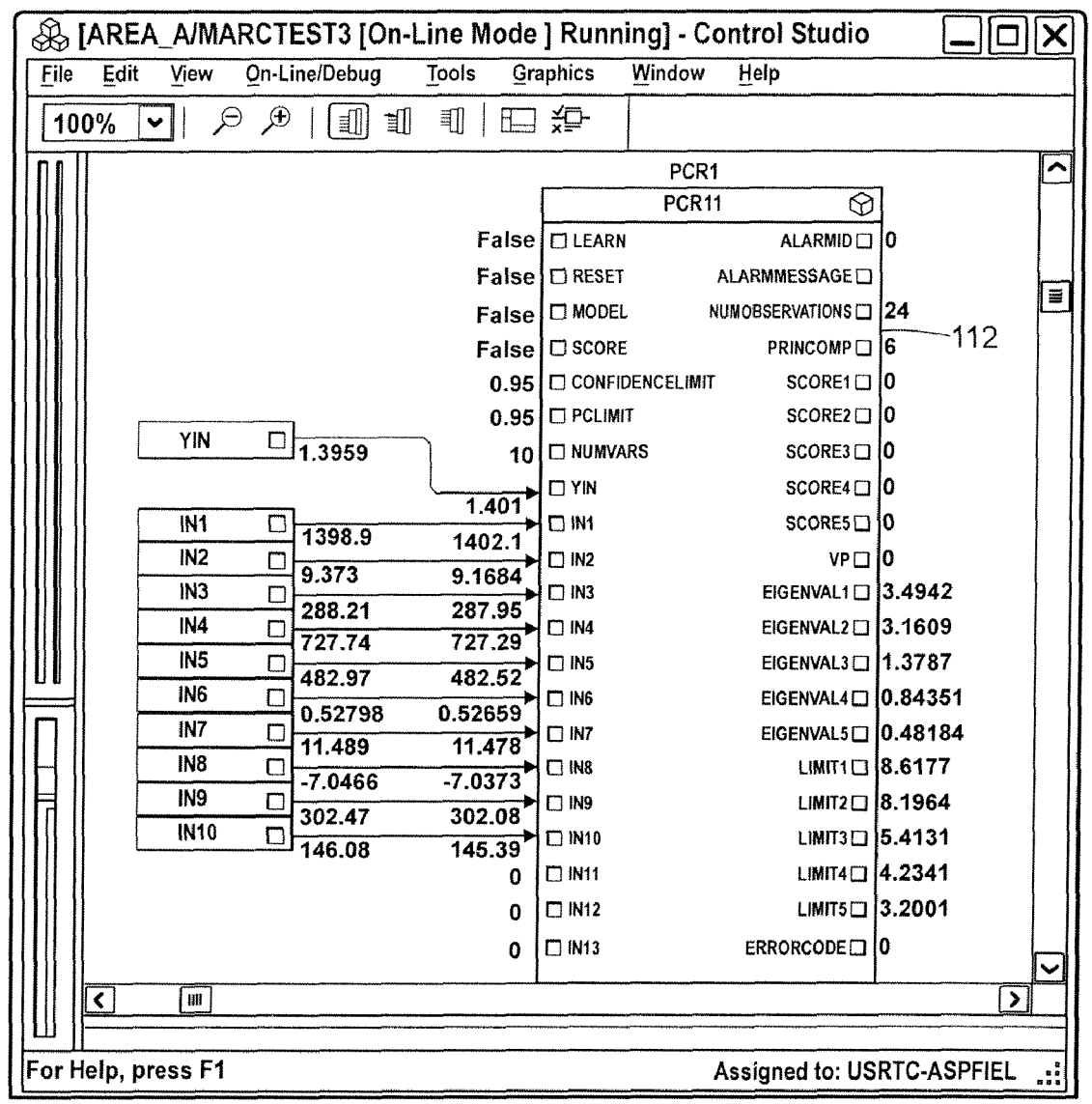
FIG. 7 is a representation of another exemplary PCA function block shown during implementation of the PCA techniques in accordance with another aspect of the disclosure.

With reference now to FIGS. 6 and 7, another aspect of the disclosure is directed to the functionality provided by principal component analysis (PCA) and other multivariate statistical techniques. The PCA and other multivariate statistical techniques described below may be integrated components of a process control system, such as the distributed control systems DeltaV™ and Ovation®. Such integration supports the plant personnel utilization of PCA techniques for on-line monitoring applications. As described below, the visualization and alarms supported by the PCA and other techniques may be fully integrated into the control system along with other visualization schemes, such as the ones described above in connection with FIGS. 4 and 5. For these and other reasons, plant personnel may utilize a streamlined or single user interface without the need to monitor, maintain or support separate software applications. Implementing PCA as part of a process control system also makes it more practical to implement monitoring and diagnostics using on-line process data, as described below.

FIGS. 6 and 7 depict exemplary PCA function blocks 110, 112 for implementation of PCA-based techniques, which were discussed above, within a process control system. Generally speaking, each PCA function block 110, 112 can collect data during a training period, and at the end of the training period, develop a PCA model, and then apply the PCA model to all future data. On the left-hand side of the function block 110, 112 are the inputs to the PCA, which are the raw process variables. The outputs of the function block are the scores, corresponding to the most significant Eigenvalues.

For instance, the function blocks 110, 112 may be custom function blocks made available via the Control Studio of DeltaV™, also sold by Emerson Process Management of Austin, Tex., an interface 114 of which may be used to depict the function block input/output connections and other details. In this example, up to 20 process variables can be provided as inputs to the PCA. Of course, in general any number of inputs can be used for PCA. The inputs to the PCA block 110, 112 are process variables normally available in the DCS. There is also an input for a dependent process variable ($Y_{IN}$) which can be used to do Principal Component Regression (PCR), a statistical technique that may utilized in one or more of the disclosed methods described herein. Although the disclosed example shows a single variable, in general it should be understood that there can be multiple dependent variables.

The PCA function block 110, 112 may include a number of operational modes for both configuration and application of the PCA model. In the exemplary embodiments shown, the PCA function blocks 110, 112 run in two different modes: Learning and Monitoring (as determined by the True/False on the LEARN function block input). During the Learning Mode, the function block collects data from each of the input variables. For example, when a user gives the Learn command, the PCA block 110, 112 begins collecting process data for all of the input variables. The process data is stored in the computer memory, and data collection is continued indefinitely until the user gives the Monitor command.

After a sufficient amount of data has been collected, the user gives the Monitor command to the PCA block. After the Monitor command is given, the PCA block 110, 112 performs the PCA algorithm to develop a PCA model based on the data collected. Model development may include the following steps: autoscaling the input data (for each input variable, subtract its mean, and divide by its standard deviation), calculating the covariance matrix from the scaled data, calculating the Eigenvalues and Eigenvectors, determining the number of significant Eigenvectors to retain for the PCA loading matrix, and calculating statistical limits using σ-based limits, or $T^2$ Hotelling's statistics (e.g. 95% or 99%) for the PCA scores.

When this calculation is complete, the PCA block 110, 112 proceeds into monitoring mode, where it calculates the scores, based on new process data input to the block. In particular, the new process data may be on-line process data generated in real-time. If any of the scores exceed the limit, this could indicate an abnormal situation and an alarm parameter on the block 110, 112 is set. This alarm parameter may be tied to any other part of the process control system or network.

Each visualization plot of the PCA results may be provided or generated as part of the control system operator interface. For instance, the interface may be used to generate a PCA score plot in a DeltaV™ Process History View that plots the score over time. Alternatively or additionally, data for two PCA scores may be plotted in a two-dimensional graph, as shown and addressed above and below. The statistical limit computed results either in circular or elliptical shape that may also be provided via the operator interface. An alarm may be triggered if the score exceeds the limit.

In some cases, the multivariate monitoring and diagnostics techniques described herein may be implemented in a module (or other element or system component) of a system directed to abnormal situation prevention. Like other abnormal situation prevention algorithms, the techniques may therefore be directed to detecting abnormal process situations before they occur. These algorithms generally exhibit "alertness" and accuracy continuously for a number of abnormal situations. Accordingly, the abnormal situation prevention module may be a continuous process, rather than offering a one-time, or non-real time, solution.

The multivariate monitoring and diagnostics techniques described herein may also be utilized in batch processing, whereby the function blocks 110, 112 may collect different sets of process data for the input variables, where each set corresponds to a different on-line state of a process. For example, a user may give the Learn command when the process is operating at various capacities, such that the PCA function blocks collect process data for the input variables for a particular capacity level (e.g., a particular on-line state) when the process is operating normally. Thereafter, the user may give the Monitor command for the PCA block 110, 112 to perform the PCA algorithm to develop a PCA model based on the data collected for the particular on-line state (e.g., level of capacity). As such, a variety of PCA models may be developed, each corresponding to a different on-line state for the process when the process is operating normally. Thereafter, when the process is being executed in a particular on-line state (e.g., 50% capacity), the PCA block 110, 112 proceeds into monitoring mode using the corresponding PCA model, where it calculates the scores, based on new process data input to the block. Accordingly, a user may select from a plurality of multivariate statistical models to select the one most closely associated with the on-line state of the process to analyze the on-line, real-time operation of the process to monitor the process, detect abnormal situations, etc. In one example, the user may select a particular training session and elect to build new models customized to a particular on-line state of a process.

This aspect of the disclosure proposes a general (open source) data-driven approach for on-line (i.e., real time) multivariate monitoring and diagnostics applications. Moreover, the approach generally supports creating and manipulating data for developing on-line models and comparing model parameters for use in diagnostics, fault detection, etc. The disclosed approach includes the definition of an integration platform for process monitoring and diagnostics, which ultimately may be implemented by using a plant-wide or networked architecture, such as the PlantWeb® architecture sold by Emerson Process Management of Austin, Tex. The proposed integration platform is based on a multivariate approach and can accommodate different computational algorithms, including those utilized in the detection techniques described below. With reference to the open source nature of the data-driven platform, it is understood that the disclosed methods and systems can receive data from different input domains (e.g., FOUNDATION™ Fieldbus, HART®, Modbus, OPC, wireless, etc.). The data received may be on-line process data collected from any number of different transmitters, sensors and actuators and is used to define a multivariate process domain. The same data is used by the process control system and can be stored in a data historian.

Figure 8:
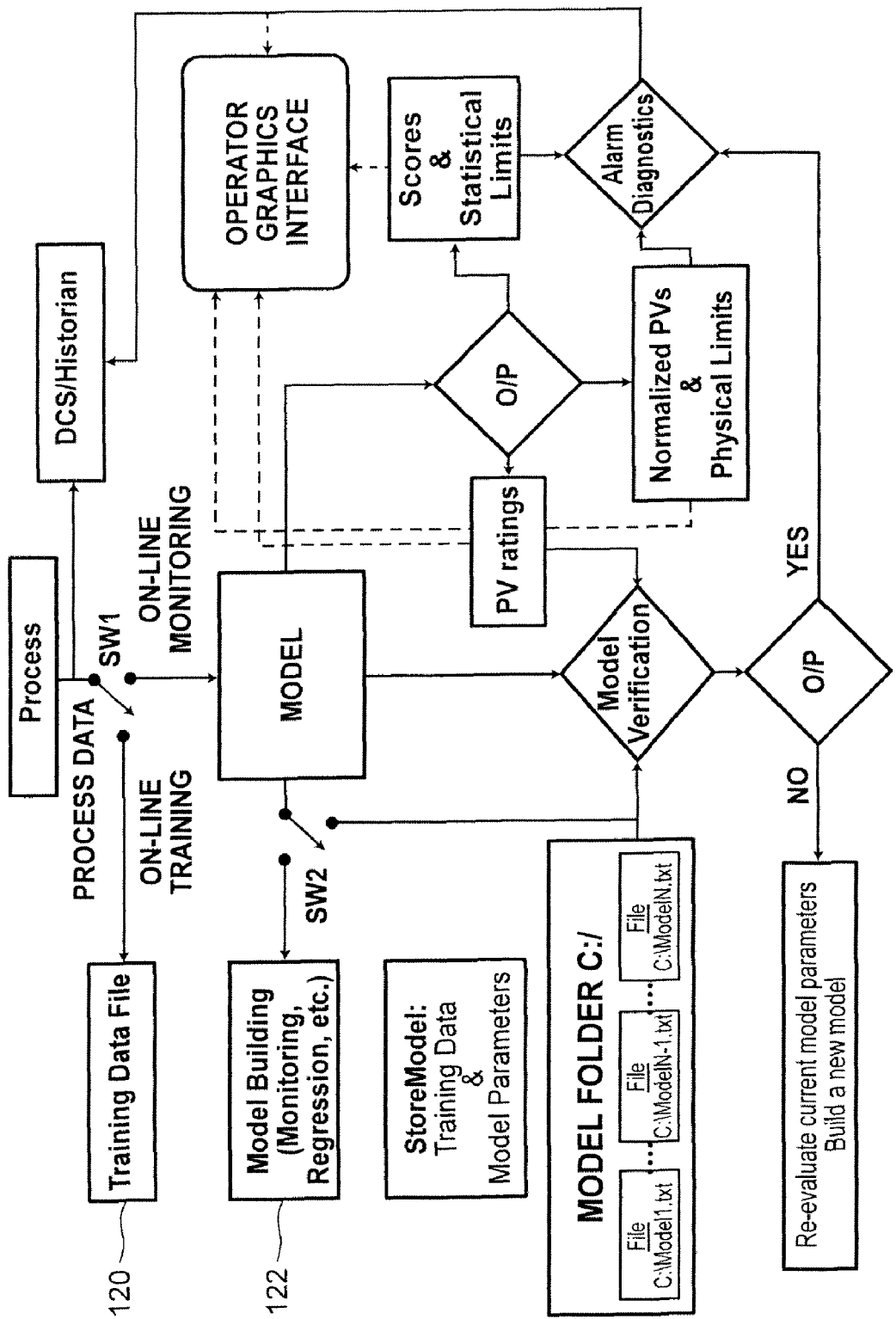
FIG. 8 is a block diagram of a multivariate monitoring and diagnostics module (MMDM) in accordance with another aspect of the disclosure, components of which, in some embodiments, may be implemented in the function blocks of FIGS. 6 and 7.

The flow of data through the disclosed system and module is shown in FIG. 8. Once data from the process enters the disclosed module, the data may be used for on-line training, on-line monitoring, or both during the same time period. Two switches SW1 and SW2 are implemented in way to support the different data paths, as desired. If training is desired, data may be accumulated until user/operator stops the accumulation process. This procedure may be accomplished by placing SW1 into an on-line training state. Any accumulated data may be stored in a file 120, and then be used in a model builder or generator 122. Each generated model may be stored as shown, and made available to the components involved in the monitoring mode via, for instance, the switch SW2. When the model building operation is completed, the model together with a training data is stored, typically as a .txt file in a model folder which resides in a database or memory (drive C:/).

Models that may be built by this data include, but are not limited to, Principal Component Analysis (PCA), Artificial Neural Networks (ANN), Fuzzy Logic and Bayesian Decision Trees. The tools for each of the algorithms may be provided in a drop-down-window fashion by, for instance, the abnormal situation prevention module. Each of these models may be used to develop predictions, as described below. The same model may also be used for on-line monitoring. When the model is in an on-line monitoring mode, the abnormal situation prevention module uses the model output (O/P) to generate three types of outputs: statistical, normalized process variables (PVs), and process variable (PV) ratings. As shown in FIG. 8, each of the outputs (PV ratings, Normalized PVs & Physical Limits, and Scores & Statistical Limits) may be further used to generate alarm status (alarm diagnostics), visualizations (Operator Graphics Interface) and/or verification of the models.

The statistical output is composed of scores which are low dimensional representations of multivariate data points. The low dimensional space is obtained based on directions with largest data variation in the multivariate domain. The PCA modeling is a technique that may be used for developing scores, as has been discussed above, although other modeling techniques produce scores as well. The statistical output can also contain 95% (99%) confidence limits, or σ-based limits.

The concept of normalized process variables was described above in relation to both known and unknown process variable limits. Based on this concept, a bar chart (or other two-dimensional plot or graph) may be used for presenting normalized data. These charts may also contain physical or process limits that are useful for alarm identification. As described below in connection with further aspects of the disclosure, the combination of the statistical limits and the physical limits in a single user interface provides a useful way for accurately identifying abnormal situation prevention alarm status, and as such offers a technique supportive of the abnormal situation prevention initiative.

Process variable ratings may be useful in connection with abnormal situation prevention because the process variable rating is basically a rating that is given to a process variable for its variability. The more variation that the process variable exhibits the higher is its rating. This is a useful parameter in that it can easily be cross-validated with ratings obtained for monitoring the same process situation at different times. For example, if all process variables exhibit the same ratings for two or more monitoring models, the confidence in monitoring models increases. To obtain the process variable rating the following calculation may be used:

$$PV_{j_{rating}} = \frac{1}{trS} \sqrt{\sum_{i=1}^{k} \sigma_i^2 p_{i,j}^2}$$

where $PV_{j_{rating}}$ is the rating of the $j^{th}$ process variable, S is the n×n auto-scaled covariance matrix, n is the dimension of multivariate data space, trS is the trace of S, k<n is the principal component space, $\sigma_i$ and $p_i$ for i=1, . . . , k are, respectively, the principal Eigenvalues and Eigenvectors of S, and $p_{i,j}$ is the $j^{th}$ component of the eigenvector $p_i$. $p_{i,j}$s are also referred to as the loadings. The ratings may be computed for each developed PCA model and can be stored in model files with other model parameters.

The above equation is composed of model parameters, and the process variable rating obtained in this fashion is intimately related to the model. Thus, if two models correctly describe the same process event, then they rate process variables in the same order. As such, the models may be verified based upon their respective ratings. This also is generally true when models are different. For example, one model may be PCA-based and the other ANN based, and their process variable ratings are generally in the same order. Exceptions may include when the process data is nonlinear (i.e., deviates significantly from the normal distribution).

It is further noted that other model parameters may be used for model validation. PCA parameters such as the eigenvector loadings $p_{i,j}$ and Eigenvalues $\sigma_i$, or ANN parameters such as the number of hidden layers and the number of outputs, are also useful parameters. Every model exhibits certain set of parameters that can be used for the validation task.

Figure 11:
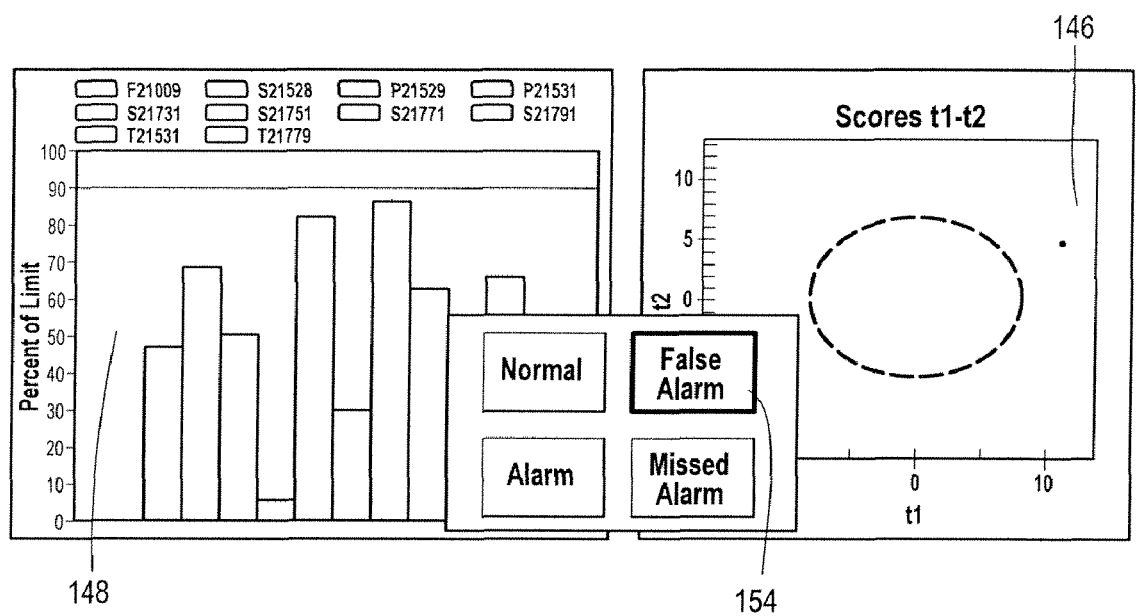
Figure 12:
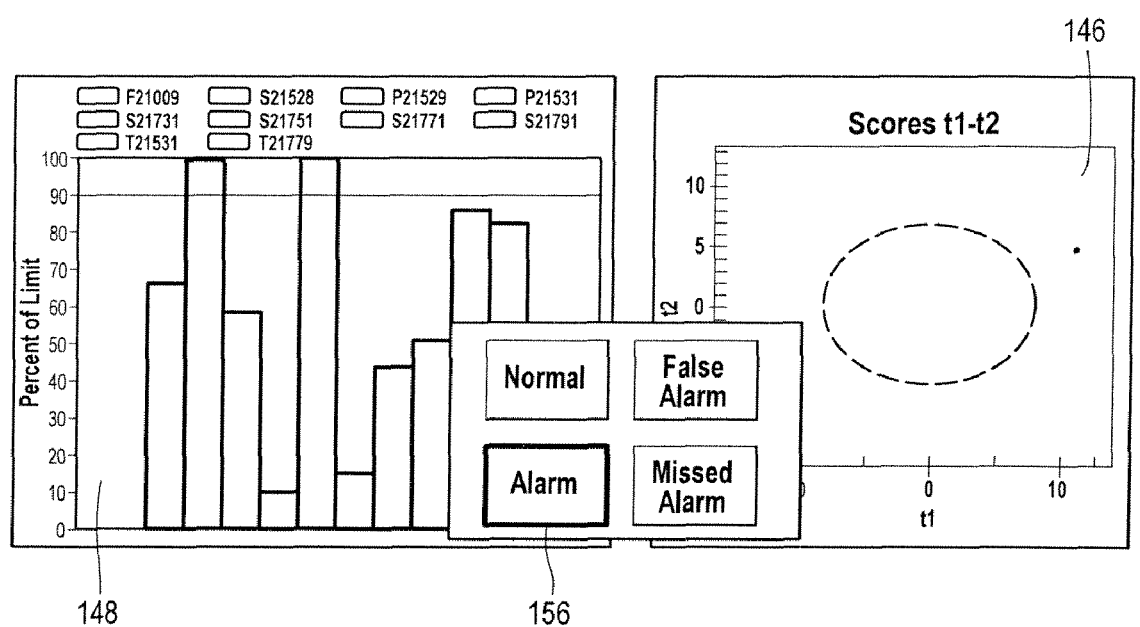
Figure 13:
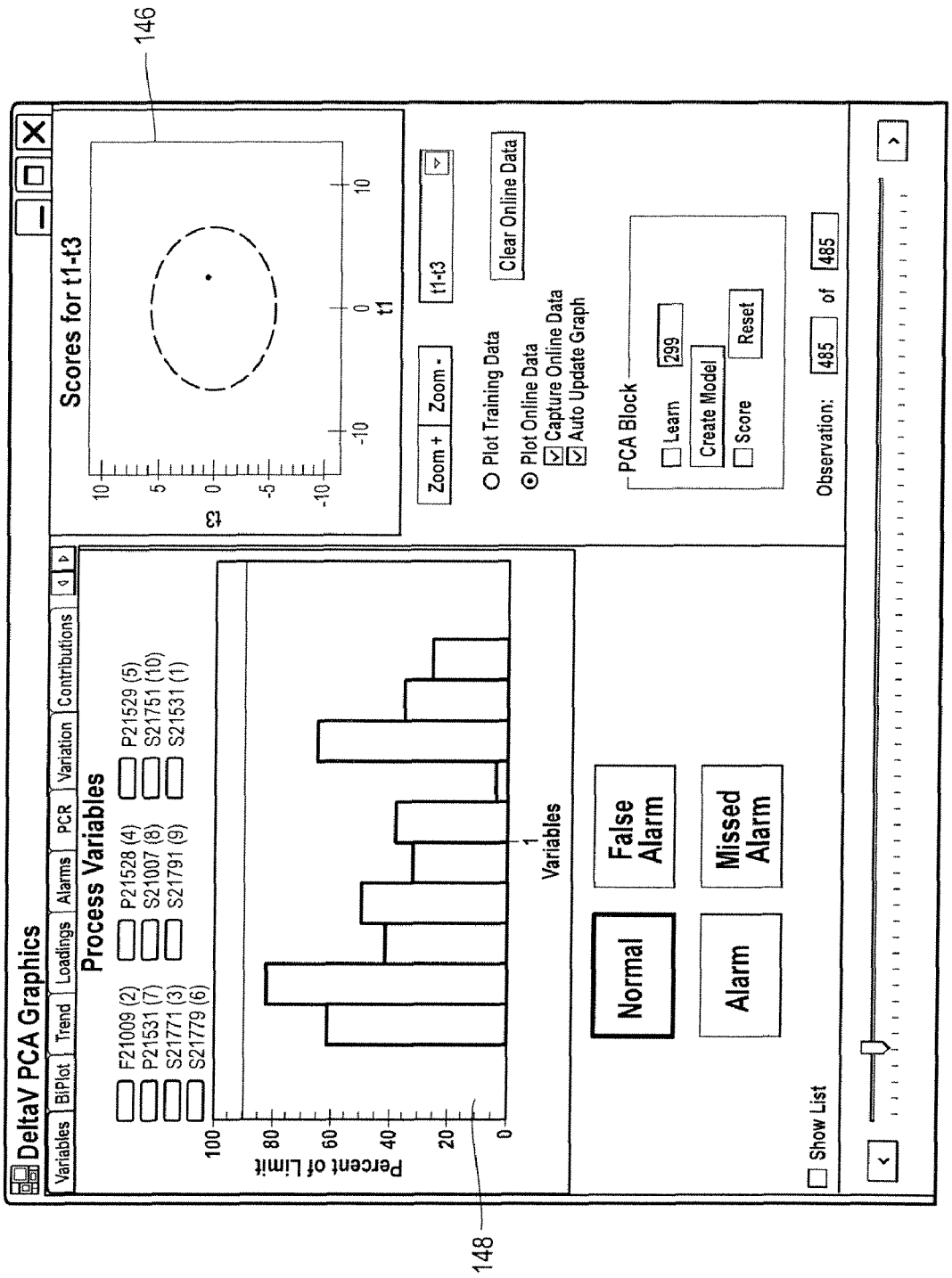
FIGS. 13 and 14 are further exemplary user interface displays generated in accordance with another embodiment and created or supported in manners similar to the user interface displays of FIGS. 9-12 for multivariate monitoring and fault detection.

In accordance with another aspect of the disclosure, the model output data may be used to generate alarm status and, more generally, a composite, multivariate graphical interface for operators. FIGS. 9-13 illustrate exemplary graphical interfaces that display normalized process variables, process variable ratings (see FIG. 13), scores and alarm status. The graphical interface also contains tabs from which other model information and graphs can be accessed. As shown in FIG. 13, the process variable ratings may be given in parentheses, [e.g., (2)], next to the variable description in the upper left part of FIG. 13. In this particular instance there are 10 process variables, and ratings range from 1 to 10. Process variable S21531 has the rating 1, implying it is the variable with largest variation.

Figure 14:
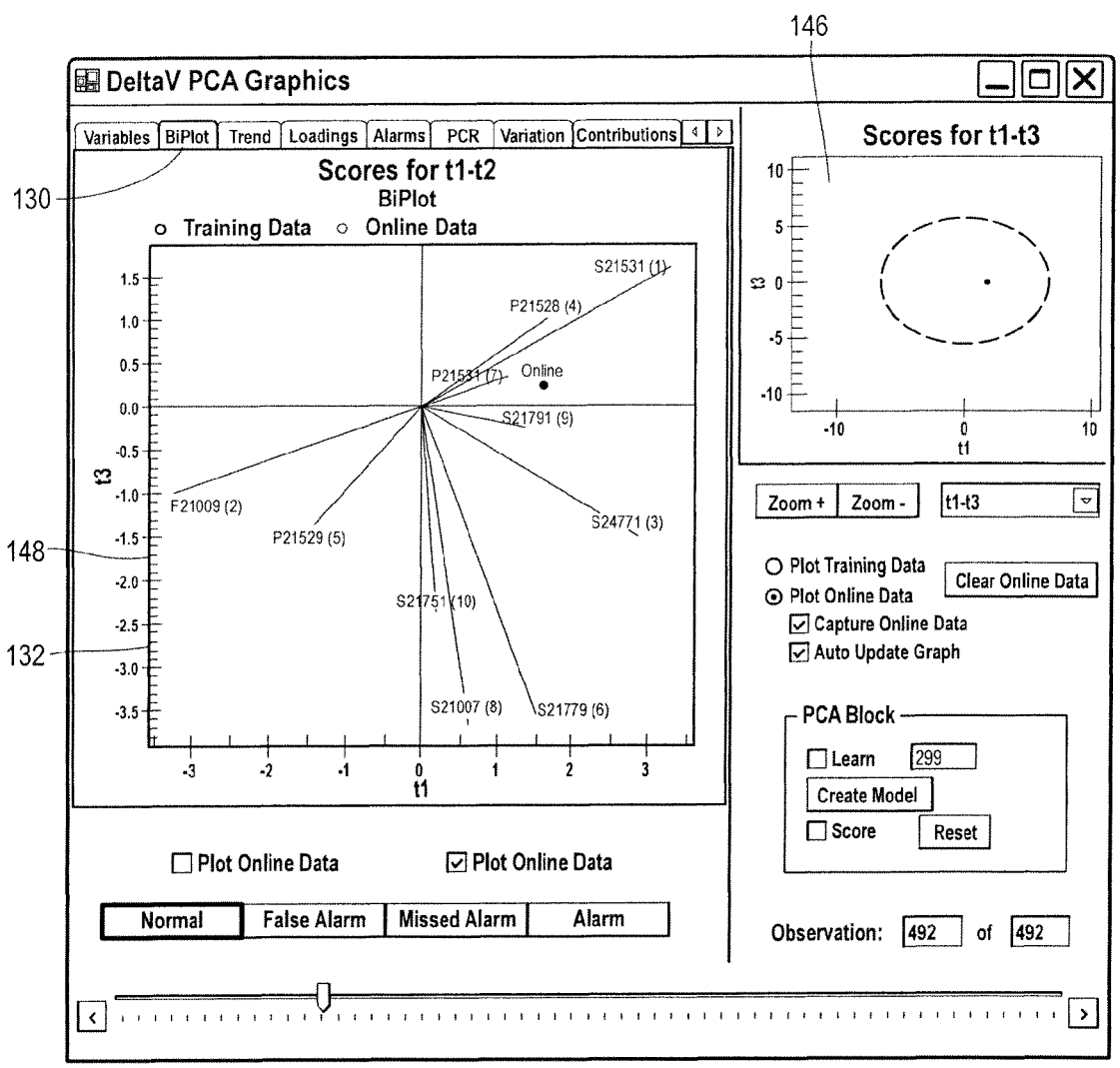
Figure 15:
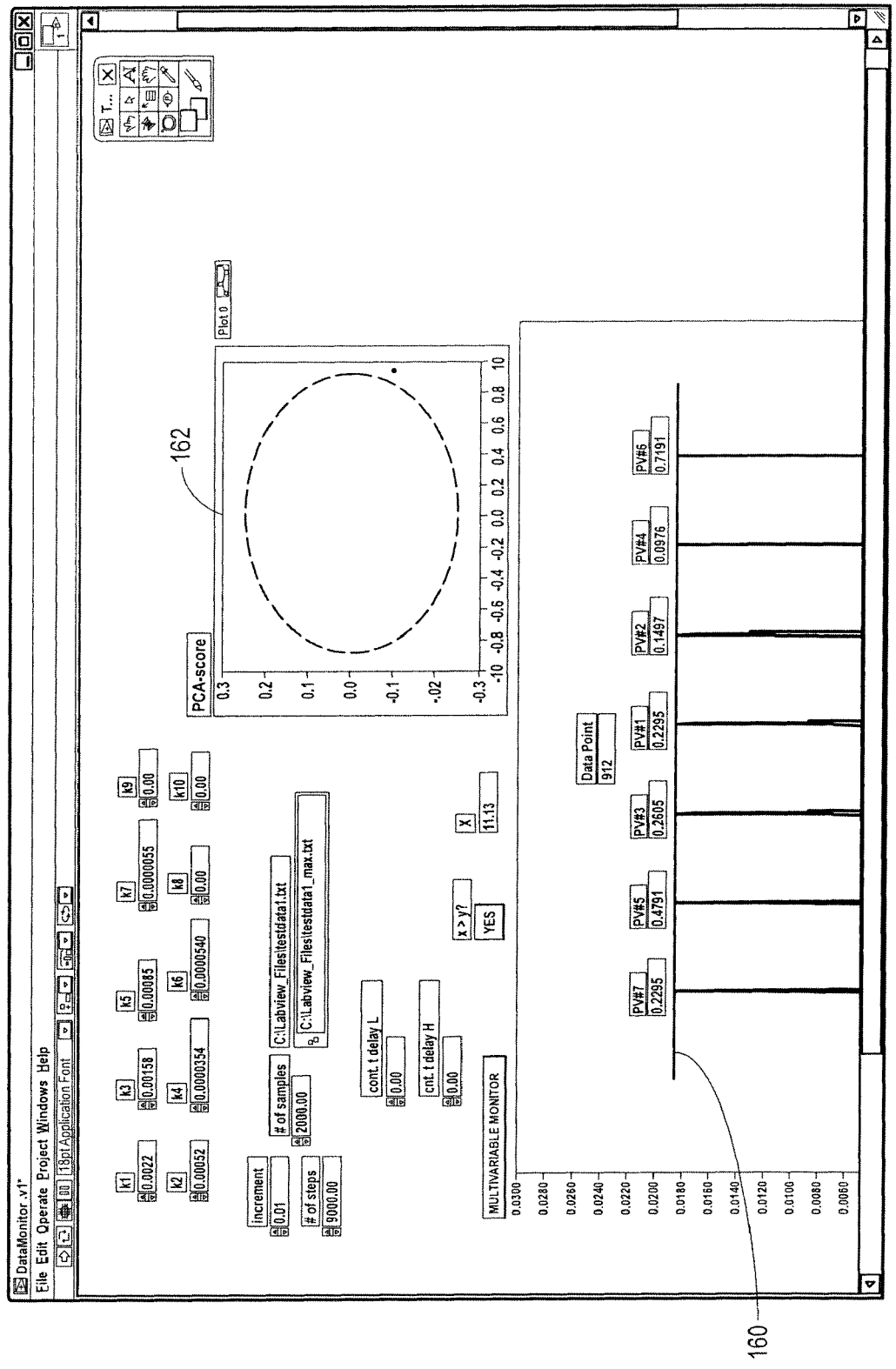
FIGS. 15-19 are still further exemplary user interface displays generated in accordance with yet another embodiment and created or supported in manners similar to the user interface displays of FIGS. 9-12 for multivariate monitoring and fault detection.

With reference now to FIG. 14, accessing a BiPlot tab 130 provides the operator with an opportunity to view two score presentations as depicted in a score plot panel 132. The bi-plot is used to represent a score simultaneously with process variables, which are in the graph defined by their loadings $p_{i,j}$. The lines indicate how much of the principal component is present in process variables. For instance it can be seen that the process variable, S21531 rated 1, has largest first principal component t1 (horizontal axis). In contrast the process variable, S21008 rated 8, has the largest third principal component t3 (vertical axis). This makes perfect sense because t1 defines the direction with the largest variation in the data space, while t3 is significantly inferior. One can explore process variable relation with other principal components by simply changing the presentation in the window in the upper right part of the graph, (e.g., scores for t1-t2 can be obtained).

The bi-plot offers an easy way to relate an on-line score (black dot) to the process variables. The line closest to the score determines the dominant process variable for the score. Now since the lines are always in the same locations and the score is the only dynamic component on the graph, the operator can quickly understand which process variable, or a group of process variables, are most influential for a score projected at any given instant of time. As such, the operator can become quickly familiar with all process variables through a single display.

With regard to implementation options, the disclosed user interface displays (and the system or module responsible for generating them) may be implemented in DeltaV™, Ovation® or any other control system platform. For instance, the PCA-based function blocks may be utilized to this end. Alternatively, Visual Basic (VB) with .NET technology may also be utilized as an implementation platform. In one case, an exemplary implementation strategy may incorporate some combination of VB.NET and DeltaV™ or Ovation®. Notwithstanding the foregoing, implementation may also be accomplished on different software platforms, (i.e., Java, Delphi, C++). Further details regarding the operator display interfaces of FIGS. 9-13 are provided below.

It is noted that despite the usefulness of PCA, the PCA technique does not readily convey information about process dynamics. This is generally due to the use of scatter plots to display the results of the PCA analysis (scores). The scatter plots, although useful, are generally static representations of process data. As discussed above, multidimensional training or monitoring data sets are projected (scored) onto the lower dimensional principal component space. Typically the first two principal components capture the largest variations in data, and as a result they produce a scatter plot with most significant information about data behavior. Hotelling's $T^2$ distribution may also be used to compute 95% or 99% confidence region, or apply σ-based limits. A knowledge of this region may be important for detection of abnormal situations because if the training data represents a normal process performance, then for any new score point inside the region one can be 95% (99%) certain that the data point is normal. In contrast, for score points outside the limit region one can be 95% (99%) certain that the data point is not normal (abnormal).

As is apparent from the above, recordation and interpretation of scores through scatter plots results in a degree of uncertainty associated with the data being interpreted incorrectly. Unfortunately, as discussed above, experience has shown that this approach often leads to false alarms. The main reason for this is that the statistically calculated limits do not take into account the actual physical limits of the process variable. Each score is a linear combination of the mean-centered input variables. For example, inside and outside the confidence limit region, there is an ambiguity of 5% (1%), such that there is not a 100% assurance that any given score is normal or abnormal, and traditional PCA is not always reliable in detecting abnormal situations. For example, a PCA score may trigger an abnormal situation when one does not exist (false alarm), and conversely a PCA score can indicate a normal behavior when the process is actually behaving abnormally (missed diagnostics). It is apparent this is not generally acceptable when determining abnormal situations and issuing abnormal alerts. The question is what happens when one takes the same linear combination of the physical limits. Because process variables have different scales, it is not always clear how one would transform these limits onto a PCA score plot.

Figure 9:
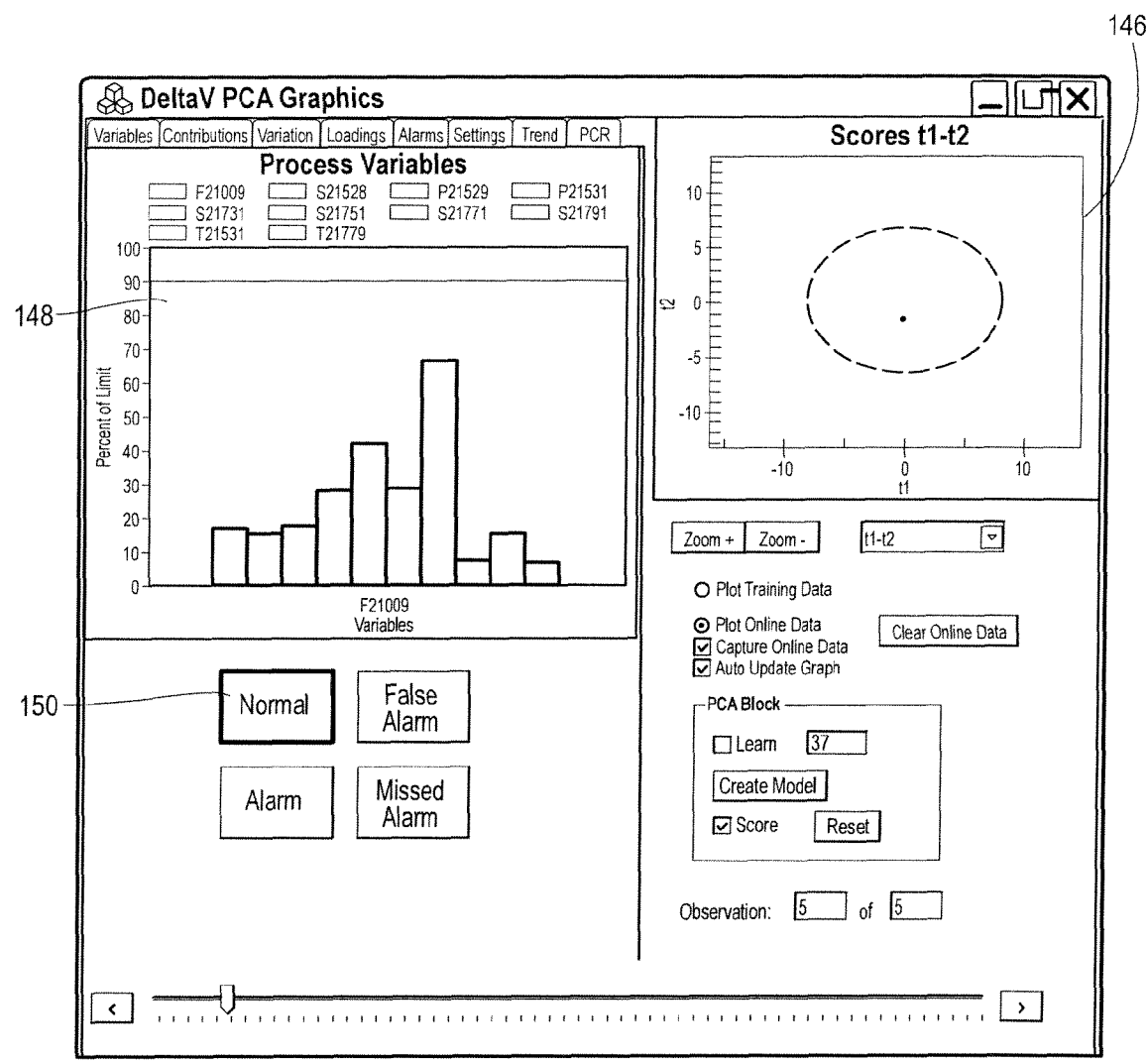
FIGS. 9-12 are exemplary user interface displays generated in accordance with another aspect of the disclosure, which, in some embodiments, may be created or supported by the function blocks of FIGS. 6 and 7 or by the MMDM tool(s) of FIG. 8, for multivariate monitoring and fault detection.

The interface displays of FIGS. 9-13 show an exemplary manner in which an operator interface may be used to visualize the PCA model applied to the current process data, while addressing the foregoing concerns. In short, both a PCA score plot 146, which may be generated from a PCA or other multivariate analysis, and a physical limit plot 148, which may be generated from univariate analysis, are included. The combination of these two plots gives an indication of the current state of the process. In the example of FIG. 9, because the PCA scores are within the statistical limits and all of the process variables are within their physical limits, this indicates the process is in the normal operating condition, and an indicator block 150 is highlighted to that effect.

Figure 10:
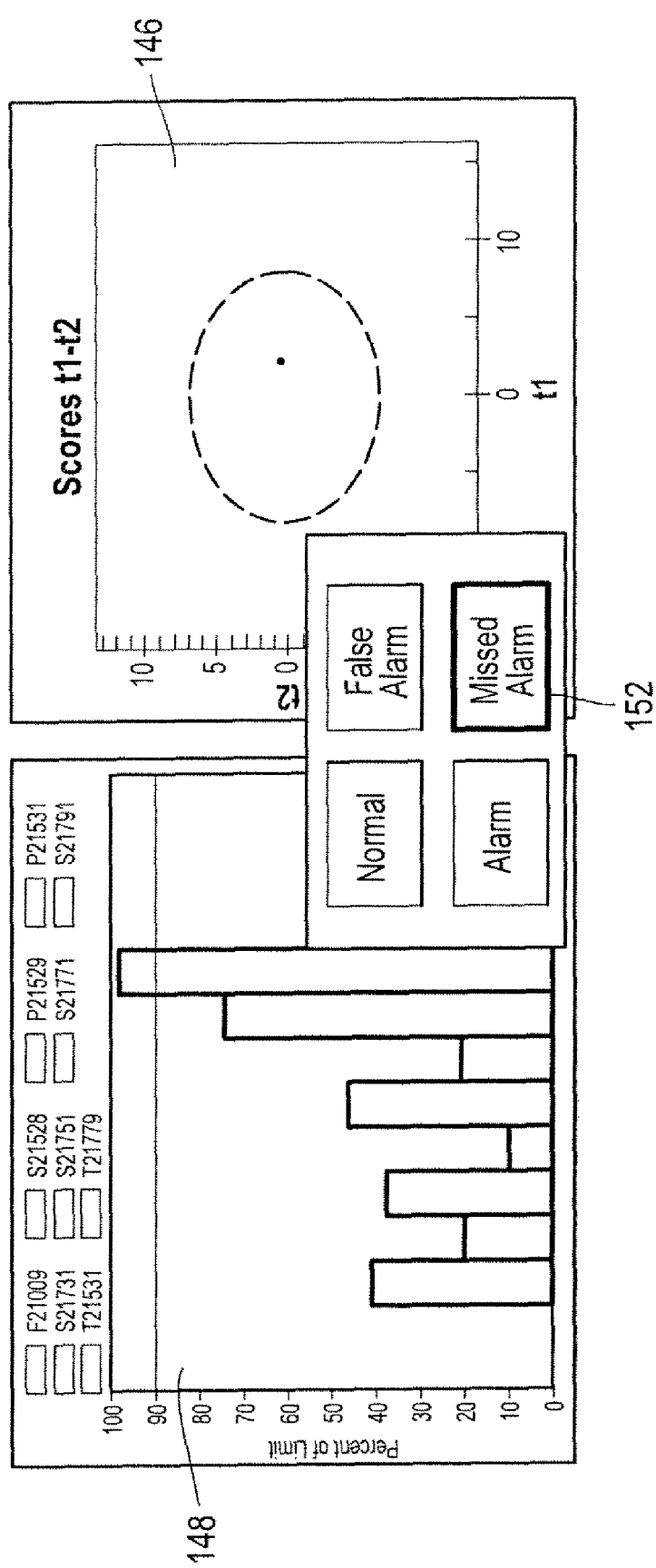

FIG. 10 illustrates an example of how, according to the PCA score plot 146, everything appears to be normal. However, one of the process variables has exceeded its physical operating limits, as shown in the physical limit plot 148. Therefore, an indicator block 152 highlights a Missed Alarm.

Conversely, it is also possible for the PCA Score plot to indicate that there is a problem, while all of the process variables are still within their physical operating limits. FIG. 11 illustrates this case, which we call a False Alarm as depicted by an indicator block 154. Therefore, a true alarm condition is detected when both the statistical limits on the PCA plot and the physical operating limits are exceeded. This is illustrated in FIG. 12 with an indicator block 156.

Referring to FIG. 13, it is shown that the graphical representations are accompanied by a user-selectable graphic for selecting previous sets of collected data, shown as a slide bar, and a user-selectable graphic of principal components, shown as a drop down menu. The slide bar, or other graphical representation, enables the user to select previously collected data based on a previous operation of the process, and generate PCA scores based on the previously collected data. The graphical representations may then be updated with the PCA score, such that a user may readily access and analyze any previous process operations for abnormal behavior. Still further, it is noted that the process variables may be expressed as a function of their process limits, which may include a common process limit as discussed above. Likewise, selection of different principal components enables a user to view the operation of different process variables having different degrees of significance on the process, and the graphical representations may be updated accordingly.

Figure 16:
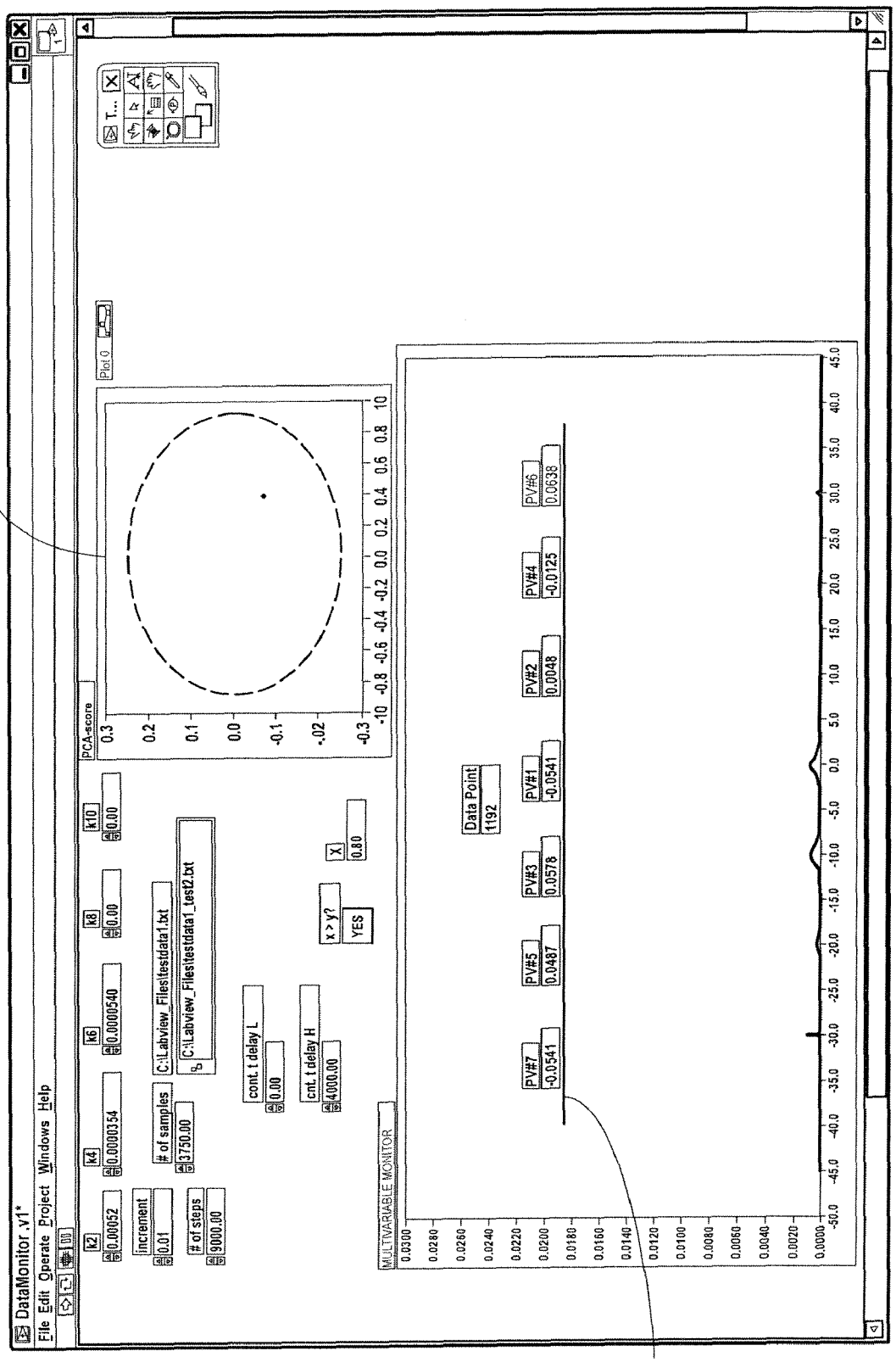
Figure 17:
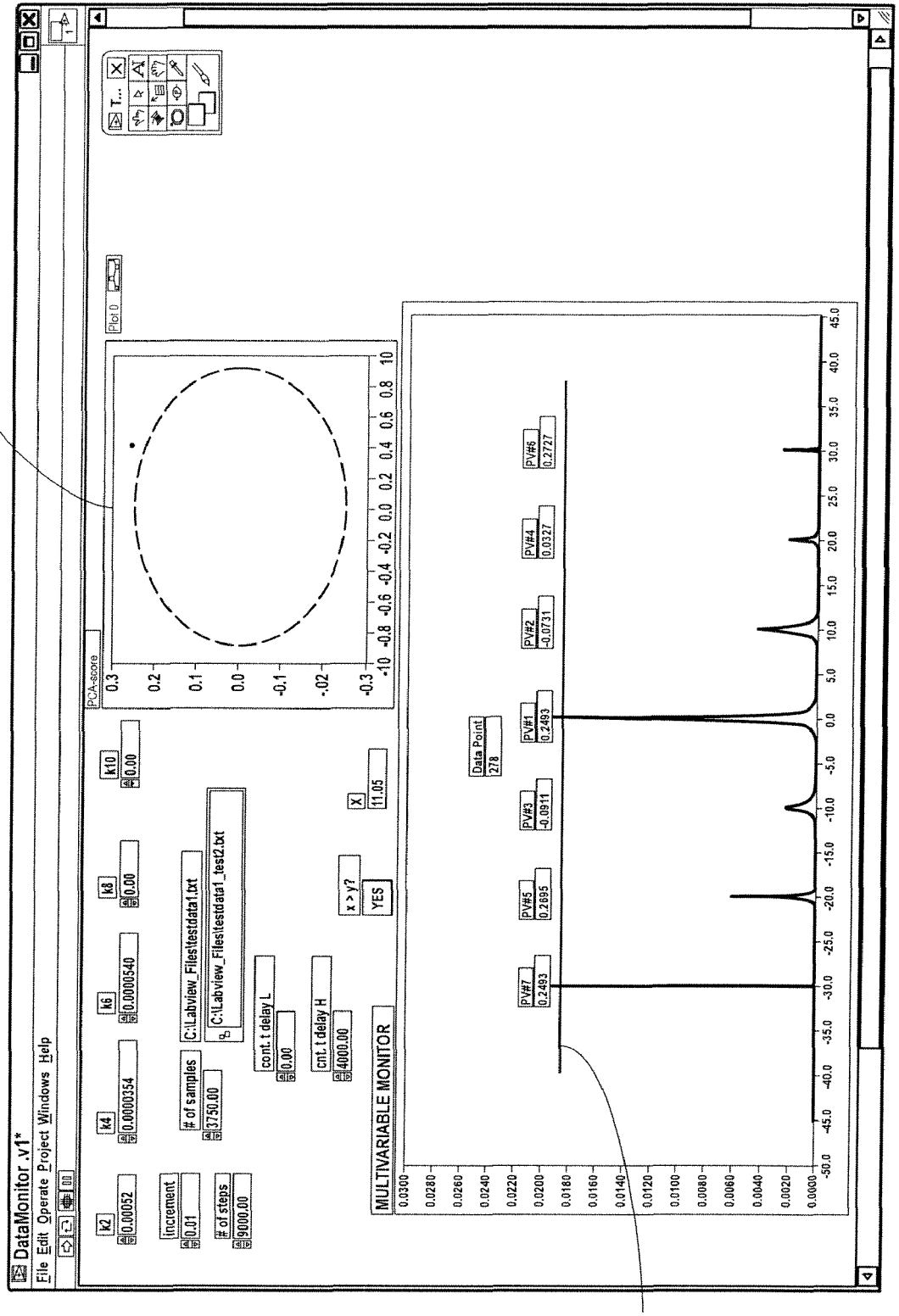

FIGS. 15-19 illustrate different states of an exemplary user interface that presents dynamic process data visualization together with the PCA scoring of control limits in a manner similar to that shown in connection with the embodiments of FIGS. 9-14. As described above, the control limits of seven process variables have been normalized to a unique value, and if the PCA score for this case is outside the 95% confidence region, a warning may be issued. These two graphical illustrations run simultaneously on-line for any incoming data. In addition, the PCA score plot contains one point, which is dynamic, while the peaks in the process variable monitor change according to the data inputs. When all peaks are below a control limit line 160, the process is in control and operation is normal. The corresponding statistical score should also be inside a limit circle 162. That situation is depicted in FIG. 16. Similarly when one or more peaks cross the limit line 160, the out of control or abnormal condition occurs and the PCA score should be outside the limit circle 162, as shown in FIG. 17.

Figure 18:
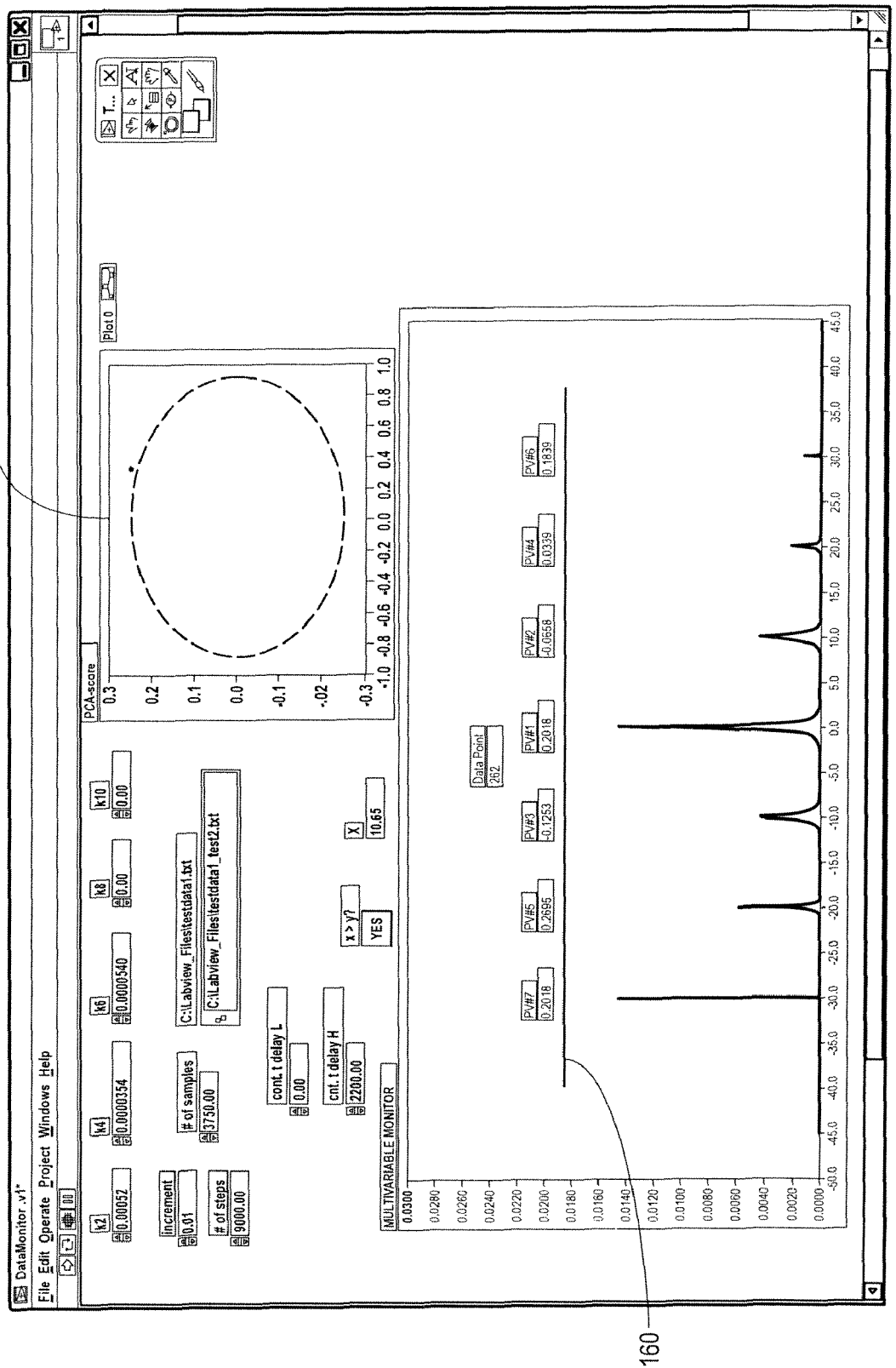
Figure 19:
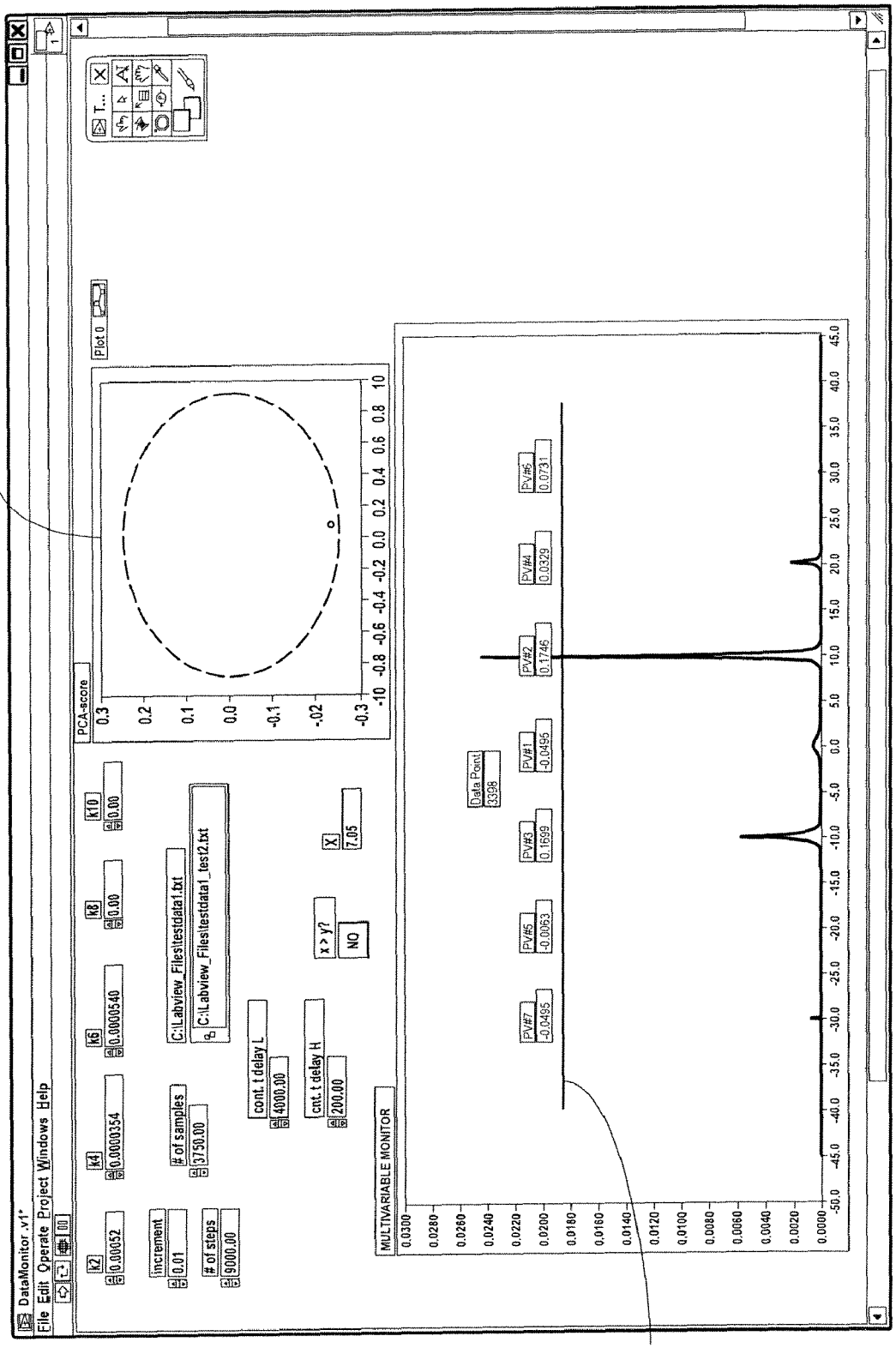

False call diagnostics may also be experienced. In FIG. 18, the score is outside the limit circle 162 (abnormal), while all process variables are below the limit line 160 (normal). This case is clearly a false alert to be ignored. However, the opposite can also occur. The case illustrated in FIG. 19 shows the situation in which the score is inside the limit circle 162 (normal), while the process variable indicator indicates that process variable #2 has violated limit requirements (abnormal). This is the case of missed detection, or missed alert.

The two on-line graphical representations can accurately diagnose whether a data point corresponds to a normal or abnormal process situation. Moreover if abnormal situation occurs, process variables that have violated normal status can instantly be identified. The significance of these variables for process operations, however, may not be the same. The importance of process variables for a particular monitoring requirement are determined from the PCA loading values in the loading matrix P. If the process variable signaling an alert is associated with a small PCA loading value it may have a very little significance to process operations, and the alert may be classified simply as warning. In contrast, if the loading value is high a variable is likely to be significant for process operations and high alert should be advised.

The foregoing visualization techniques and accompanying operator interfaces may be realized within any process control system architecture or platform and, in any case, may be supported by the functionality implemented by the PCA block described above.

Figure 20:
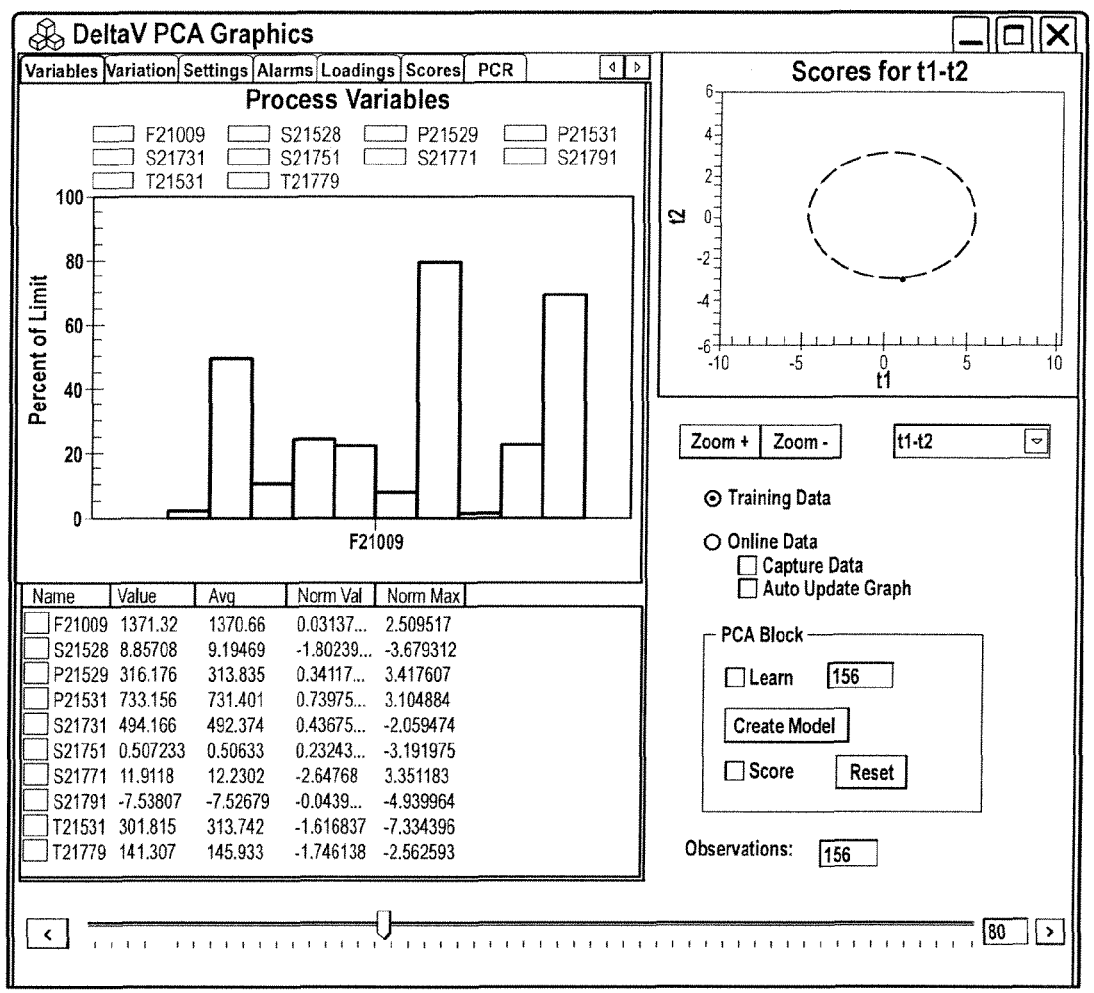
FIGS. 20 and 21 are still further exemplary user interface displays generated in accordance with yet another embodiment and created or supported in manners similar to the user interface displays of FIGS. 9-12 for multivariate monitoring and fault detection.
Figure 21:
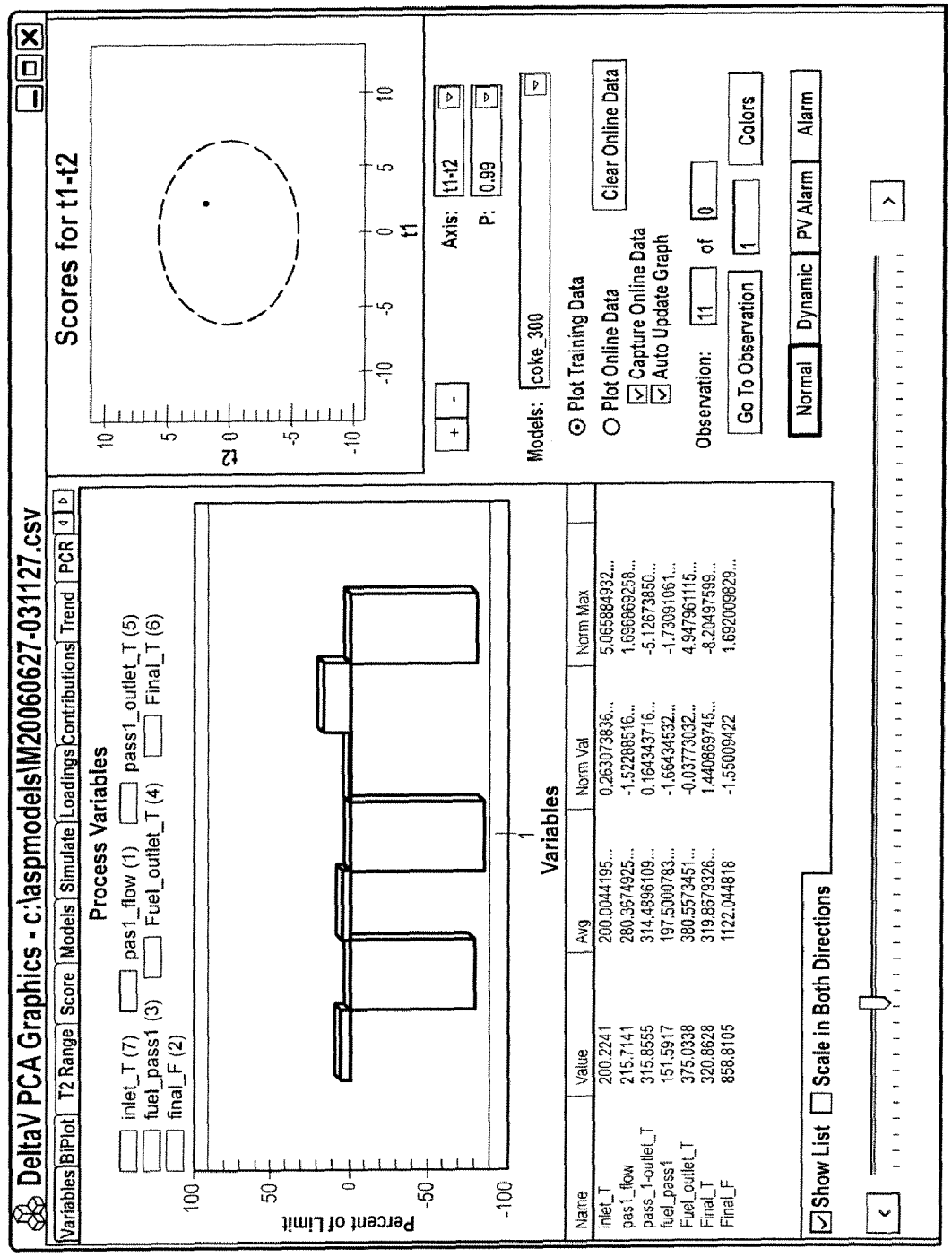

FIGS. 20 and 21 depict further alternative operator interfaces generated in accordance with the disclosed techniques, both of which support on-line monitoring, diagnostics, and false alarm detection functionality, as described above. In particular, FIG. 20 depicts the process variables in a bar graph as a percentage of their process variable limits, which may include a common process variable limit, as discussed above.

Detection of Steady-State Operation with Multivariate Statistical Techniques

Figure 22:
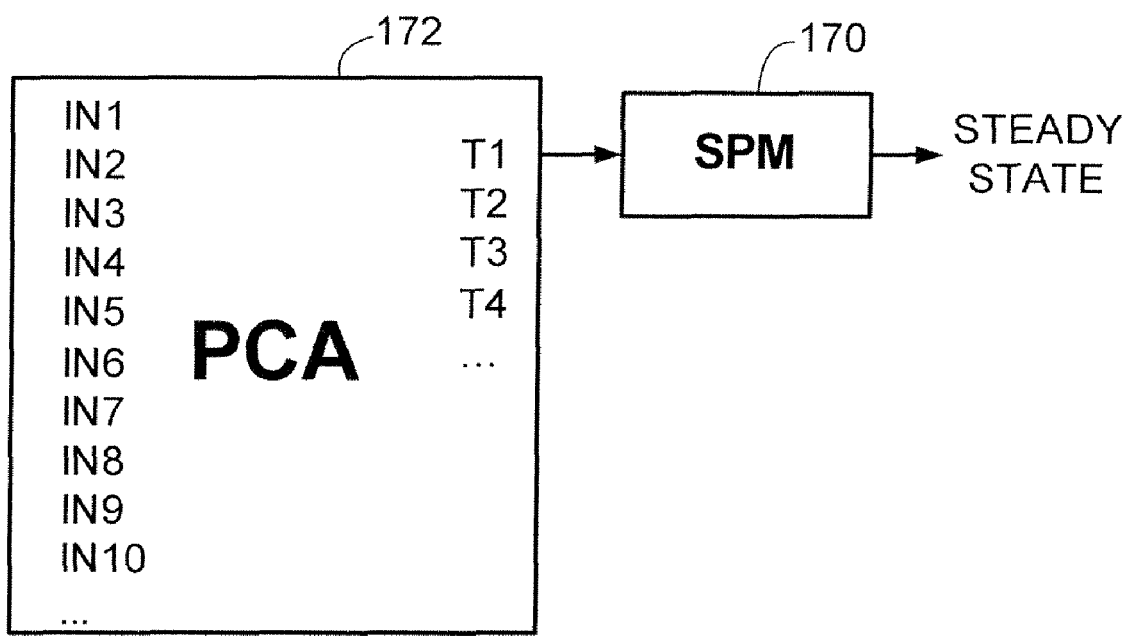
FIGS. 22 and 23 are block diagrams of PCA-based steady-state detection systems and techniques in accordance with another aspect of the disclosure that may utilize the function blocks of FIGS. 6 and 7.
Figure 23:
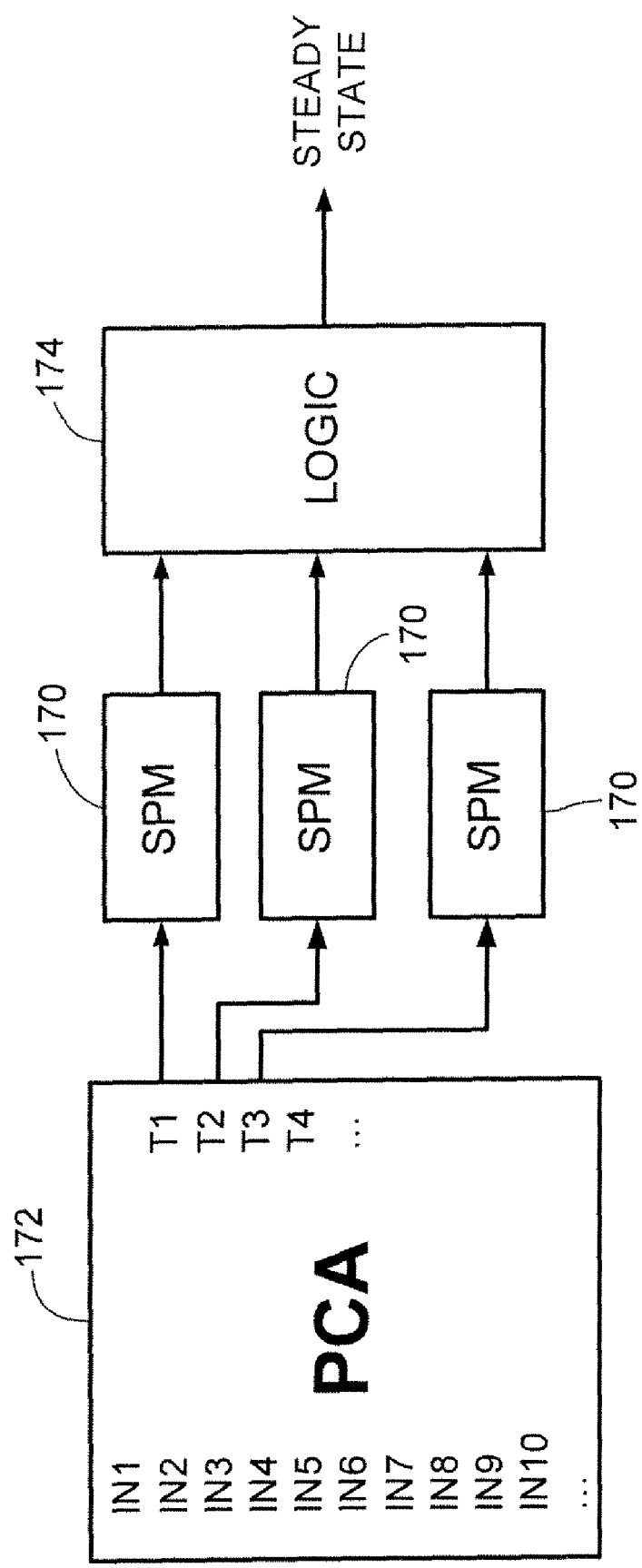

FIGS. 22 and 23 are directed to another aspect of the disclosure relating to recognizing and detecting steady-state operation using a PCA-based statistical signature. Many abnormal situation prevention algorithms rely on making a detection by learning the initial state of one or more of the process variables, and then triggering an alarm when the process variables change in a certain manner. However, many of these abnormal situation prevention algorithms also require that the process be in a steady-state, both before training for the initial conditions, and before making a detection. While it is generally easy for an operator to look at a plot of one or more process variables, and tell whether or not they are at a steady-state, it is generally more difficult to create an algorithm which can reliably make the same determination. A technique directed to detecting a steady-state in a process is now described. The technique is capable of making the determination based on monitoring multiple process variables.

Given a process variable x, the mean and standard deviation can be calculated over non-overlapping sampling windows of a given length (e.g. five minutes). In one example, the mean is calculated by:

$$\bar{x} = \frac{1}{n} \sum_{i=1}^{n} x_i$$

and the standard deviation is calculated by:

$$s = \sqrt{\frac{\sum_{i=1}^{n}(x_i - \bar{x})^2}{n-1}}$$

where n is the number of samples, and $x_1, x_2, \ldots x_n$ are the samples of the process variable x taken over the sampling window.

In this example, $\bar{x}_1$ and $s_1$ are the mean and standard deviation, respectively, calculated in one sampling window, and $\bar{x}_2$ and $s_2$ are the mean and standard deviation, respectively, calculated over the next sampling window. Then, if $|\bar{x}_1 - \bar{x}_2| \leq 3 \cdot s$, the process may be described as being in steady-state. Conversely, if $|\bar{x}_1 - \bar{x}_2| > 3 \cdot s$, then the process is not in a steady-state.

Next, the parameter s used in the calculation is determined. If the process is in steady-state, and the sampling window is chosen correctly, then $s_1 \approx s_2$. In that case, it should not matter whether $s = s_1$ or $s = s_2$. However a more robust algorithm, which would result in smaller limits for declaring steady-state (which may provide greater certainty that the process is actually in a steady-state when the abnormal situation prevention module starts running) utilizes the minimum of $s_1$ and $s_2$, or $s=\min(s_1, s_2)$. In such a case, the criteria for declaring steady-state is $|\bar{x}_1-\bar{x}_2|\leq 3\cdot\min(s_1, s_2)$. The multiple of "3" may be a user-configurable parameter, though it is understood this may complicate the configuration of an abnormal situation prevention system, particularly when there are many process variables. The functionality of calculating mean and standard deviation of a process variable and determining steady-state, as well as other functionality, may be encapsulated into a Statistical Process Monitoring (SPM) block, as described above.

In accordance with another aspect of the disclosure, a steady-state detection technique utilizes scores generated by a PCA model (rather than the process variable data directly) to determine whether a process with multiple process variables is in a steady-state. FIG. 22 illustrates an SPM block 170 coupled to a PCA block 172, which may be used to determine whether or not a system with multiple process variables ($IN_1$, $IN_2$, $IN_3$, . . . ) is currently at steady-state. The PCA block 172 may correspond to the function block described above.

The example shown in FIG. 22 implements steady-state detection using the first score of a PCA model. As discussed above with respect to PCA models, the first score, which corresponds to the largest Eigenvalue value and is calculated from the first loading vector, represents the largest amount of variation in the process. For example, in some processes, this may correspond to a load change that propagates through to many of the other process variables. In such a case, if only the first principal component meets the steady-state criteria, then it may be determined that the whole system is in steady-state.

While the first component may be the most statistically significant, alternative examples may use multiple scores of the PCA model, as shown in FIG. 23. In this case, the PCA function block 172 is coupled to multiple SPM blocks 170, with each SPM block 170 monitoring one of the scores of the PCA model. In this case, there would be one SPM block 170 for each principal component that was determined to be significant according to the chosen method (e.g., Kaiser's rule, percent variance, parallel analysis, etc.). A logic block 174 may be used to make a steady-state determination for the entire system. If all of the SPM blocks 170 indicate a steady-state, then steady-state may be determined for the entire system. If any of the blocks 170 show an unsteady process, then it may be determined that the entire system is not at steady-state.

A method implementing this technique may include collecting process data from all process variables, creating a PCA model of the process, coupling the first PCA score to a Statistical Process Monitoring (SPM) block, and declaring the system to be at a steady-state if the SPM block declares the first PCA score to be at a steady-state. The SPM block calculates means ($\bar{x}_1$ and $\bar{x}_2$) and standard deviations (s1 and s2) of an input variable over consecutive non-overlapping sampling windows, and declares that the input variable is at a steady-state if $|\bar{x}_1-\bar{x}_2|\leq n\cdot\min(s_1, s_2)$, where n is any real number. In some cases, the steady-state may be determined by $|\bar{x}_1-\bar{x}_2|\leq n\cdot s_1$. Alternatively, the steady-state may be determined by $|\bar{x}_1-\bar{x}_2|\leq n\cdot s_2$. In an exemplary embodiment, n=3.

The techniques and methods described above may be implemented with one or more additional SPM blocks coupled to the second and greater PCA scores, and a logic module which takes as inputs the steady-state detection of each of the SPM blocks and generates an output signal that indicates that the entire system is at a steady-state if all of the SPM blocks indicate a steady-state. The logic module may additionally determine the entire system to be an unsteady process if any of the SPM blocks indicates an unsteady process. Alternatively or additionally, other multivariate techniques may be used with the SPM block for detecting steady-state. Such techniques include PLS, PCR, FDA, CVA, etc.

Although shown in FIGS. 22 and 23 as involving multiple, separate units, the disclosed techniques and methods may be implemented in a single, integrated function block (e.g., a Fieldbus function block), a field device interface module, a control system, a standalone software application, or the like.

Detection of Transient Dynamics

FIGS. 24-37 are directed to another aspect of the disclosure relating to the detection of transient dynamics using multivariate statistical techniques. Dynamic behavior is commonly encountered in process operations. For instance, a process exhibits transient behavior due to changes in input or load variables, such as flow rates. This is quite common in fired heaters because they usually run under various flowrates of crude oil.

When implementing fault or abnormal situation detection, it is important to distinguish between a normal operating condition and a transient operating condition. In particular, a process does not behave in a normal manner in a transient region, and a false diagnostic (e.g., abnormal operation) may easily be construed from the transient operation. For example, in fired heaters the outlet temperature of crude oil overshoots and takes time to drop to the normal level when the flowrate of crude oil increases. This is because the change in flowrate is faster than the change in the manipulated variable (fuel flowrate). In other words, in first order dynamic systems, the final temperature will need time equal to the time constant plus any lag time to reach its new steady-state point. Hence, it is useful to distinguish between dynamic transient region and steady-state, or set point, regions of operation when detecting a fault or abnormal situation.

In accordance with another aspect of the disclosure, a transient operation is detected using a multivariate statistical technique based on, for instance, principal component analysis (PCA). The disclosed technique is described in connection with dynamic transients in fired heaters, although the disclosed technique is well suited for implementation in connection with other process control contexts. The detection method may also integrate PCA-based techniques with principal component regression (PCR) to differentiate between abnormal situations and dynamic transients in processes, such as fired heaters. The example of detecting coking (or fouling) in fired heater tube-passes will be used to illustrate the robustness of the proposed method. It is important to identify transient behavior of the process to avoid false alarms in the detection algorithm. Detection during transient operations may lead to false results and false alarms. It is also noted that the disclosed transient detection techniques may be utilized to address transient modes in other processes or unit operations, such as distillation columns and heat exchangers, for example.

Figure 24:
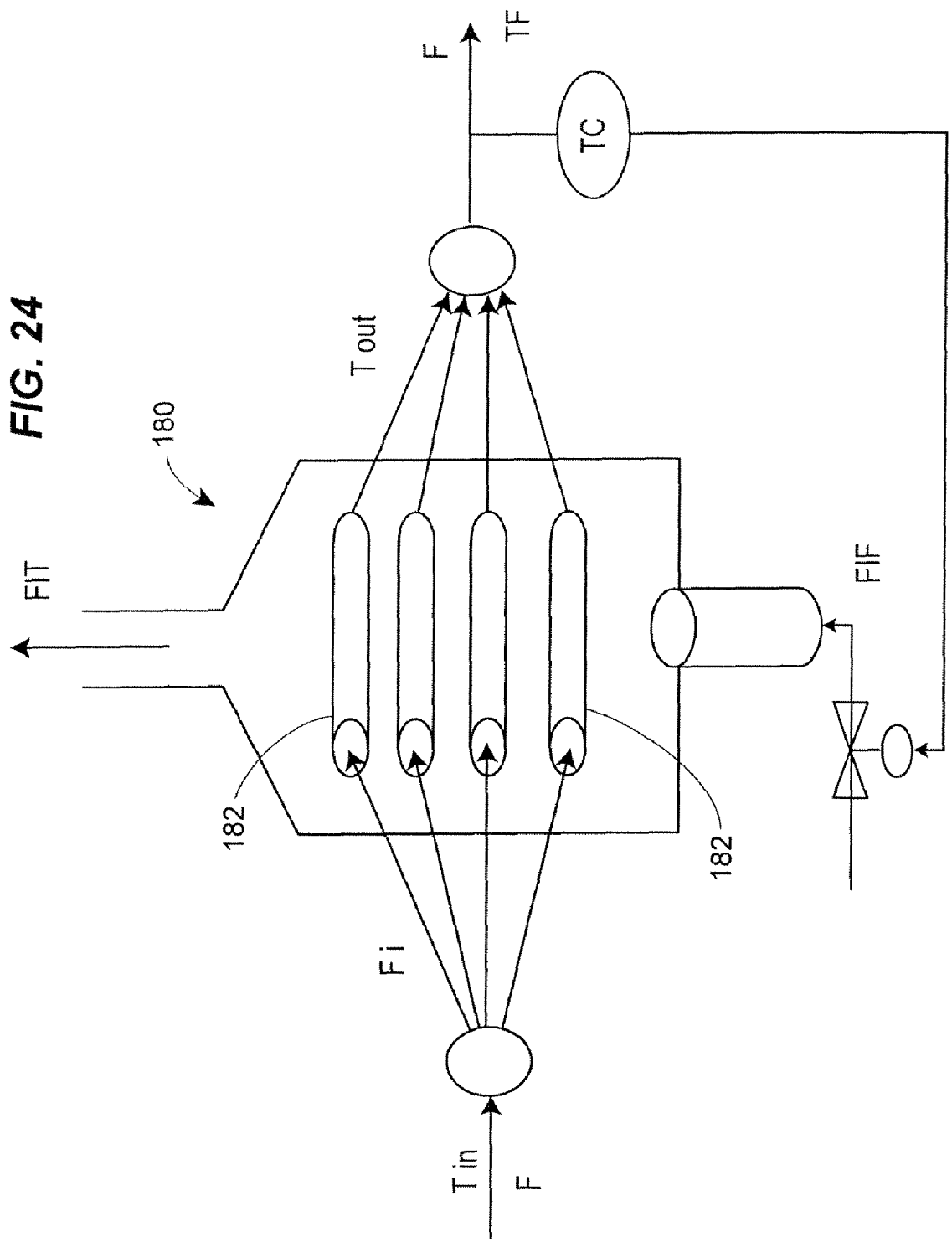
FIG. 24 is a schematic diagram of a fired heater, an exemplary process to which the disclosed techniques and MMDM tools of the present disclosure may be applied for monitoring, diagnostics and fault detection.

Turning to FIG. 24, fired heaters are often used in refineries and petrochemical plants to raise the temperature of crude oil or heavy hydrocarbons to some elevated temperatures. A fired heater indicated generally at 180 includes one or more tube-passes 182. In this example, the feed is split evenly among heater passes 182. Each tube-pass 182 acts as a heat exchanger where the feed flowing inside the tube-pass 182 is heated by the burning fuel. The flow of fuel is often manipulated to achieve desired target final temperature of the crude oil (feed stream).

A common abnormal condition in coker heaters, also referred to as fired heaters, is coking. In particular, due to elevated temperatures in the fired heaters, crude oil cracks and forms a residue carbon called coke. Coke gets deposited over time on the inside surface of tubes, also referred to as passes, causing lower performance of the tubes or the fired heater in general. This process is called fouling. As time progresses, the performance of coker heaters gets poorer and sudden shut down may take place to clean the coker heater. In some instances, some tubes may get severe blockage. As such, coke formation is monitored inside coker heater tube passes to schedule unit cleaning.

Coker heaters present a multivariate data structure that is well suited for analysis using the multivariate monitoring and diagnostics techniques and tools described herein, referred to herein at times as MMDM (i.e., multivariate monitoring and diagnostics module) tools. For example, the process variables (PVs) set forth in Table 1 may monitored and processed by the MMDM tools in accordance with the techniques described herein. These process variables are also illustrated in FIG. 24. However, it is noted that process variable data may be supplied in any desired fashion via the process control system or network, as described above, and in accordance with a variety of different architectures and platforms, such as the PlantWeb® digital plant architecture and by using Emerson FOUNDATION™ Fieldbus devices (e.g., Micro Motion coriolis flow meters, Rosemount temperature devices, etc.) for example.

TABLE 1

Monitored Variables for Fired Heater

| Monitored Process Variables | Abbreviation |
|---|---|
| Inlet temperature of crude oil | $T_{in}$ |
| Flow rate to each pass | $F_i$ |
| Total flow of oil | F |
| Exit temperature of the targeted pass | $T_{out}$ |
| Final temperature of crude oil (controlled variable) | TF |
| Fuel flow rate | FIF |
| Final temperature of fuel | FIT |

Figure 25:
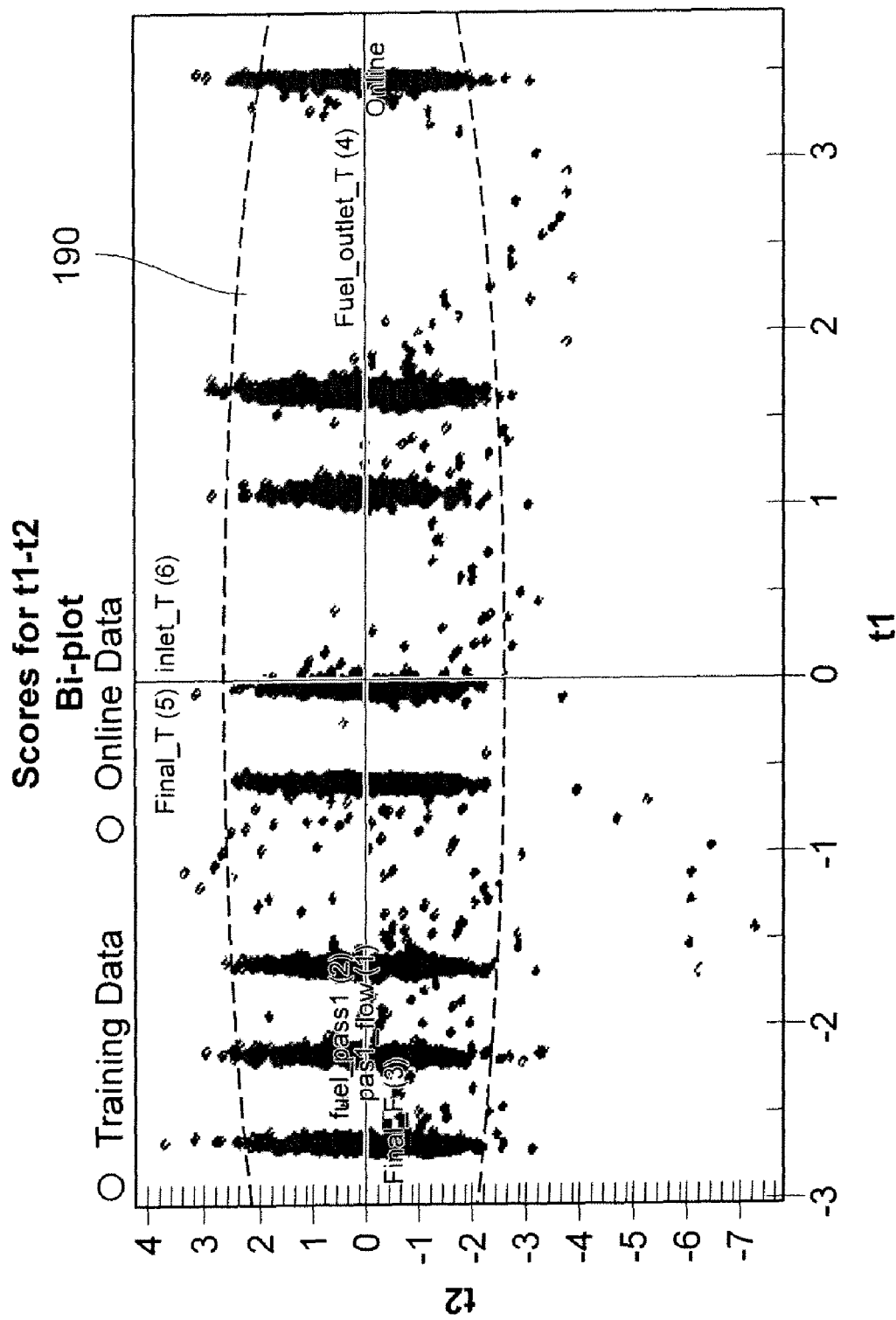
FIG. 25 is a graphical representation of training data scores mapped to a two-dimensional space based on principal components t1 and t2, the training data being used for PCA-based monitoring, diagnostics and fault detection in connection with the fired heater of FIG. 24.

FIG. 25 presents training data scores developed from PCA in a space defined by principal components $t_1$ and $t_2$. In this example, the underlying training data was gathered for various flowrates with a single set point of the controlled variable. Approximately 30,000 real-time process data points were collected. The training data was used to develop models for the MMDM tool, and one of the scatter plots produced by the MMDM tool may correspond with the plot shown in FIG. 25. The eight clusters in the scatter plot correspond with the eight different flowrate regions in the training data.

Figure 26:
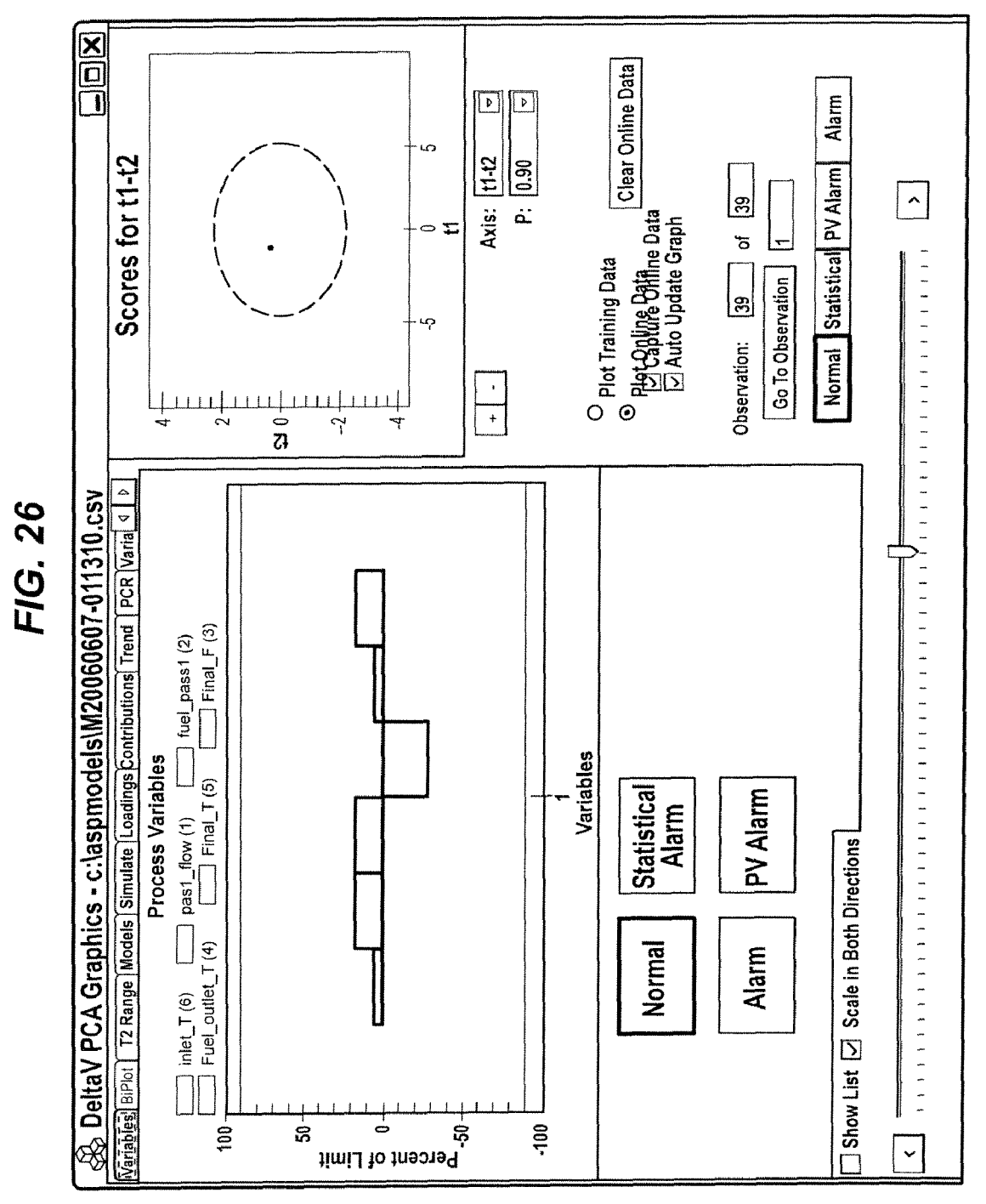
Figure 27:
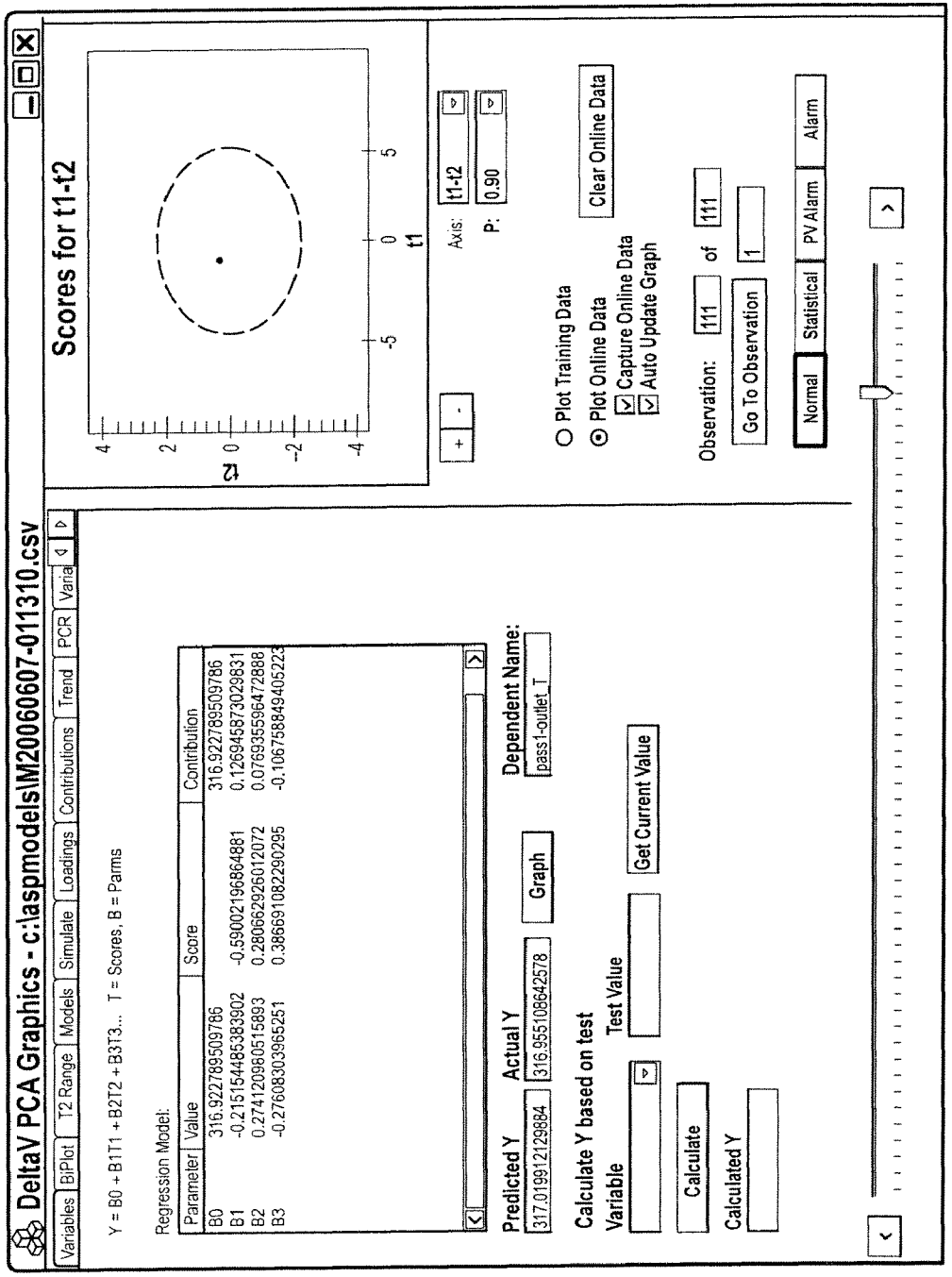

The region inside the dashed line 190 shown in the plot of FIG. 25 corresponds with the ellipsoid shown in FIGS. 26 and 27, which, in turn, represents the 99% confidence ellipsoid. That is, the area inside the ellipsoid gives 99% probability that any score within the boundaries of the ellipsoid belongs to a normal operating condition of the fired heater unit.

Turning to FIGS. 26 and 27, the outlet temperature of a tube pass ($T_{out}$) was used as the dependent variable in this aspect of the disclosure and the other six variables were treated as independent variables. The independent variables are selected for monitoring, and used to create a normalized process variable data model, as well as a PCA model with score plots. The process variable data provides training data for the model development. The model is then used to define the operator user interface for on-line monitoring, as depicted in FIG. 26. As described above, the interface displays the independent process variables in both normalized and scoreplot fashions, as well as the process alarm status indicators. Generally speaking, the interface may be generated as described above in connection with FIG. 8 and may incorporate any one or more aspects of the exemplary interfaces described in connection with FIGS. 9-21.

As for the dependent process variable ($T_{out}$), the training data is used to create a regression type PCR model. This is accomplished by the MMDM tool during the model building session. That is, components from the data space created by the PCA model are used as independent components in creating the PCR model that models the dependent process variable as a function of the independent process variables. In the context of the interface, the PCR model may be accessed by pushing the "PCR" tab in the operator interface window, and the display window depicted in FIG. 27 appears. This display window shows regression coefficients computed for the score components $T_1, T_2, \ldots, T_n$.

Figure 28:
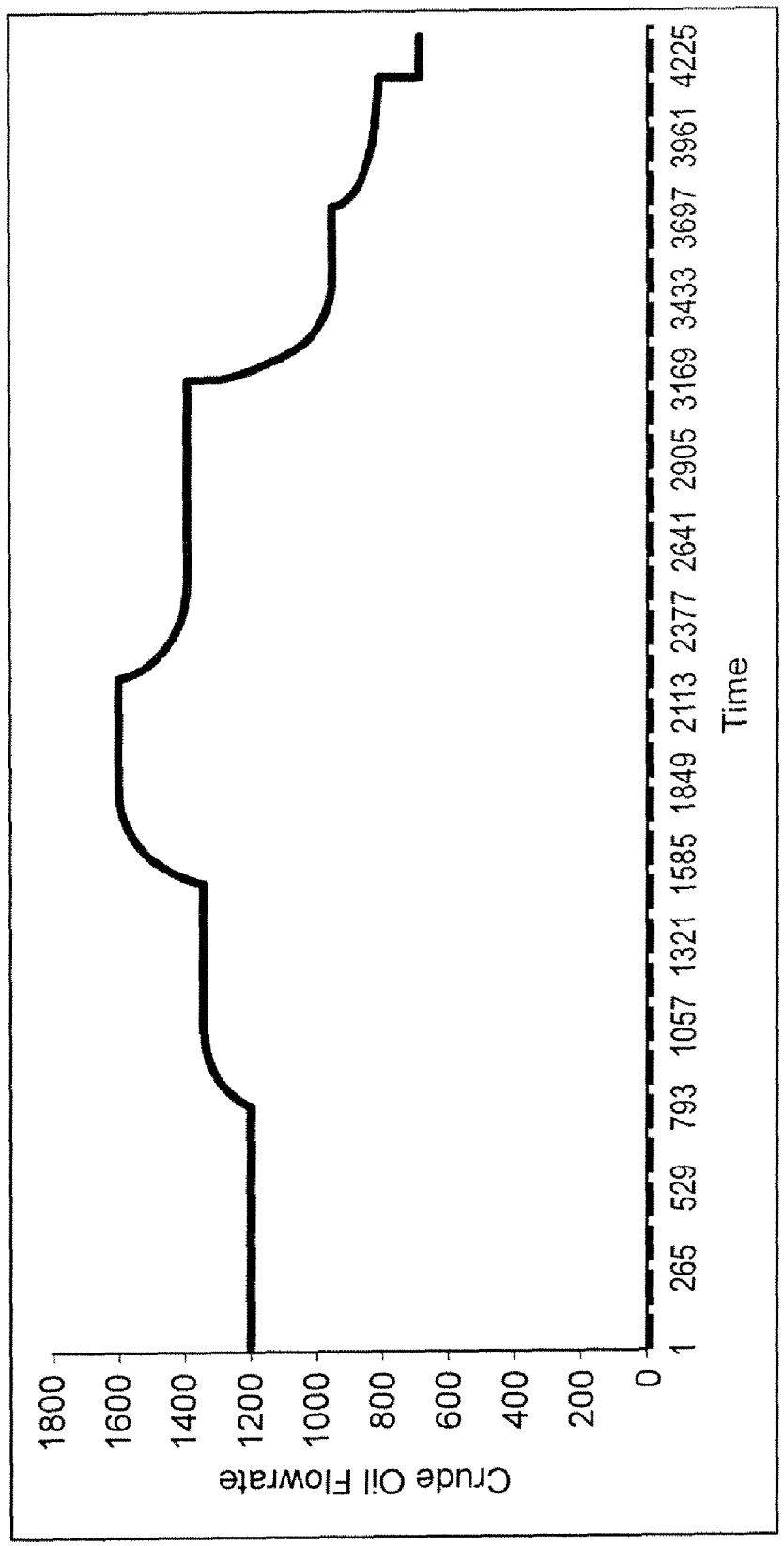
FIG. 28 is a graphical plot of crude oil flow rate data to be used as validation data in connection with a multivariate statistical technique for detecting or determining dynamic operation in accordance with another aspect of the disclosure.
Figure 29:
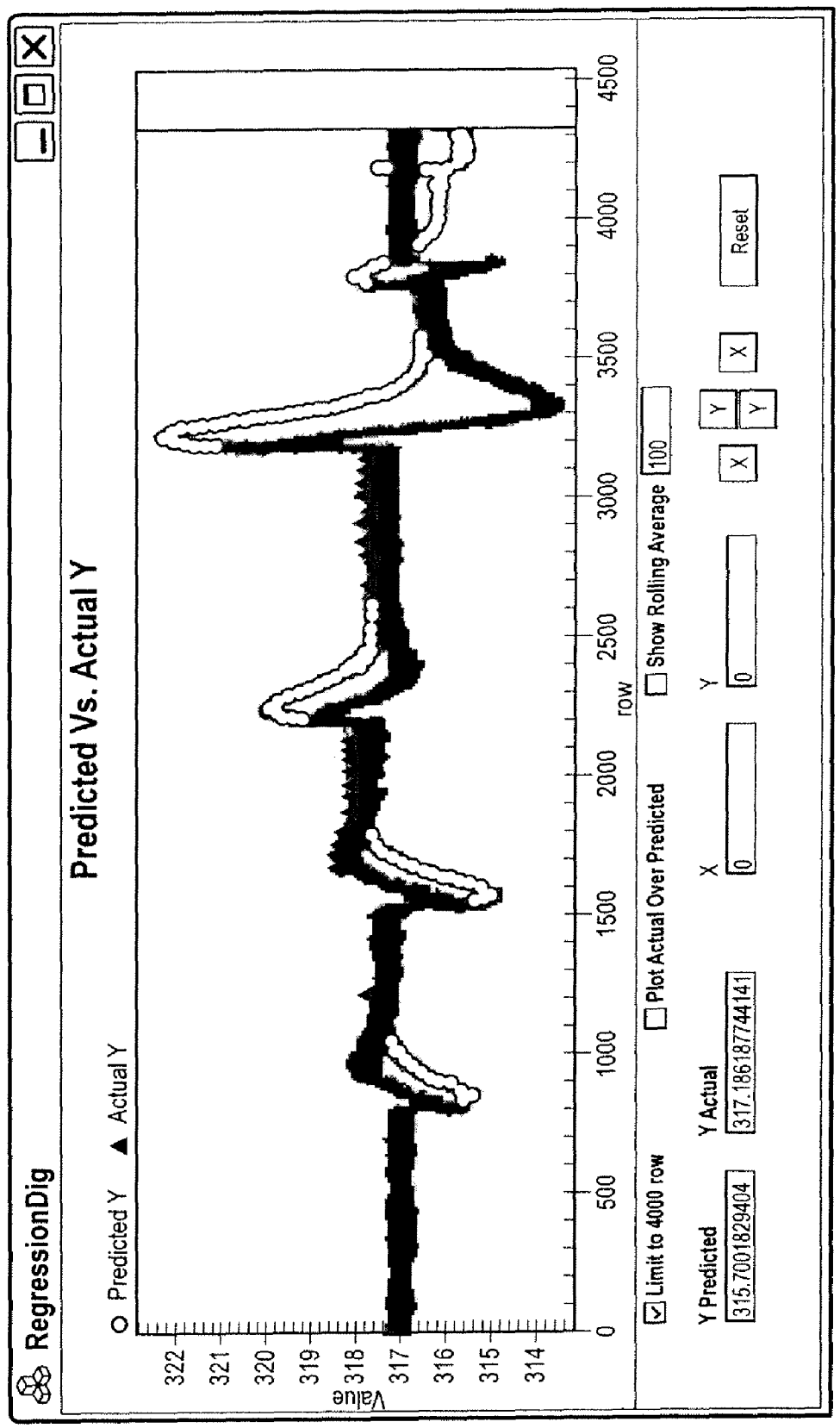
FIG. 29 is a graphical plot comparing the actual output temperature data ($T_{out}$) associated with the flow rates depicted in FIG. 28 with the output temperatures predicted by a PCR model of the multivariate statistical technique for detecting or determining dynamic operation.

To validate a detection of transient behavior by using the PCA model developed, a validation data set (4300 data points) was created for various crude oil flowrates. FIG. 28 shows seven different regions for the crude oil flow rate for the validation data. In this example, there are six different transient (dynamic) regions in the validation data, and the PCR model was used to predict these regions from the validation data. FIG. 29 shows the predicted $T_{out}$ (Y) vs. actual $T_{out}$. The overlapping plots shown in FIG. 29 exhibit the success of the PCR model in predicting the dependent variable (Y) in both steady-state and transient regions. The prediction in the transient regions is slightly lagging, which is in agreement with expectations. Nevertheless, the six transient regions present in the validation data set are clearly identifiable in FIG. 29.

Figure 30:
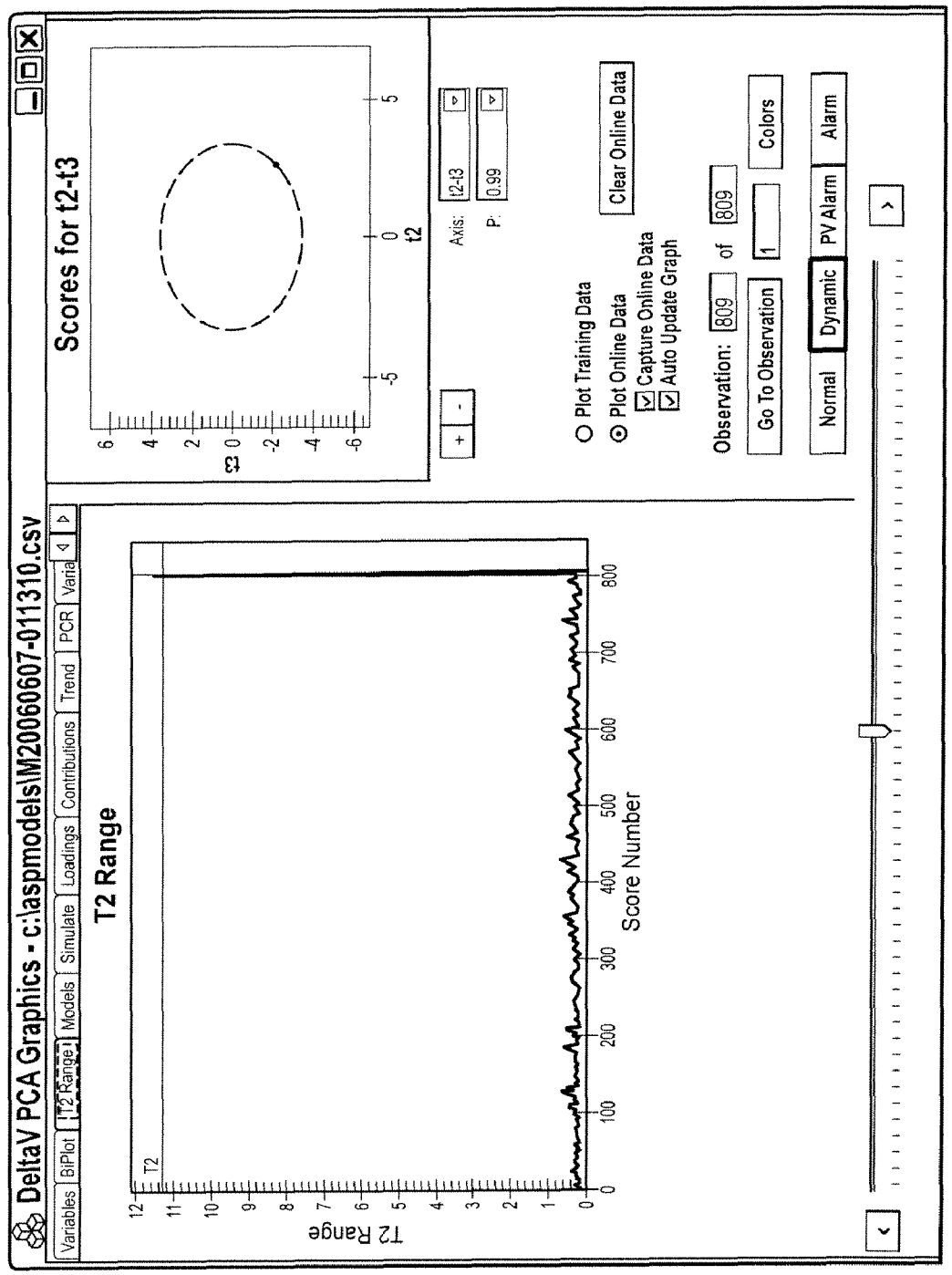
FIGS. 30-36 are exemplary user interface displays generated in connection with the implementation of the multivariate statistical technique for detecting or determining dynamic operation.
Figure 31:
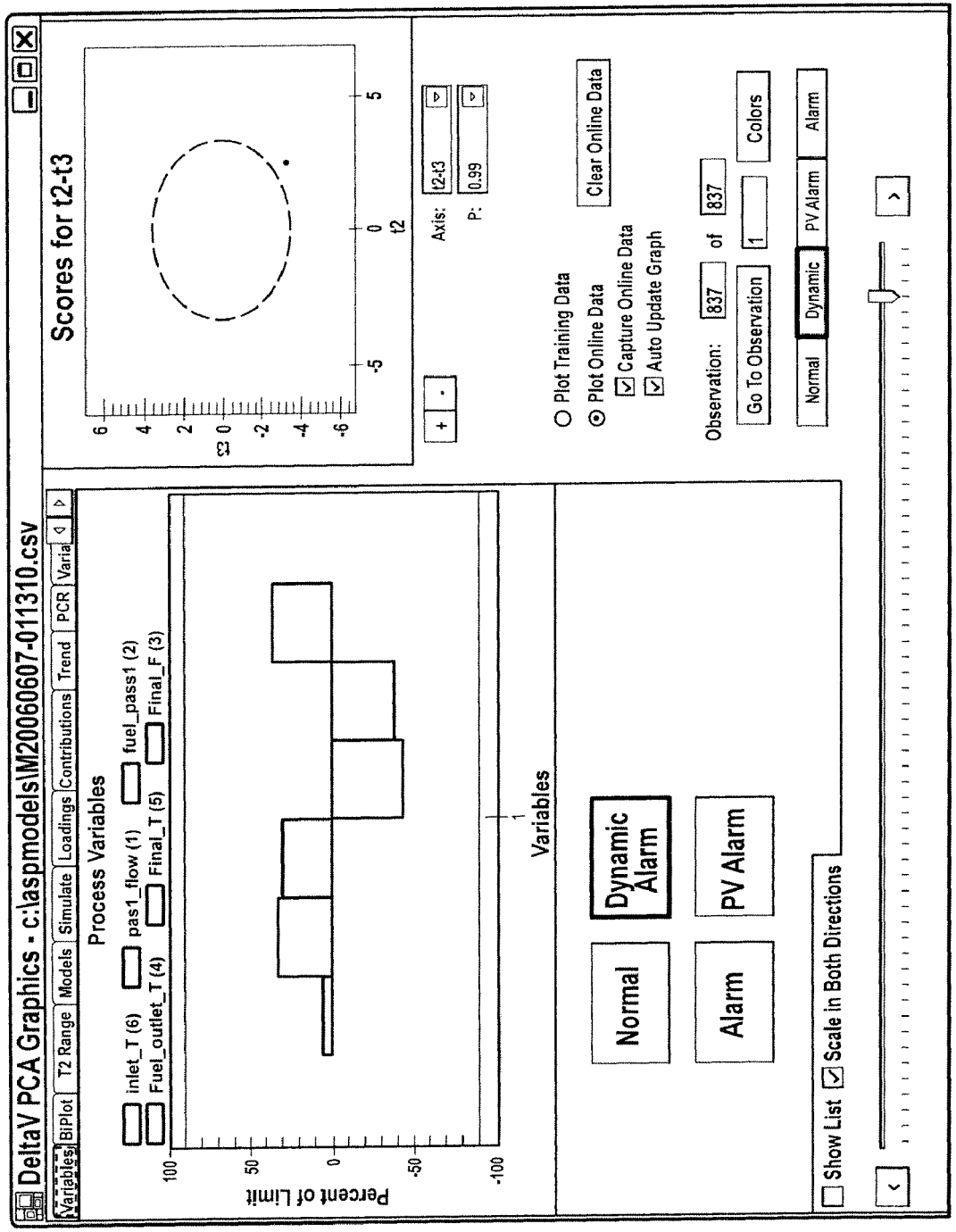
Figure 32:
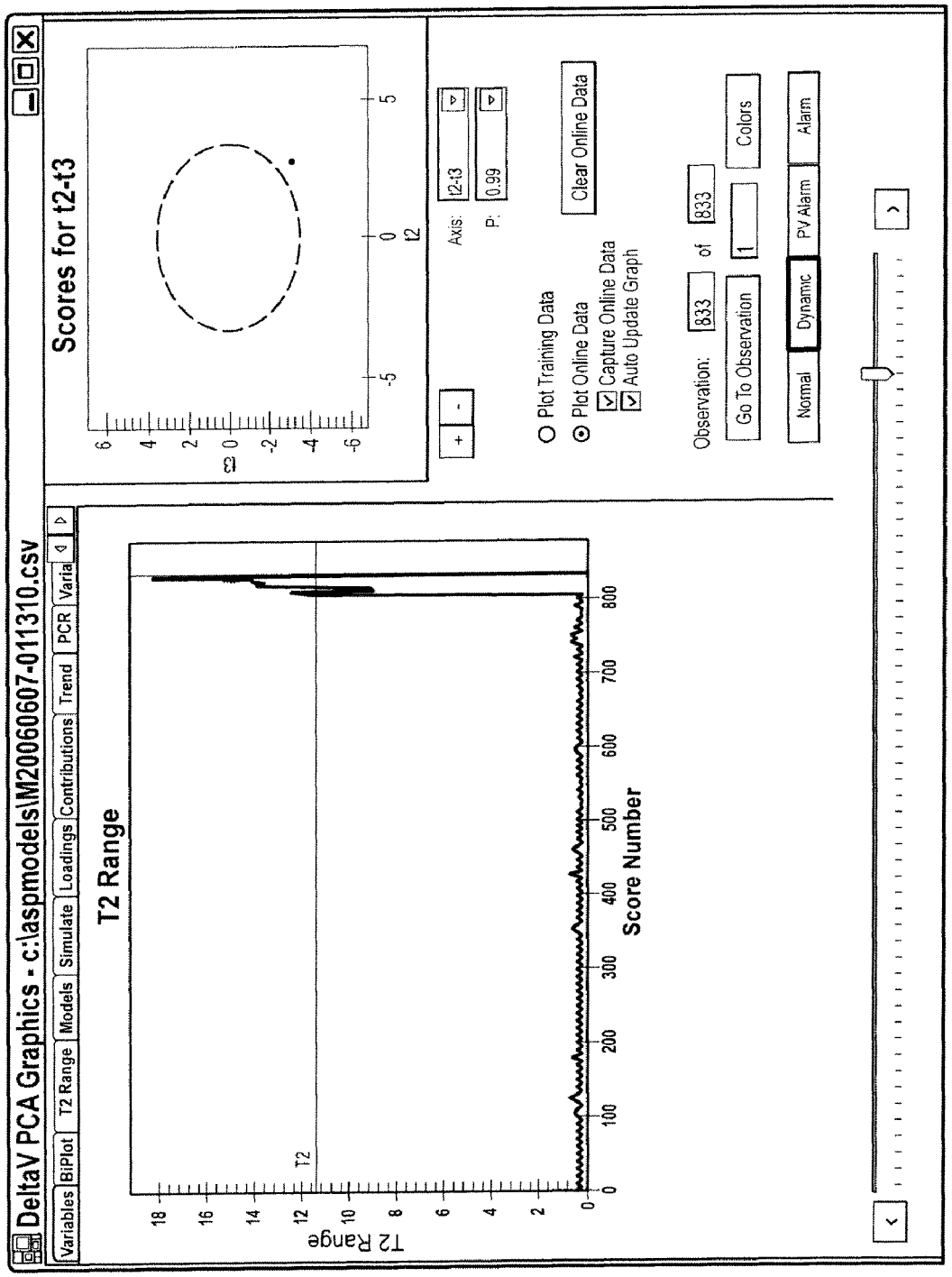
Figure 33:
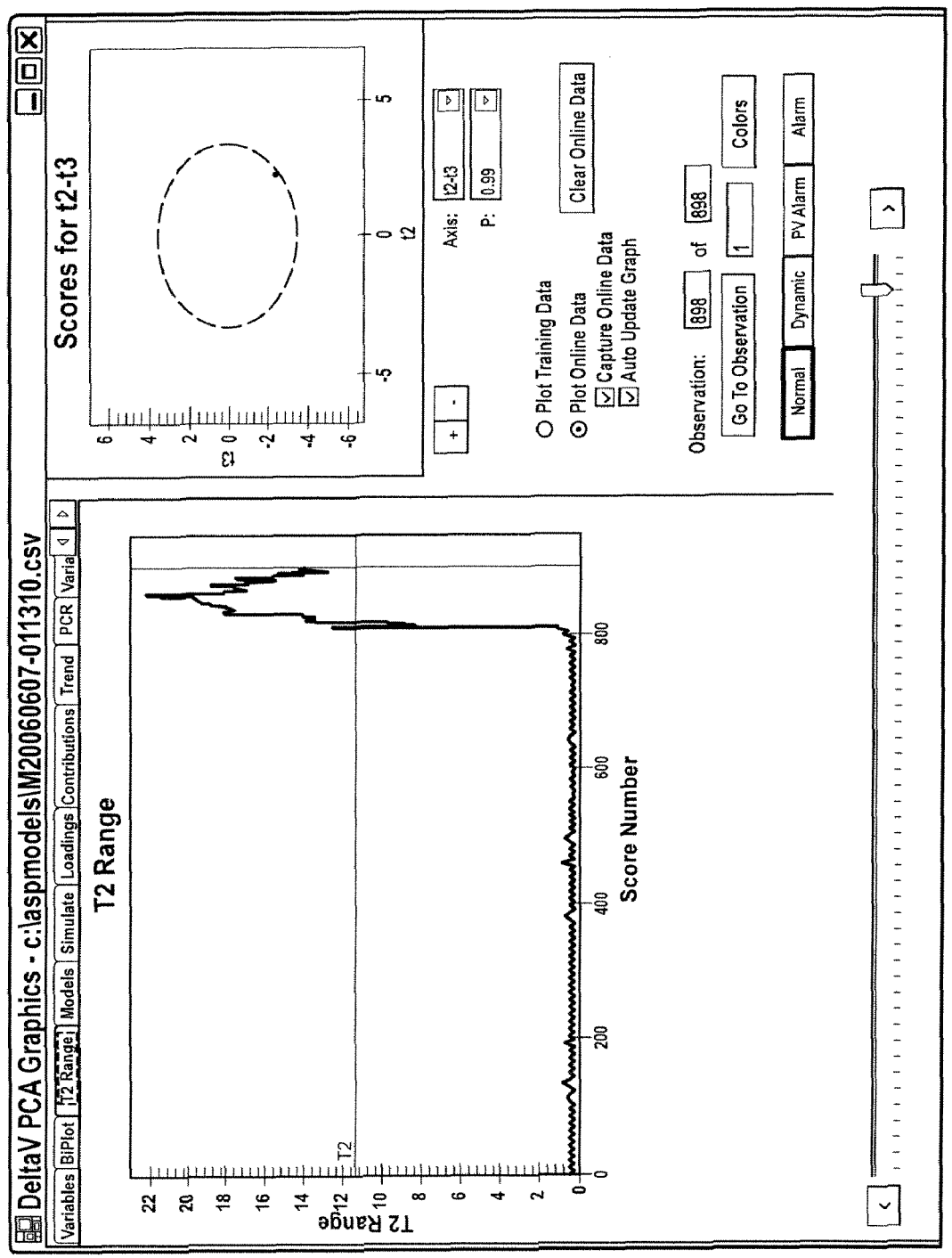
Figure 34:
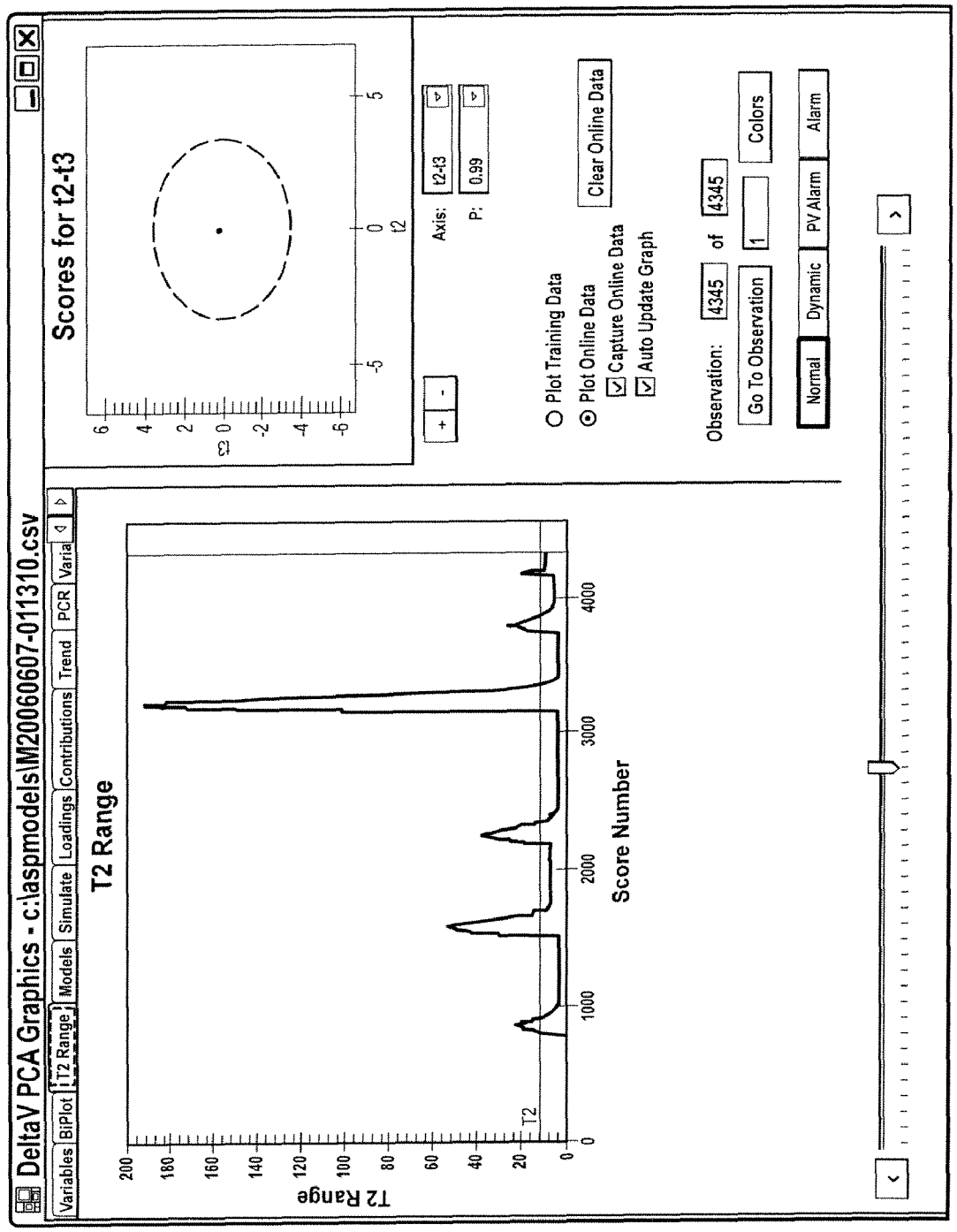

FIGS. 30-34 depict the use of the Hotelling ($T^2$) computation, and the corresponding portion of the operator interface, for transient region detection. Specifically, FIG. 30 shows a $T^2$ plot at the moment the transient region starts. In particular, $T^2$ spikes up as flowrate of crude oil starts to change. In addition, FIG. 30 shows that the point of operation is outside the ellipse of scoreplot $t_2$-$t_3$. FIG. 31 shows that dynamic (transient) region was detected by PCA even though none of the independent variables are outside the limit. As dynamic transient progresses $T^2$ stays outside the acceptable limit and the scoreplots are outside the ellipsoid (FIG. 32). Once the process settles to the new steady-state region (FIG. 33), the $T^2$ response is below the limit and the scoreplot is inside the ellipsoid region. As can be seen, the PCA scoreplots and $T^2$ representation may be used to detect transients in process variables, as well as to estimate a transient time constant. FIG. 34 illustrates all six transient regions detected by $T^2$ for the whole validation data. The width of each transient region represents the transient duration.

Figure 35:
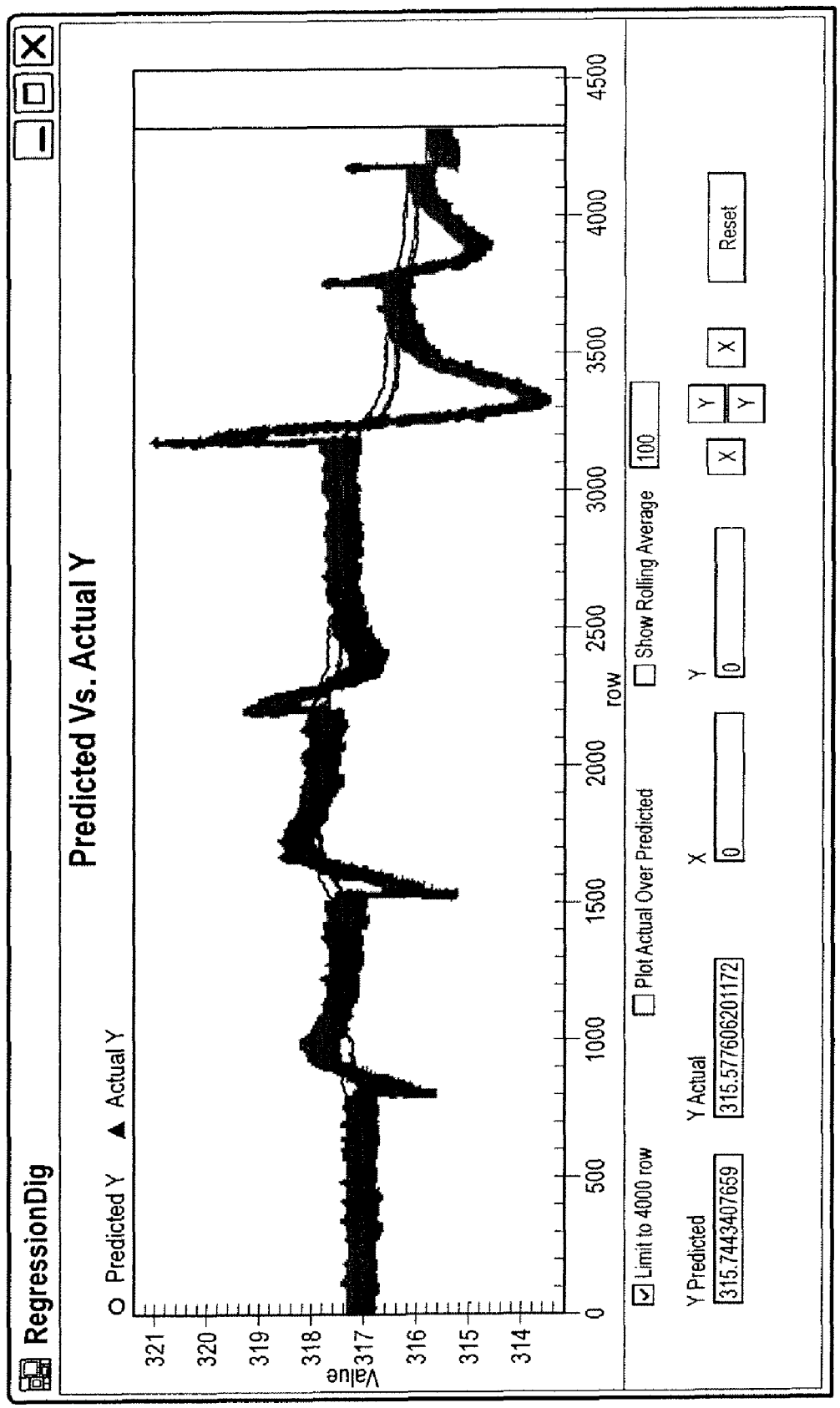
Figure 36:
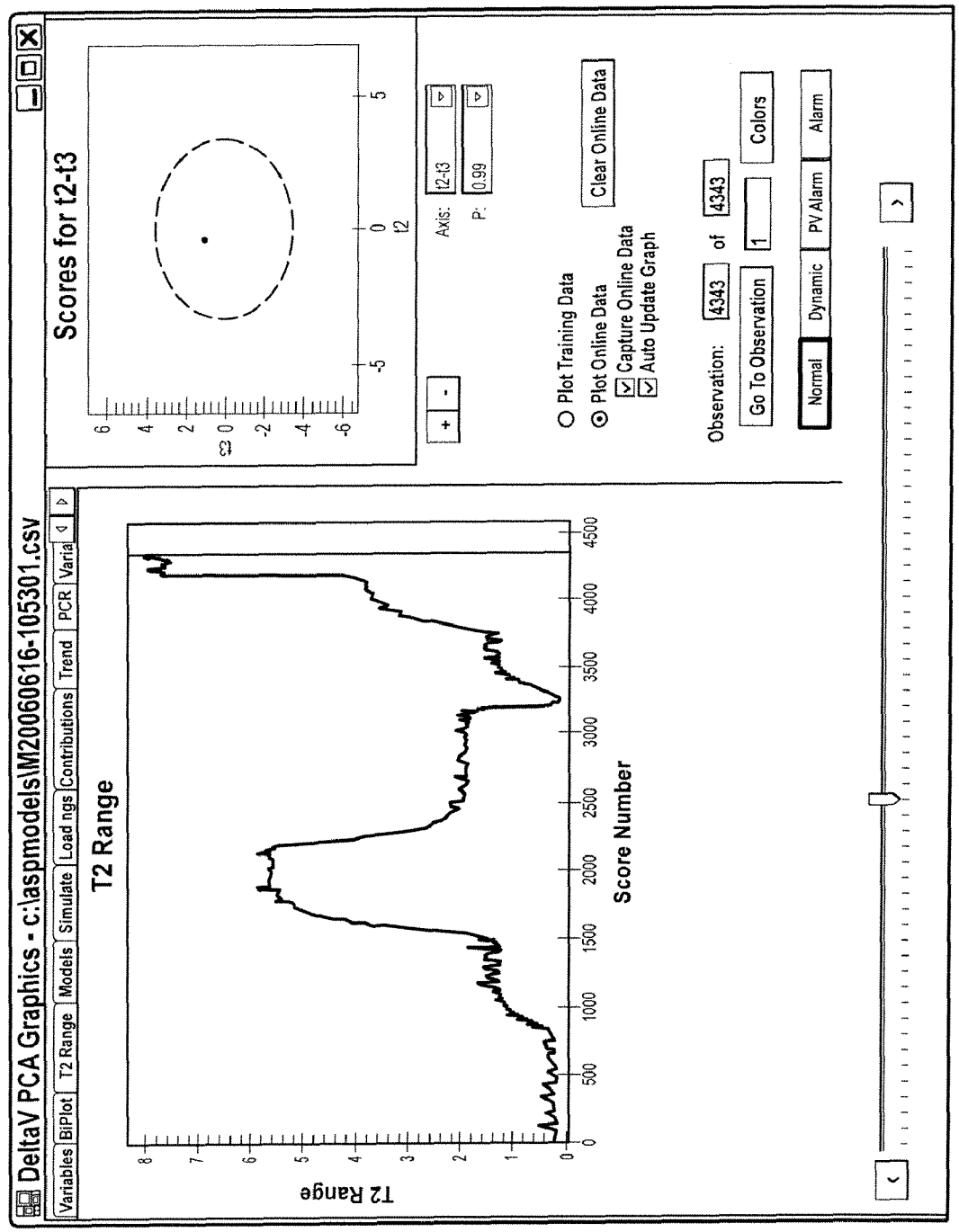

FIGS. 35 and 36 depict the results of an approach that does not utilize the controlled variable in the PCR analysis. In so doing, the usefulness of incorporating the controlled variable, and how it affects the detection robustness of the proposed method, is described. In the coker heater example used in this work, the final temperature (TF) of crude oil is the controlled variable. In this example, it is desired to heat crude oil to a desired set point, final temperature. As before, a PCA model was developed using 5 of the 6 independent variables for the same training data: final temperature (TF) of crude oil was removed from the list. The new model was verified by using the same validation data as was used in the 6 variable analysis. FIG. 35 shows that the new model is not able to detect the dynamic behavior of the process. $T^2$ was also obtained for the validation data using the new model. FIG. 36 shows that spikes obtained in the 6 variable model no longer exist. Based on the foregoing, the inclusion of controlled variables in the model is useful in detecting transient or dynamic behavior, which may be expected given that controlled variables are often directly affected by changing load or input variables.

Figure 37:
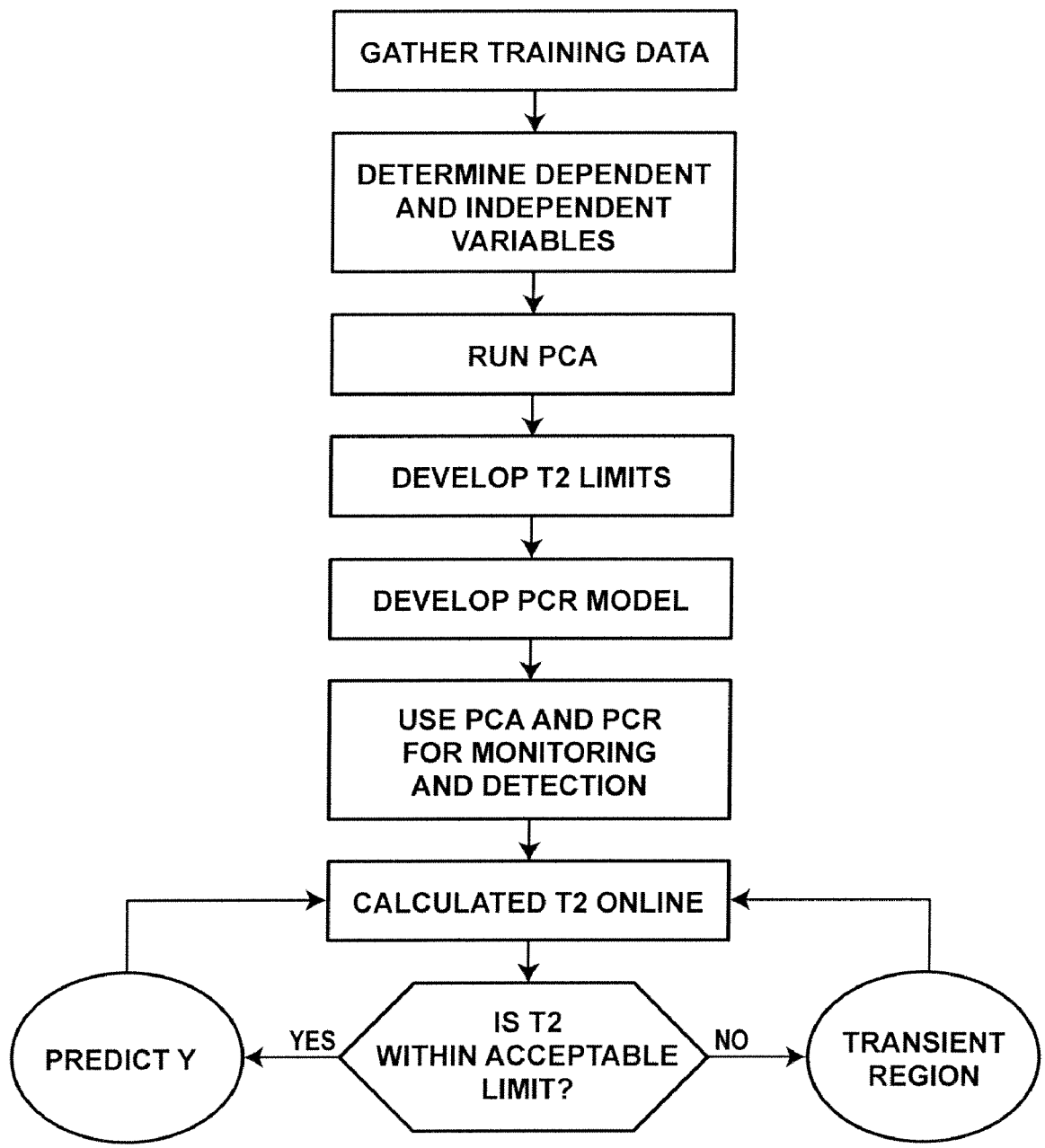
FIG. 37 is a flow diagram of the multivariate statistical technique for detecting or determining dynamic operation in accordance with one embodiment.

FIG. 37 is directed to a procedure for coking detection. From the discussion above, it is apparent that during the transition period the process behaves dynamically and the predicted Y is different than the actual Y. As such, abnormal condition detection may be halted during a transient condition, which may be accomplished using the behavior of $T^2$. For example, abnormal condition detection may be disabled if $T^2$ is outside the limit. If $T^2$ goes back within the acceptable limit, then abnormal condition detection will resume/start. For example, referring to FIG. 37, on-line process control data from a process is collected as training data at a block 202, from which the independent and dependent variables are determined at a block 204. At a block 206, PCA, or another multivariate analysis technique, is utilized on the independent variables to reduce the dimensions of the multivariate data space. At a block 208, the Hotelling ($T^2$) limits are determined from the PCA executed at block 206. A PCR model is developed at a block 210 using the components from the PCA model as the independent variable(s) and using the dependent variable(s) determined from block 204 to develop a model of the dependent variable(s) as a function of the independent variable(s). At a block 212, both PCA and PCR may be used to monitor the process based on monitored process control variables and detect abnormal conditions. For example, if an abnormal condition is detected using PCA, PCR may be utilized to determine whether the abnormal condition is a transient condition or an actual (or predicted) abnormal condition. In particular, PCR may be used to develop a prediction as to when transient conditions occur and may be compared against the occurrence of an abnormal condition. At a block 214, the $T^2$ values are generated based on the monitored data, and if the $T^2$ values are within acceptable limits, abnormal condition detection continues (block 218) and the occurrence may be treated as an abnormal condition. Otherwise, the procedure determines the occurrence as a transient condition. When $T^2$ returns within acceptable limits, abnormal condition detection may resume. The disclosed detection method and technique may be applied to other processes and unit operations such as distillation columns, heat exchangers, turbines, etc, and is well suited for different process applications in chemical, refining, power, and life science industries.

In accordance with the foregoing aspect of the disclosure, a PCA-based monitoring technique has been implemented for on-line detection of transient behavior in process operations. A PCR regression technique may also be for on-line detection of transient behavior in process operations. The combination of both PCA and PCR techniques supports the characterization of process alerts, as the disclosed techniques can distinguish between an alert of an abnormal situation prevention type and one caused by process transients. Alternative designs are possible by using techniques such as multivariable regression, artificial neural-networks and Bayesian decision trees.

Exemplary Application: Coke Detection in Coker Heaters with PCA and PCR

Turning to FIGS. 38-41, another aspect of this disclosure is directed to using PCA and PCR techniques to detect coking (or fouling) in coker heater tube-passes. In the embodiments described below, PCA and PCR techniques are used to collect and analyze off-line data and then monitor the process on-line to detect coking. The disclosed methods and techniques may be integrated with any of the controllers, field devices and other process control system elements described herein.

As described below, the disclosed coking detection method generally includes three steps: gathering training data, developing a model using PCA and PCR techniques, and using actual and predicted values of a targeted process variable to detect the coking fault. The training data gathered is generally real-time data, which is free of faults and representative of the expected operational range of the load variables. For example, training data may include minimum and maximum crude flow rates that are expected to be encountered in running the fired heater. The model to be developed may also benefit from having several flowrates between the minimum and maximum flowrates. In some cases, training data is gathered to cover each range of load variables, and may also include transient (i.e., dynamic) data for changing load variables. Generally, the sampling time and set point for the controlled variable may remain constant throughout the training data set. Given data having the foregoing characteristics, the training data may be collected in a variety of ways. For instance, data may be collected on-line or be extracted from the process data historian. In any case, practice of the disclosed method is not limited to the manner in which the training data is gathered.

Multiple process variables are used to support robust coke detection in the tube-passes. In this exemplary case, the disclosed method utilizes the process variables set forth in Table 1 and depicted in FIG. 24. Of these, tube-pass outlet temperature ($T_{out}$) is the monitored dependent process variable, as it should decrease with coke formation inside the tubes. For coker heaters, as coke (fault) starts forming inside the tubes, the overall heat transfer across the tube from hot side to cold side decreases. Compared to normal operation conditions (fault free), the tube-pass outlet temperature ($T_{out}$) should also decrease. The other six variables in Table 1 are considered to be independent variables.

The coker heater provides a multivariate data structure well suited for explaining the analysis using the above-described multivariate monitoring and diagnostics module (MMDM). Once the independent variables are selected for monitoring, the selected variables are used to create a normalized process variable data model, as well as a PCA model with score plots. The gathered process variable data provides the training data for model development. The developed model is then used to generate the operator interface for on-line monitoring, as described above. As shown in, for instance, FIG. 26, the six independent process variables are displayed in both normalized and scoreplot fashions in conjunction with the four process alarm status indicators. The details of the model and operator interface are set forth above.

As for the dependent process variable ($T_{out}$), the training data is also used to create a regression-type PCR model. As described above, the generation of the PCR model is accomplished automatically by the MMDM tool during implementation of the model building procedure. In the context of the interface, the PCR model may be accessed by selecting the "PCR" tab in the operator interface, which may generate the exemplary display window shown in FIG. 27. As described above, this display window shows regression coefficients computed for the score components $T_1, T_2, \ldots, T_n$.

Embodiments of the disclosed fired heater monitoring system and method suitable for coke detection are now described. Coke formation may be indicated if the actual value of $T_{out}$ (Y) is consistently lower than the predicted value $\hat{T}_{out}$ ($\hat{Y}$). For example this may mean that the actual pass outlet temperature is continuously lower than the predicted temperature. In this case, no false alarms or alerts are generated. Absolute values or mean values of Y can be used for this purpose. As illustrated further below, the deviation of the actual Y from the predicted $\hat{Y}$ can give an accurate indication of the severity of coking. This tool may be utilized by plant engineers and operators to schedule unit cleaning or shut down based on the actual unit performance. In one example, the ratio $Y/\hat{Y}$ may be plotted as a function of time, such that plant engineers or operators may continuously monitor the performance of the unit and detect unit degradation or coking. Alternatively, the difference between the two values can be monitored as function of time. Based on the ratio of Y to $\hat{Y}$, plant personnel can decide what action to take. Since coking is a slow process, plant personnel may not select to enforce alarms or alerts. However, alerts or alarms may be activated based on threshold limits. For example, alerts can be issued if the ratio gets down to a certain limit ($\lambda$). For instance, $$\text{if } \left(\frac{Y}{\hat{Y}}\right) \leq \lambda,$$

then an alert may be issued. Various alerts may be issued to indicate the severity of coking. For example, $\lambda_1$ indicates low coking, $\lambda_2$ indicates medium coking, etc.

More generally, the disclosed coke detection method includes the following steps: obtaining sufficient training data, developing a statistical model, and using the model for monitoring unit performance. In one example simulation, the training and validation data for the coker heater was generated by, and obtained from, a hi-fidelity simulator, SSPRO, commercially available from GSE Systems. The sampling rate was one second. The flowrate of fuel was manipulated to achieve the desired target final temperature of the crude oil. The simulation had flexibility to introduce coking of various severity levels. The simulation was used to obtain training data and simulation data. The seven process variables were recorded and used in the multivariate analysis provided by the MMDM tool.

The training was run with various flowrates. The flowrate and inlet temperature of the crude oil were allowed to have uniform noise, as to imitate real plant operation. Approximately 30,000 real-time process data points were collected. The training data was used to develop MMDM models, and the scatter plot produced by the MMDM tool is illustrated in FIG. 25, which depicts eight clusters which correspond to the eight flow regimes in the training data. FIG. 25 also displays the 99% confidence ellipsoid. The area inside the ellipsoid gives a 99% probability that any score within the boundaries of the ellipsoid belongs to a normal operating condition of the fired heater.

Several real-time simulation data files were collected with various coking levels to test the robustness of the proposed abnormal situation detection. The simulation data points contain both good and faulty data. In order to introduce coking into the tube-pass, the overall heat transfer coefficient (U) was intentionally lowered. Several data sets were gathered as follows. In Set 1, the coefficient U was lowered from 1000 to 995, then to 990, to 980, and to 950. In Set 2, the coefficient U was reduced from 1000 to 500.

In this exemplary application, the PCR model developed for this specific case is $Y=B_0+B_1*T_1+B_2*T_2+B_3*T_3$, where $B_0=316.9227895$, $B_1=-0.215154485$, $B_2=0.274120980$, and $B_3=-0.276083039$. $T_1, T_2, T_3$ are the score components determined on-line (validation data) based on variable contributions.

Figure 38:
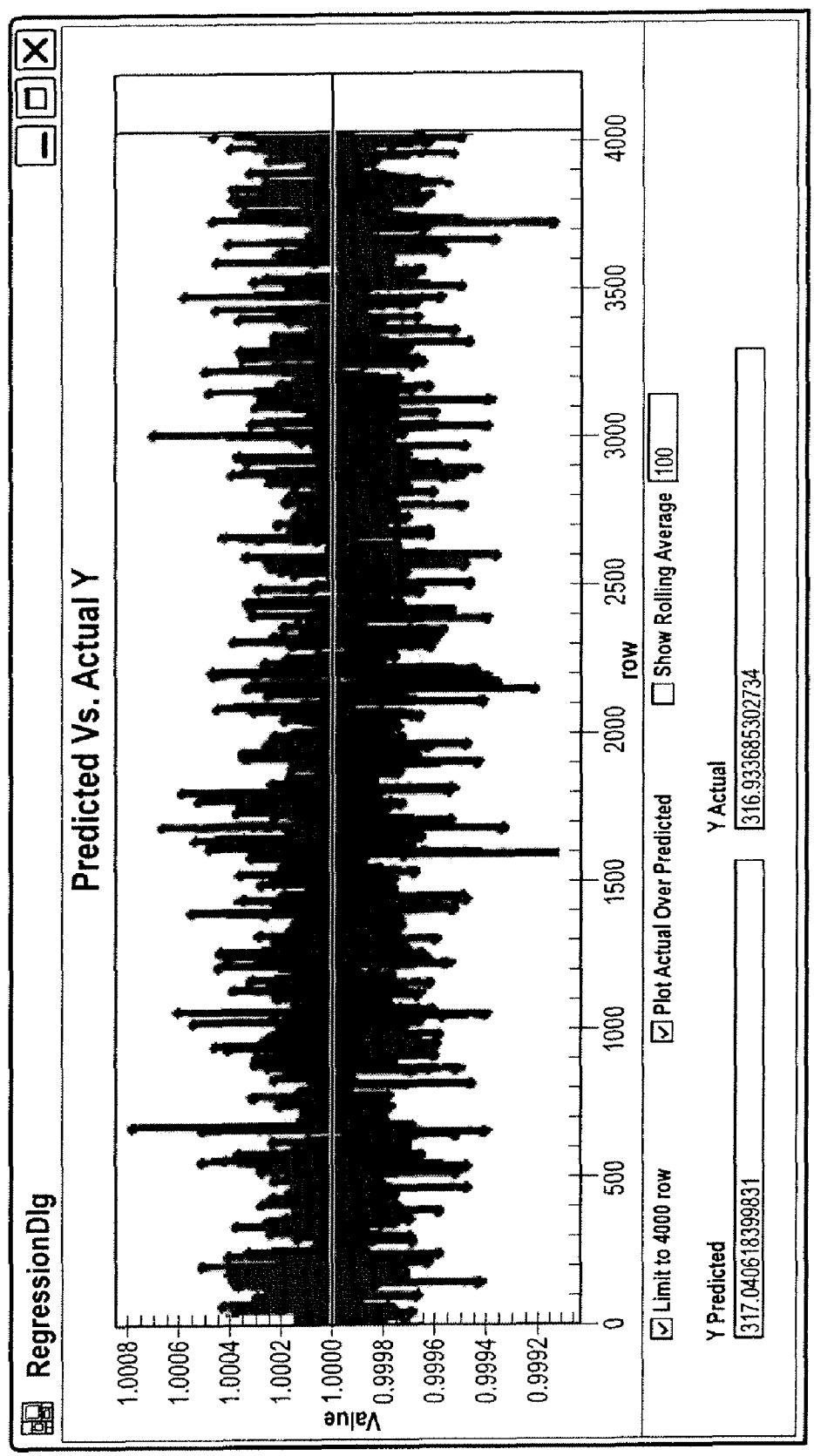
FIGS. 38 and 39 are graphical plots comparing actual output temperature data for an exemplary fired heater with data predicted by a multivariate statistical model that may be used for detection of coking in accordance with another aspect of the disclosure.

Before using this model for monitoring new data for abnormal condition (e.g., coke) detection, the model was tested by using a new set of validation data in order to ensure robustness of the model. FIG. 38 shows how accurate the PCR model was in predicting $Y$ ($T_{out}$). The model has accuracy higher than 99.9%, excellent accuracy given that the data was scattered among various operation conditions (FIG. 25). Accuracy would be even higher if the range of operation conditions was narrower.

Figure 39:
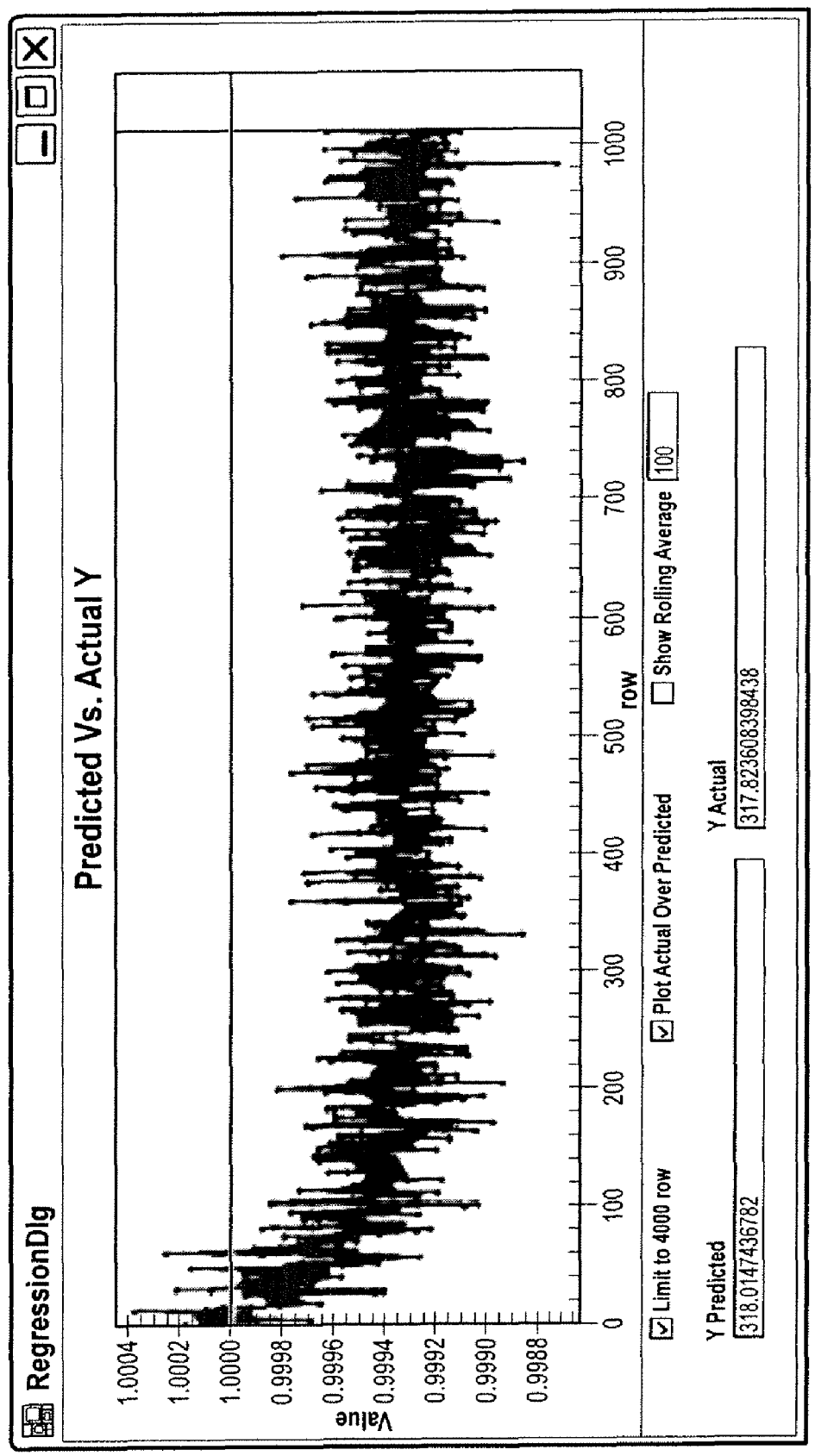

The model was also used to predict $Y(T_{out})$ for flow rates higher than what was used in the training data by 12%. In other words, the model was used to predict behavior of the process for flow rates outside the range of flow rates used in the training data. FIG. 39 shows that the prediction operated again with very high accuracy. It is noted that, the model may be used to data that remains within the training range (e.g., the range for which the model was trained).

Figure 40:
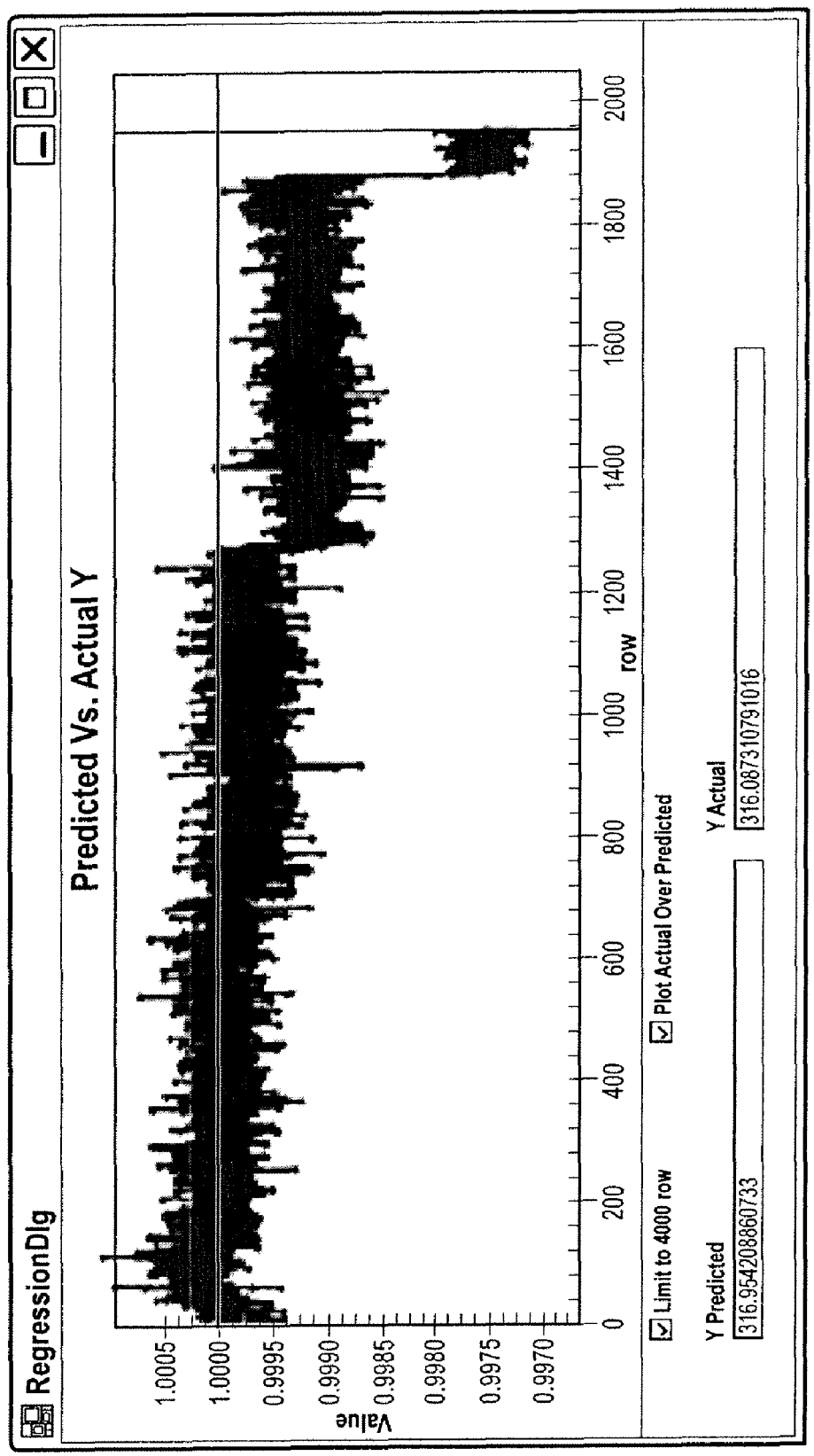
FIGS. 40 and 41 are graphical plots comparing actual and predicted output temperature data in accordance with one embodiment of the coking detection technique based on the multivariate statistical model.

The above-described model was used to detect coking in the validation data. The model was able to detect coking for all simulated validation data. FIG. 40 shows how the actual Y is lower than the predicted Y ($\hat{Y}$). The ratio of actual Y to $\hat{Y}$ gets lower as the coking increases (overall heat transfer coefficient gets lower). The predicted Y is the value of Y at normal conditions (fault/coking free). From the behavior of actual Y with respect to predicted Y, plant personnel can determine the severity of coking inside tube-passes.

Figure 41:
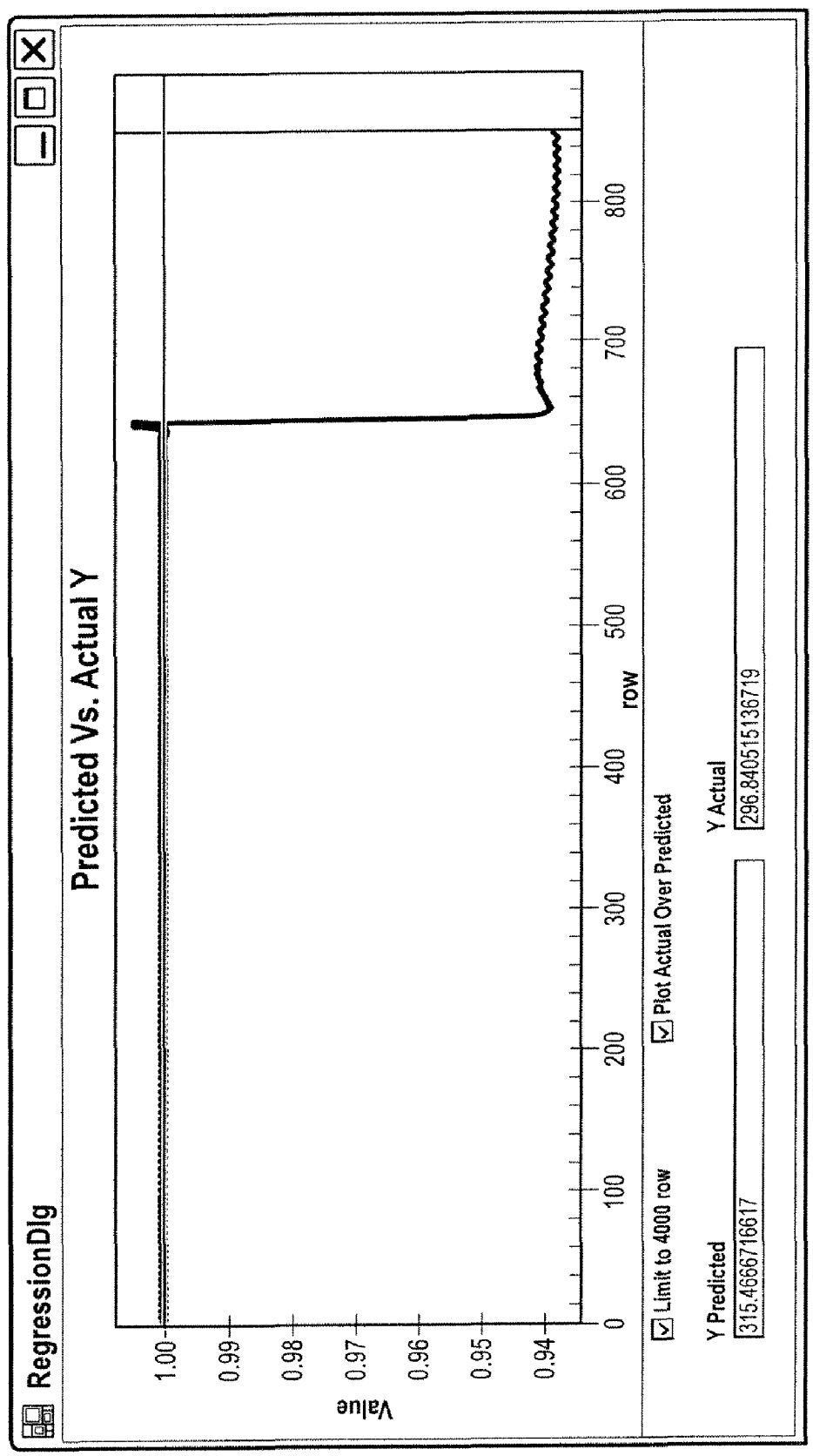

Another set of data was used to verify the proposed detection methodology. The set contains data or a normal process where a sudden large abnormal condition (coking) of high value is introduced. FIG. 41 shows how the ratio of actual Y to predicted Y changes. The first part of data in FIG. 41 demonstrated how good the model is in predicting the normal behavior.

In summary, the above-described technique (and underlying model) is directed to coke, fouling and other abnormal condition detection in coker heater tube passes using PCA and PCR. To that end, the inlet temperature of the crude oil, the tube-pass crude flowrate, the total crude flowrate, the tube-pass outlet temperature, the final temperature, the fuel flowrate, and the fuel outlet temperature may be monitored, and the tube-pass outlet temperature may be used as a performance indicator of the coker heater. In some cases, the performance indicator is modeled using PCA and predicted using PCR for operating conditions within the range of training data for the model. Nonetheless, PCR may be used for the prediction of the key performance indicator of the coker heater for operating conditions outside the range of the training data.

Figure 42:
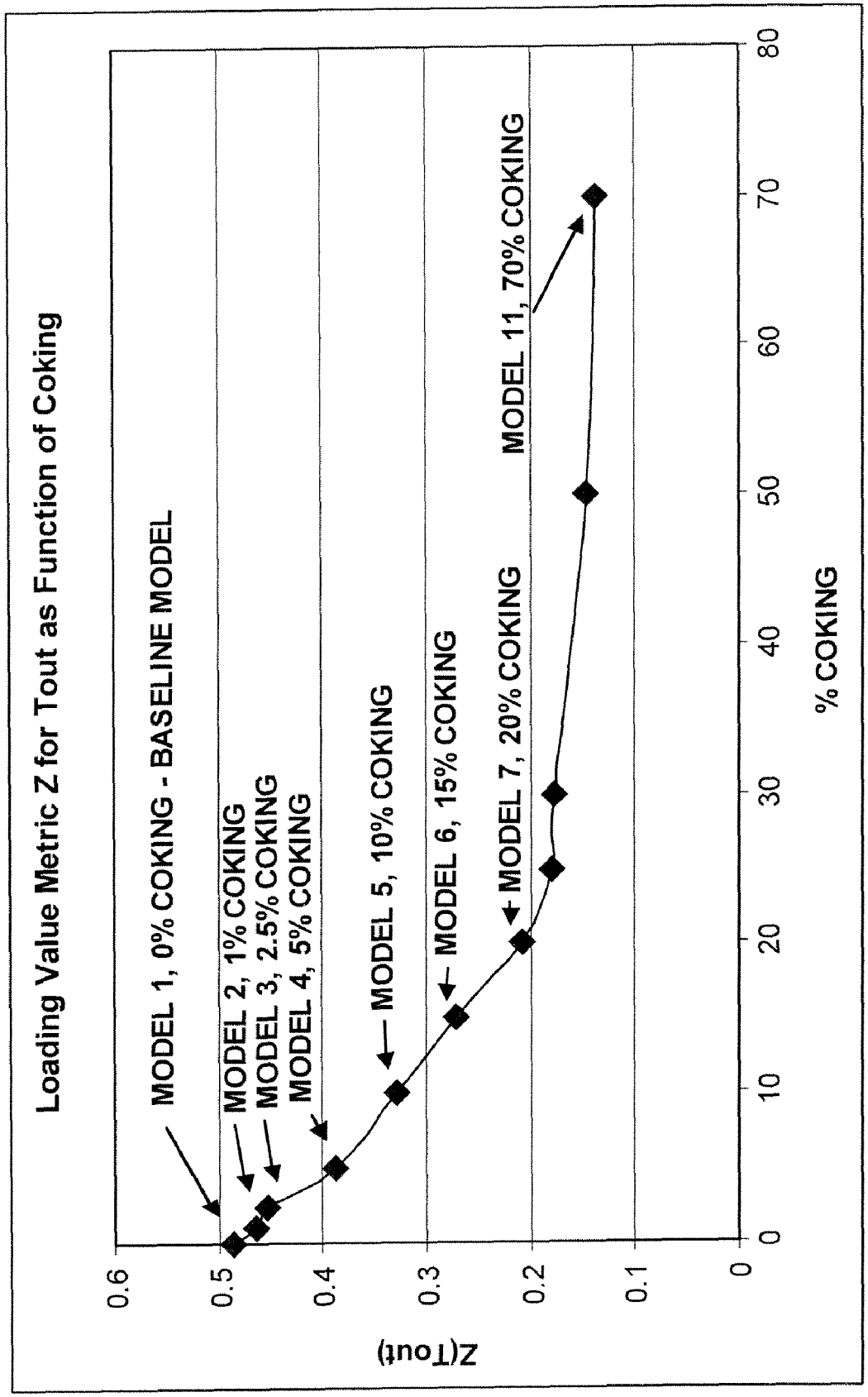
FIG. 42 is a graphical plot of a PCA model parameter for the output temperature of a fired heater demonstrating another, non-regression-based technique for coking detection in accordance with another aspect of the disclosure.
Figure 43:
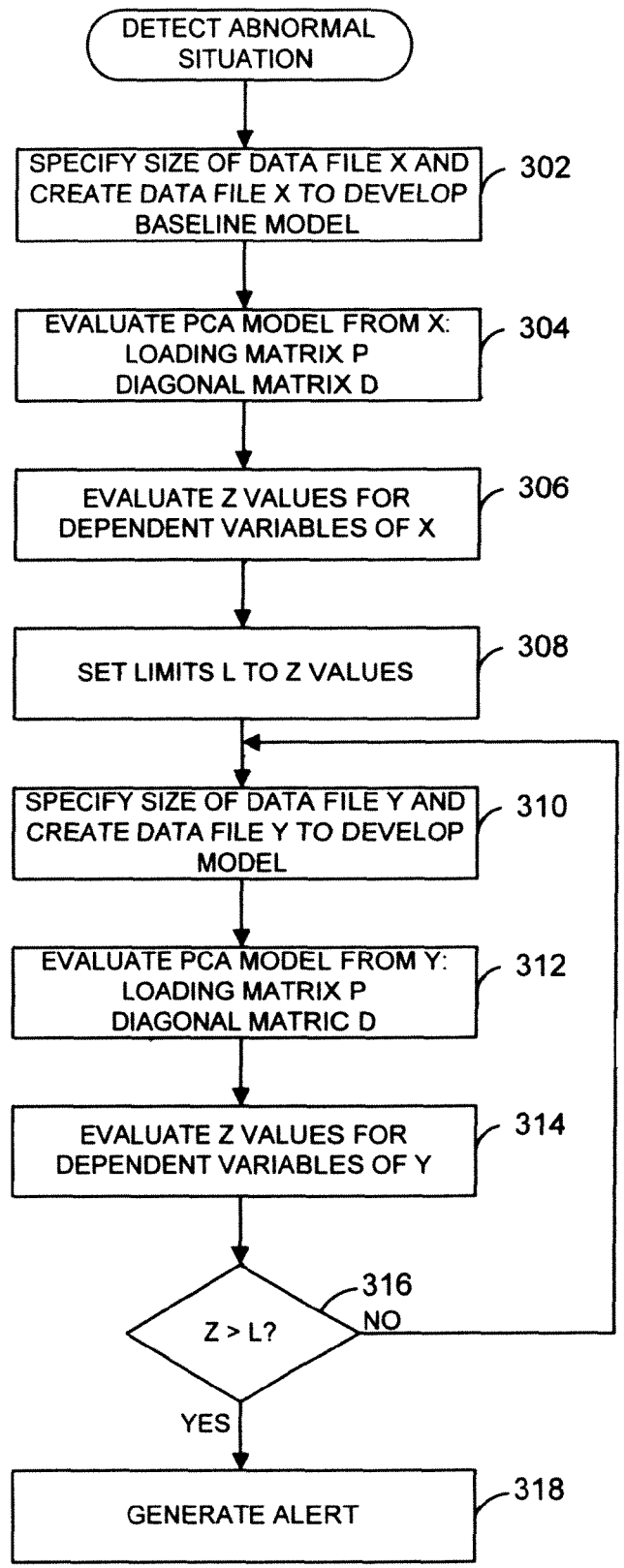
FIG. 43 is a flow diagram of one embodiment of the non-regression-based coking detection technique depicted in the graphical plot of FIG. 42.

Turning to the aspects of the disclosure addressed in FIGS. 42 and 43, a PCA parameter-based technique for on-line multivariate monitoring and diagnostics of coking in fired heaters is now described. The approach is based on developing multiple Principal Component Analysis (PCA) models, and comparing the model parameters for different process operating conditions. Apart from coking detection, the disclosed technique method may also be effective for determining or detecting other slow varying process changes involving a variety of different process equipment (e.g., soot buildup in furnaces, fouling and other degradation of reactors, compressors, heat exchangers, distillation columns, and membranes, etc.).

As described above, the PCA-based techniques may be integrated with a distributed process control systems (DCS) for implementation in connection with on-line monitoring and diagnostics. The disclosed techniques also enabled the creation and manipulation of data for developing on-line models and comparing model parameters. PCA-based techniques were also applied to the specific details presented by the challenge of determining coking levels in coker heaters using Principal Component Regression (PCR) analysis.

This aspect of the disclosure provides a method for detecting slow varying process changes, such as coking, without using a regression-based approach. The disclosed method is instead based on continuously, repeatedly or otherwise constantly developing PCA models during process operations, and comparing the developed models to a baseline model developed under normal process operating conditions. The disclosed technique may provide a more robust solution in certain applications (e.g., abnormal situation prevention applications) relative to others that use regression for the reasons set forth below. For example, a regression-based technique generates a prediction every time data points are read from a field device communication link (e.g., Fieldbus, Modbus, wireless, etc.). As a result, regression-based techniques provide a current prediction of a process state, which may then be processed or evaluated via logic to determine a diagnostic status. This process often creates false alerts/alarms due to dynamic process changes such as setpoint and steady-state changes, as well as outlier noise in data strings. These types of alerts often become troublesome for operators and, accordingly, should be minimized, if not eliminated all together.

In contrast, the disclosed approach creates data files of predetermined dimension in the background of process operation either continually or on-demand. These data files are then used to generate PCA model updates used for evaluating process performance. As a result, the disclosed method may be more robust, as it is not entirely dependent on the current process data values. Instead, the disclosed method may generate an alert report based on process performance diagnostic based on a long term data behavior, which, for instance, may be determined by the size of data files. Further details of the disclosed method are described below.

At the outset, a training data file may be established to develop a PCA. The training data may represent data collected during normal process operating conditions. As described above, the data file may thus contain rows of data (observations) and columns, where each column corresponds to an assigned process variable (PV). The process variables may be either raw data, or statistical signatures obtained from the raw data, (e.g., abnormal situation prevention block data). Consequently, the data file contains n columns and m rows with a general assumption that m>>n. With such an assignment, the model addresses n process variables with m observations and contains m×n data matrix X, which is autoscaled as described above. The actual model may then be constructed by evaluating spectral components of the n×n covariance matrix S, where $S = X^T \cdot X/(m-1)$, which are used to rewrite S as $S = V \cdot D \cdot V^T$, where $$D = \begin{bmatrix} \sigma_1^2 & 0 & \cdots & 0 \\ 0 & \sigma_2^2 & \cdots & 0 \\ \vdots & \vdots & \ddots & \vdots \\ 0 & 0 & \cdots & \sigma_n^2 \end{bmatrix}$$

and where $\sigma_i^2$, i=1, ..., n, are Eigenvalues (variances), sorted from largest to smallest, and the columns of V are the corresponding Eigenvectors. The largest Eigenvalue, and its corresponding eigenvector, correspond to the direction in the original input spaces containing the largest amount of variation in the original process data. This is considered the first principal component. The second largest Eigenvalue, and its corresponding eigenvector, correspond to the direction, orthogonal to the first principal component, containing the next largest amount of variation. This continues until a new orthogonal vector space, explaining all of the original process data, is created.

After the Eigenvalues and Eigenvectors are computed, it is necessary to determine which ones are the significant principal components, usually corresponding to the important variation in a process, and which are insignificant, usually corresponding to the noise. It should be understood that a number of methods may be used to determine the significant and insignificant principal components, examples of which have been provided above.

Whichever method is chosen, the final result is determining the number of significant principal components, a, that will be retained for the PCA model. Then, the loading matrix $P \in \mathfrak{R}^{n \times a}$ may be created by taking the first a columns (Eigenvectors) from V. The projection of the original observations onto the subspace defined by the loading matrix is called the score matrix, and denoted by $T = X \cdot P$. The columns of T are called the scores of the PCA model, referred to as $t_1, t_2, \ldots t_a$, and the n×a matrix P is the PCA model.

Training data file X. For the purpose of this aspect of the disclosure, the training data X may be selected by selecting independent process variables that affect the process behavior to be resolved and letting those represent the first k<n columns of X, as well as selecting dependent process variables that describe the process behavior and letting them be represented by the last n−k>0 columns of X. If a regression technique were to be implemented, then the first k process variables in X are used to for prediction of the last n−k process variables. However, when developing the PCA model, X has k independent process variables only and n=k. They are used to create the loading n×a matrix P, which contains a principal component vectors (loading vectors) used to create scores $t_1$, $t_2, \ldots, t_a$ that are then employed to predict dependent variables. In the disclosed approach, the independent and dependent variables are combined to create the training data file X.

Once the PCA model is specified, the loading matrix $P = [p_1, p_2, \ldots, p_a]$, where $p_i = [p_{i,1}, \ldots, p_{i,k}, p_{i,k+1}, \ldots, p_{i,n}]^T$ is a loading vector for i=1, ..., a, becomes defined. The first $p_{i,1}, \ldots, p_{i,k}$ components of $p_i$ are loading values corresponding to the first k independent variables in X. Similarly, $p_{i,k+1}, \ldots, p_{i,n}$ components are loading values corresponding to the last n−k dependent variables in X. As a result, P defines the space of interrelated loading values that are directly related to the original process variables. Now each dependent variable in X, n−k of them, has a loading value metric in this space given by $$z_j = \sqrt{\sum_{i=1}^{a} \frac{p_{i,j}^2}{\sigma_i^2}},$$

where j=k+1, ..., n, and $\sigma_i$ is i-th Eigenvalue in D.

The loading value metric $z_j$ is the model outcome of a $j^{th}$ dependent process variable with the following properties. Where X and Y are data files from the same process operation, and collected at different times, and $z_j$ and $v_j$ are the model outcomes respectively corresponding to X and Y of the same dependent process variable, then if $z_j \approx v_j$ the process behavior described by the $j^{th}$ process variable is similar for X and Y. In contrast, if $z_j \neq v_j$, then the process behavior described by the $j^{th}$ process variable is different for X and Y.

This property is useful for process diagnostics, and in particular for diagnostics of slowly changing process behavior. The reason is that the loading value metric $z_j$ reflects process behavior over a period of time specified by the operator, and, as such, provides a more complete diagnostics than the most current update given by the regression approach.

Coker Heater Application. The foregoing technique may used to determine the level of coking in coker heaters. As described above, the data file X was composed of the process variables defined in Table 1 and FIG. 24. In that example, $T_{out}$ was the only dependent variable, while all other variables were independent. In the technique in accordance with this aspect of the disclosure, however, all variables are used to create the PCA model, and PCR is not utilized.

With such an assignment, the baseline model was created under normal operating conditions (e.g., 0% coking), and the loading value metric Z was computed for $T_{out}$. Subsequently, the same was done for different percent of coking in fired heaters, and FIG. 42 illustrates the results obtained. As can be seen in FIG. 42, there is a monotonic decrease in Z as percent of coking increases, which implies that there is a structural change in the loading space due to changes in process variable contributions as the percent of coking is varied. This change is collaborative and may not be easily determined by monitoring one variable at the time.

Based on the foregoing, by placing different limits on Z, this technique may be used in a diagnostics/fault detection method or system. Alerts and alarms issued using this technique are more reliable because each model represents the behavior of Z based on the length of time used to gather the model data. Moreover, while running, the detection method may be entirely transparent to operators. This is because the detection method may be running in the background of the monitoring console, and may be configured to alert operators of abnormal situations only when the set limits are exceeded or violated. The flow chart in FIG. 43 illustrates how the method or system may be implemented in accordance with one embodiment. With this approach, false alarms and alerts may be avoided and performance of process parameters may nonetheless be rigorously monitored with time.

Referring to FIG. 43, at a block 302 the procedure specifies the size of the data file X and creates the data file X based on training data generated from process variables of the process being monitored. As discussed above, the training data may correspond to the normal on-line operation of the process. At a block 304, the multivariate model, such as a PCA model, is developed from the data file X and evaluated to determine the loading matrix P and the diagonal matrix D. The Z variables are evaluated at a block 306 for the dependent variables of the data file X, as discussed above. At a block 308, the limits L are set to the Z values evaluated at block 308 for the data file X.

Having generated the limits L, the procedure from blocks 302-306 may be repeated with a new data file Y in order to detect abnormal operations. In particular, data generated from process variables of the system may be received, where the data corresponds to data generated while the process is operating on-line which may correspond to a monitoring state where the process is being monitored for abnormal operations. As discussed above, the data of the data file Y is generally collected at a different time from the same process. At a block 310, the size of the new data file Y is specified, and the data file Y is created to model the on-line operation of the process. A multivariate model, such as a PCA model, is developed and evaluated at a block 312 to determine the loading matrix P and the diagonal matrix D for the data file Y. The Z values are evaluated at a block 314 for the dependent variables of the data file Y, and the Z values for the data file Y are compared to the limits L at a block 316. If the Z values for the dependent variables of the data file Y exceed the limits, an alert may be generated at a block 318 to indicate an abnormal operation. Otherwise, the process may continue with a new data file generated from the same process, and generally at yet another different time than the data files X and Y. Thus, the procedure may be repeated for various data files corresponding to different time of operation of the process to detect abnormal conditions based on long term data behavior, where the abnormal conditions may relates to slow varying changes in the process. Although the block 316 indicates that an alert may be generated is the Z values are greater than the limits L, it should be recognized that an alert may also be generated if the Z values are less than the limits L.

With this aspect of the disclosure, a PCA model parameter may be defined and applied for on-line diagnostics, which may be useful in connection with coking in coker heaters and a variety of process equipment faults or abnormal situations. The model parameter may be derived using PCA loadings and variance information, and a loading value metric may be defined for the dependent or independent process variables. In some cases, the disclosed method may be used for observing long term coking, rather than instantaneous or most current changes. For instance, the disclosed method may be used for on-line long term collaborative diagnostics. Alternatively or additionally, the disclosed method may provide an alternative approach to regression analysis. The disclosed method may be implemented in connection with a number of control system platforms, including, for instance, DeltaV™ and Ovation®, and with a variety of process equipment and devices, such as the Rosemount 3420 FF Interface Module. Alternatively, the disclosed method and system may be implemented as a stand alone abnormal situation prevention application. In either case, the disclosed method and system may be configured to generate alerts and otherwise support the regulation of coking levels in fired heaters.

One of ordinary skill in the art will recognize that the exemplary systems and methods described above may be modified in various ways. For example, blocks may be omitted or reordered, additional blocks may be added, etc. For example, with regard to FIG. 7, the block 146 could be implemented at a different point in the flow. Similarly, the block 148 could be implemented as part of a separate routine, and thus it could actually occur at various points with the flow of FIG. 7 depending upon when a suitable command is received to initiate implementation of the separate routine.

The above-described examples involving abnormal situation prevention modules and abnormal situation prevention blocks are disclosed with the understanding that practice of the disclosed systems, methods, and techniques is not limited to such contexts. Rather, the disclosed systems, methods, and techniques are well suited for use with any diagnostics system, application, routine, technique or procedure, including those having a different organizational structure, component arrangement, or other collection of discrete parts, units, components, or items, capable of selection for monitoring, data collection, etc. Other diagnostics systems, applications, etc., that specify the process parameters being utilized in the diagnostics may also be developed or otherwise benefit from the systems, methods, and techniques described herein. Such individual specification of the parameters may then be utilized to locate, monitor, and store the process data associated therewith. Furthermore, the disclosed systems, methods, and techniques need not be utilized solely in connection with diagnostic aspects of a process control system, particularly when such aspects have yet to be developed or are in the early stages of development. Rather, the disclosed systems, methods, and techniques are well suited for use with any elements or aspects of a process control system, process plant, or process control network, etc.

The methods, processes, procedures and techniques described herein may be implemented using any combination of hardware, firmware, and software. Thus, systems and techniques described herein may be implemented in a standard multi-purpose processor or using specifically designed hardware or firmware as desired. When implemented in software, the software may be stored in any computer readable memory such as on a magnetic disk, a laser disk, or other storage medium, in a RAM or ROM or flash memory of a computer, processor, I/O device, field device, interface device, etc. Likewise, the software may be delivered to a user or a process control system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a process control system via a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A system for facilitating detection of an abnormal operation of a process in a process plant, the system comprising:
    a data collection tool adapted to collect on-line process data from a process within the process plant, wherein the collected on-line process data is representative of an operation of the process when the process is on-line and wherein the collected on-line process data is generated from a plurality of process variables of the process including one or more independent process variables that affect a behavior of the process and one or more dependent process variables dependent upon at least one of the one or more independent process variables, wherein the one or more dependent process variables describe the behavior of the process, and wherein the collected on-line process data comprises a plurality of observations of a plurality of process variables and wherein the plurality of observations of a set of collected on-line process data comprises a first data space having a plurality of dimensions;
    an analysis tool comprising a multivariate statistical analysis engine adapted to generate a first representation of the operation of the process within a data space having fewer dimensions than the first data space based on a first set of the collected on-line process data generated from the plurality of process variables of the process, wherein the first representation of the operation of the process is adapted to be executed to generate a first outcome related to a dependent process variable, wherein the first outcome is a first loading value metric of the dependent process variable for the first set of collected on-line process data, and wherein the multivariate statistical analysis engine adapted to generate a second representation of the operation of the process within a data space having fewer dimensions than the first data space based on a second set of the collected on-line process data generated from the plurality of process variables of the process, wherein the second representation of the operation of the process is adapted to be executed to generate a second outcome related to the dependent process variable, wherein the second outcome is a second loading value metric of the dependent process variable for the second set of collected on-line process data; and
    a monitoring tool adapted to determine changes in the process based on a comparison of the first and second outcomes related to the dependent process variable.

2. The system of claim 1, wherein the monitoring tool is adapted to analyze a change between the first and second outcomes related to the dependent process variable to detect an abnormal operation of the process.

3. The system of claim 1, wherein the first and second outcomes related to the dependent process variable comprise two of a plurality of outcomes related to the dependent process variable generated from corresponding representations of the operation of the process based on different sets of the collected on-line process data generated from the plurality of process variables of the process, wherein the monitoring tool is adapted to monitor a trend in the plurality of outcomes to detect an abnormal operation of the process.

4. The system of claim 1, wherein the first set of the collected on-line process data is representative of a normal operation of the process when the process is on-line and operating normally, wherein the first outcome comprises a baseline outcome related to the dependent process variable, and wherein the second set of the collected on-line process data is representative of a monitored operation of the process when the process is on-line and operating.

5. The system of claim 4, wherein the monitoring tool is adapted to compare the second outcome to the baseline outcome to detect an abnormal operation of the process.

6. The system of claim 1, wherein the multivariate statistical analysis engine is adapted to perform a principal component analysis on the first set and second set of the collected on-line process data to generate corresponding first and second loading matrices each representing the operation of the process, wherein the first and second outcomes related to the dependent variable each comprise a loading value metric of the dependent variable generated from a component of the corresponding loading matrix, wherein the component corresponds to loading values corresponding to the dependent variable.

7. A method of facilitating detection of an abnormal operation of a process in a process plant, the method comprising:
    collecting on-line process data from a process within the process plant, wherein the collected on-line process data is representative of an operation of the process when the process is on-line and wherein the collected on-line process data is generated from a plurality of process variables of the process including one or more independent process variables that affect a behavior of the process and one or more dependent process variables dependent upon at least one of the one or more independent process variables, wherein the one or more dependent process variables describe the behavior of the process, and wherein the collected on-line process data comprises a plurality of observations of a plurality of process variables and wherein the plurality of observations of a set of collected on-line process data comprises a first data space having a plurality of dimensions;

generating a first multivariate statistical representation of the operation of the process within a data space having fewer dimensions than the first data space based on a first set of the collected on-line process data generated from the plurality of process variables of the process;

generating a first outcome related to a dependent process variable from the first multivariate statistical representation, wherein the first outcome is a first loading value metric of the dependent process variable for the first set of collected on-line process data;

generating a second multivariate statistical representation of the operation of the process within a data space having fewer dimensions than the first data space based on a second set of the collected on-line process data generated from the plurality of process variables of the process;

generating a second outcome related to a dependent process variable from the second multivariate statistical representation, wherein the second outcome is a second loading value metric of the dependent process variable for the second set of collected on-line process data; and determining the presence of an abnormal operation based on a comparison of the first and second outcomes related to the dependent process variable.

8. The method of claim 7, wherein determining the presence of an abnormal operation comprises analyzing a change between the first and second outcomes related to the dependent process variable to detect an abnormal operation of the process.

9. The method of claim 7, wherein the first and second outcomes related to the dependent process variable comprise two of a plurality of outcomes related to the dependent process variable generated from corresponding representations of the operation of the process based on different sets of the collected on-line process data generated from the plurality of process variables of the process, wherein determining the presence of an abnormal operation comprises monitoring a trend in the plurality of outcomes to detect an abnormal operation of the process.

10. The method of claim 7, wherein the first set of the collected on-line process data is representative of a normal operation of the process when the process is on-line and operating normally, wherein the first outcome comprises a baseline outcome related to the dependent process variable, and wherein the second set of the collected on-line process data is representative of a monitored operation of the process when the process is on-line and operating.

11. The method of claim 10, wherein determining the presence of an abnormal operation comprises comparing the second outcome to the baseline outcome to detect an abnormal operation of the process.

12. The method of claim 7, wherein generating the first multivariate statistical representation comprises performing a principal component analysis on the first set of the collected on-line process data to generate a first loading matrix representing the operation of the process at a first time, and wherein generating the second multivariate statistical representation comprises performing a principal component analysis on the second set of the collected on-line process data to generate a second loading matrices representing the operation of the process at a second time, wherein the first and second outcomes related to the dependent variable each comprise a loading value metric of the dependent variable generated from a component of the corresponding loading matrix, wherein the component corresponds to loading values corresponding to the dependent variable.

* * * * *

UNITED STATES PATENT AND TRADEMARK OFFICE
CERTIFICATE OF CORRECTION

PATENT NO. : 7,937,164 B2
APPLICATION NO. : 11/864529
DATED : May 3, 2011
INVENTOR(S) : Nikola Samardzija et al.

It is certified that error appears in the above-identified patent and that said Letters Patent is hereby corrected as shown below:

In the Specification:

At Column 29, line 16, "may monitored" should be -- may be monitored --.

At Column 38, line 32, "stand alone" should be -- standalone --.

Signed and Sealed this
Twenty-sixth Day of June, 2012

David J. Kappos
*Director of the United States Patent and Trademark Office*